(12) United States Patent
Fujishiro et al.

(10) Patent No.: US 10,085,242 B2
(45) Date of Patent: Sep. 25, 2018

(54) USER TERMINAL AND BASE STATION THAT SUPPORT D2D PROXIMITY SERVICES

(71) Applicant: KYOCERA CORPORATION, Kyoto (JP)

(72) Inventors: Masato Fujishiro, Yokohama (JP); Hiroyuki Adachi, Kawasaki (JP); Chiharu Yamazaki, Tokyo (JP); Yushi Nagasaka, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/222,713

(22) Filed: Jul. 28, 2016

(65) Prior Publication Data
US 2017/0041773 A1 Feb. 9, 2017

Related U.S. Application Data

(63) Continuation of application No. PCT/JP2015/072420, filed on Aug. 6, 2015.
(Continued)

(51) Int. Cl.
*H04W 72/04* (2009.01)
*H04W 76/14* (2018.01)
(Continued)

(52) U.S. Cl.
CPC ....... *H04W 72/0406* (2013.01); *H04W 8/005* (2013.01); *H04W 48/12* (2013.01);
(Continued)

(58) Field of Classification Search
CPC ... H04W 8/005; H04W 40/24; H04W 40/246; H04W 48/08; H04W 48/10; H04W 48/12;
(Continued)

(56) References Cited

U.S. PATENT DOCUMENTS

2014/0056220 A1* 2/2014 Poitau .............. H04W 40/246
                                                          370/328
2014/0098784 A1 4/2014 Iwamura et al.
(Continued)

FOREIGN PATENT DOCUMENTS

JP       2012-244422 A    12/2012
WO    2012/166969 A1    12/2012
(Continued)

OTHER PUBLICATIONS

International Search Report issued in PCT/JP2015/072420; dated Oct. 27, 2015.
(Continued)

*Primary Examiner* — Joshua Kading
(74) *Attorney, Agent, or Firm* — Studebaker & Brackett PC

(57) ABSTRACT

A user terminal according to an embodiment comprises: a transmitter configured to transmit a message to a base station, the message requesting a gap used to receive or transmit a discovery signal that is a direct terminal-to-terminal radio signal for discovering another user terminal; and a receiver configured to receive configuration information from the base station, the configuration information configuring the gap to the user terminal. The message includes: gap information indicating the gap; and frequency information indicating a frequency associated with the gap information. The gap information includes: a bitmap indicating at least one subframe; and an offset value with reference to "0" of system frame number (SFN).

4 Claims, 19 Drawing Sheets

Related U.S. Application Data

(60) Provisional application No. 62/035,151, filed on Aug. 8, 2014, provisional application No. 62/056,042, filed on Sep. 26, 2014, provisional application No. 62/076,722, filed on Nov. 7, 2014, provisional application No. 62/162,204, filed on May 15, 2015.

(51) Int. Cl.
| | |
|---|---|
| *H04W 72/12* | (2009.01) |
| *H04W 8/00* | (2009.01) |
| *H04W 48/12* | (2009.01) |
| *H04W 76/02* | (2009.01) |
| *H04W 40/24* | (2009.01) |

(52) U.S. Cl.
CPC ... *H04W 72/0446* (2013.01); *H04W 72/0453* (2013.01); *H04W 72/121* (2013.01); *H04W 72/1278* (2013.01); *H04W 76/023* (2013.01); *H04W 76/14* (2018.02); *H04W 40/24* (2013.01)

(58) Field of Classification Search
CPC ............... H04W 48/14; H04W 56/001; H04W 72/0453; H04W 76/14; H04W 76/023; H04W 72/0406; H04W 72/0446; H04W 72/121; H04W 72/1278
See application file for complete search history.

(56) References Cited

U.S. PATENT DOCUMENTS

| | | |
|---|---|---|
| 2015/0103789 A1 | 4/2015 | Tanaka |
| 2015/0215903 A1* | 7/2015 | Zhao .................... H04W 72/04 370/329 |
| 2015/0257184 A1 | 9/2015 | Yamazaki et al. |
| 2016/0192426 A1* | 6/2016 | Noh ...................... H04W 8/005 370/329 |
| 2016/0360541 A1* | 12/2016 | Kim .................... H04W 76/023 |
| 2016/0366676 A1* | 12/2016 | Fujishiro ............. H04W 76/023 |

FOREIGN PATENT DOCUMENTS

| | | |
|---|---|---|
| WO | 2013/179472 A1 | 12/2013 |
| WO | 2014/050556 A1 | 4/2014 |

OTHER PUBLICATIONS

Written Opinion issued in PCT/JP2015/072420; dated Oct. 27, 2015.

3rd Generation Partnership Project; Technical Specification Group Radio Access Network; Study on LTE Device to Device Proximity Services; Radio Aspects; 3GPP TR 36.843 V12.0.1; Mar. 2014; pp. 1-50; Release 12; 3GPP Organizational Partners.

"Inter-carrier discovery support"; 3GPP TSG-RAN WG2 #86; R2-142642; May 19-23, 2014; pp. 1-3; Seoul, Korea.

An Office Action issued by the Japanese Patent Office dated Mar. 14, 2017, which corresponds to Japanese Patent Application No. 2016-540747 and is related to U.S. Appl. No. 15/222,713; with English language concise explanation.

Qualcomm Incorporated; "Signaling Details for ProSe Direct Discovery"; 3GPP TSG-RAN WG2 #86 R2-142540; Seoul, South Korea; May 19-May 23, 2014; Total pp. 7.

ZTE; Inter-PLMN and Inter-frequency support; 3GPP TSG-RAN WG2 Meeting #87; R2-143599; Aug. 18-22, 2014; pp. 1-3; Dresden, Germany.

Kyocera; Inter-PLMN D2D discovery; 3GPP TSG-RAN WG2 #87; R2-143756; Aug. 18-22, 2014; pp. 1-6; Dresden, Germany.

* cited by examiner

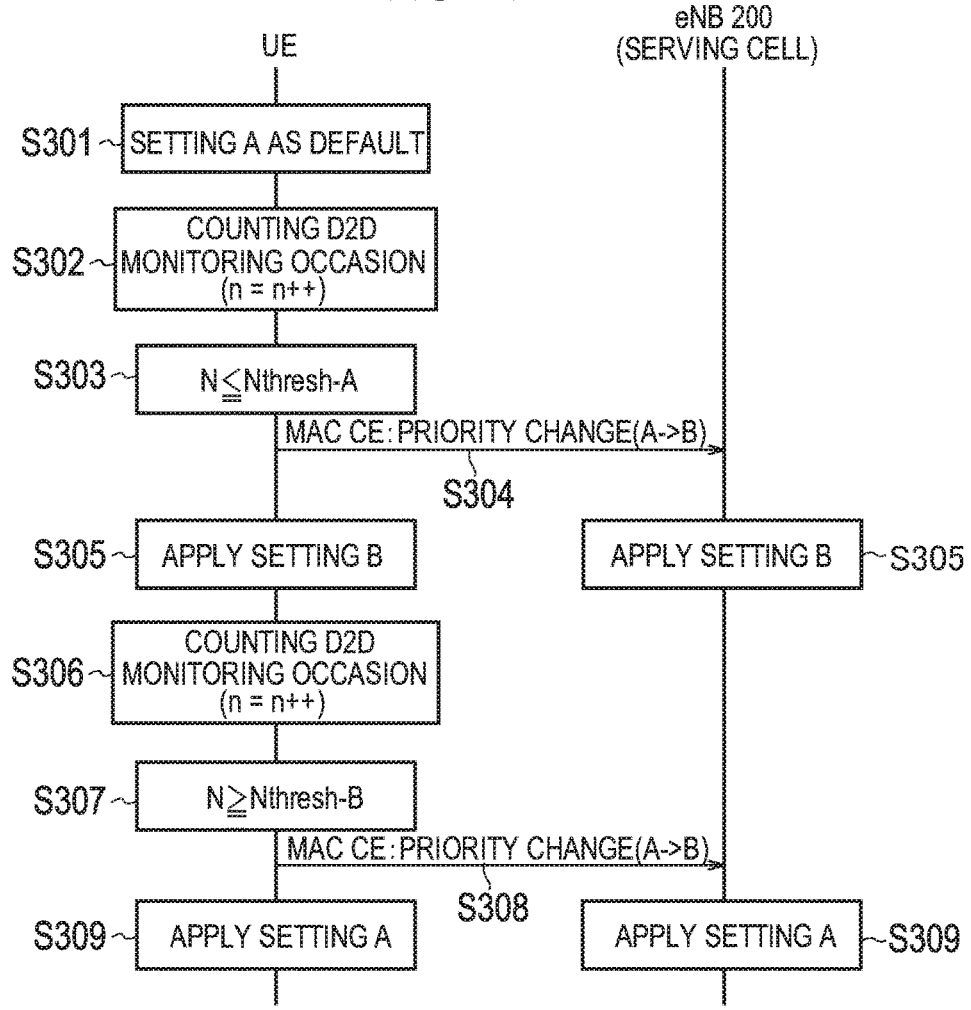
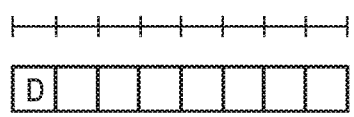
D:
"0"INDICATES TO APPLY PRIORITY SETTING A.
"1"INDICATES TO APPLY PRIORITY SETTING B.

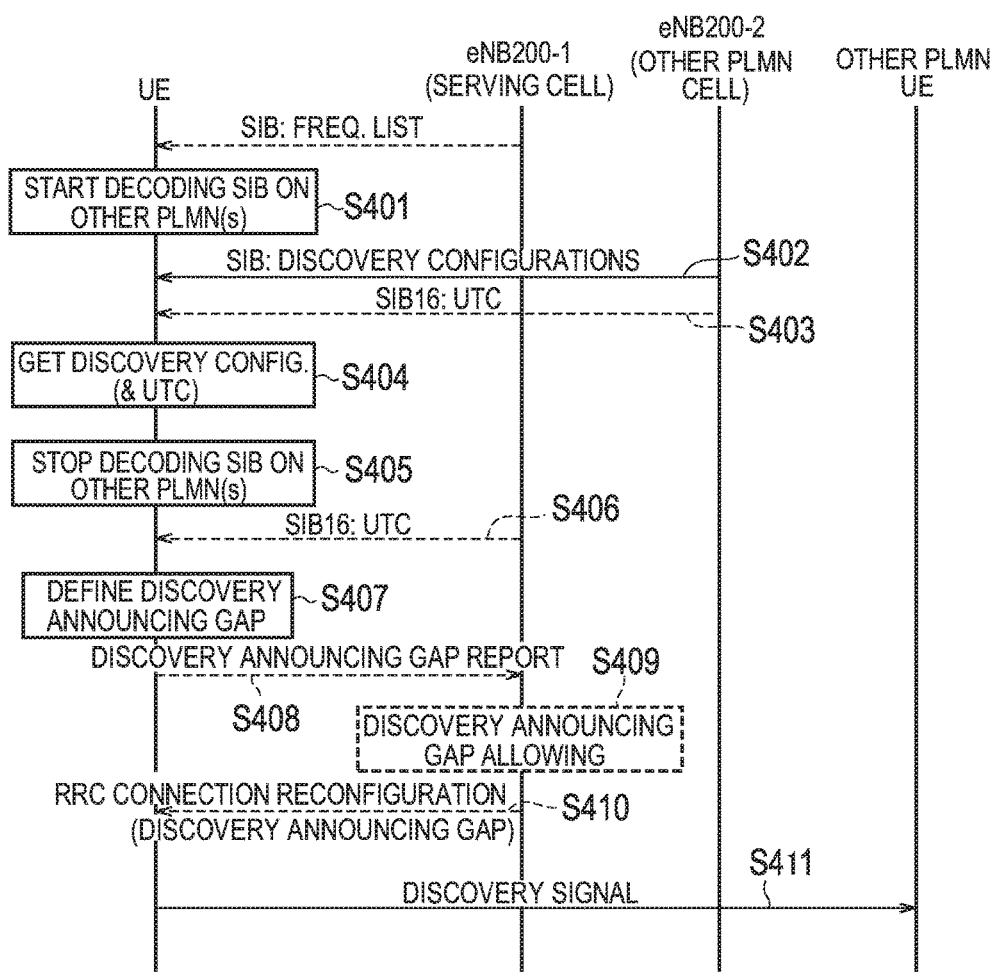

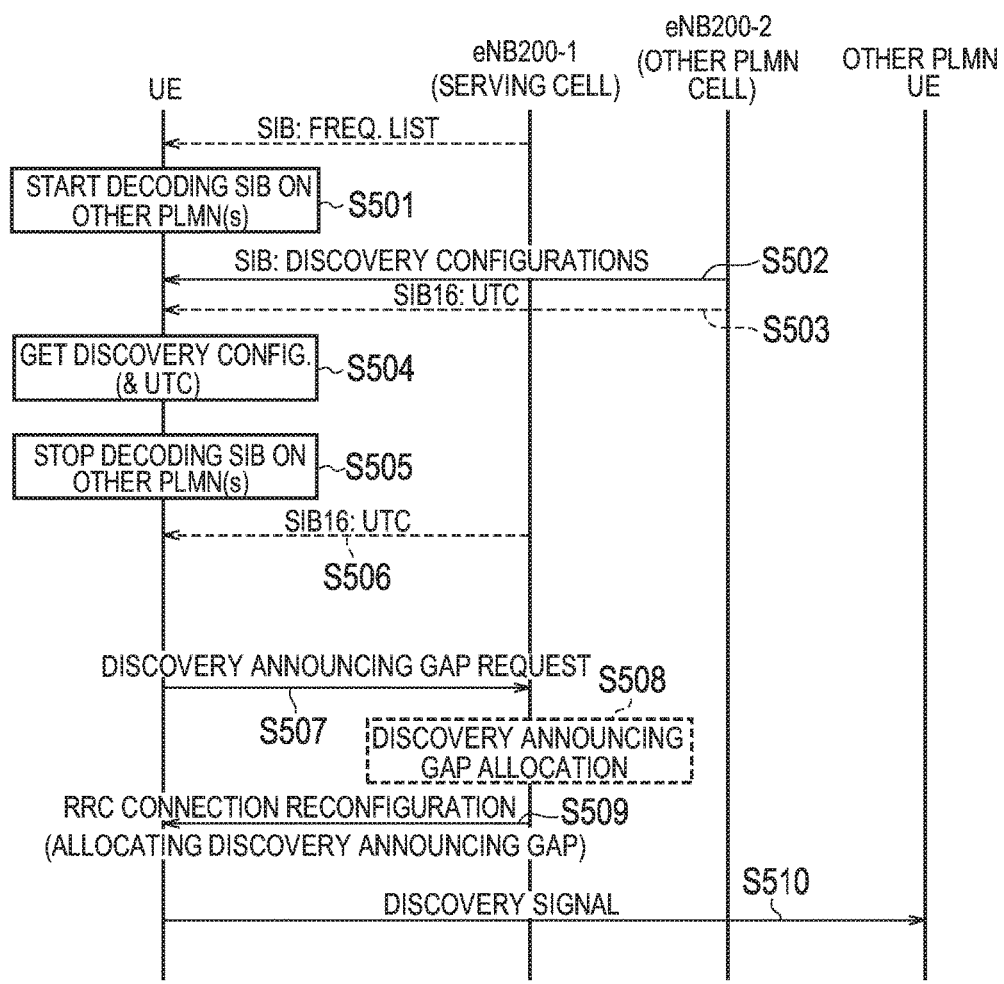

FIG. 15

| FREQ. | SIB18 (D2D SIB) | SIB5 (INTER-FREQ. SIB) | JUDGMENT |
|---|---|---|---|
| F1 | ○ | ○ | INTER-FREQ & INTRA-PLMN, DISCOVERY OK |
| F2 |  | ○ | DISCOVERY NG |
| F3 | ○ |  | INTER-FREQ & INTER-PLMN, DISCOVERY OK |

USER TERMINAL AND BASE STATION THAT SUPPORT D2D PROXIMITY SERVICES

RELATED APPLICATIONS

This application is a continuation application of international application PCT/JP2015/072420, filed Aug. 6, 2015, which claims benefit of U.S. Provisional Application No. 62/035,151, filed on Aug. 8, 2014, U.S. Provisional Application No. 62/056,042, filed on Sep. 26, 2014, U.S. Provisional Application No. 62/076,722, filed on Nov. 7, 2014, and U.S. Provisional Application No. 62/162,204, filed on May 15, 2015, the entirety of all applications hereby expressly incorporated by reference.

TECHNICAL FIELD

The prevent application relates to a user terminal and a base station used in a mobile communication system that supports D2D proximity service.

BACKGROUND

In 3GPP (3rd Generation Partnership Project) which is a project aiming to standardize a mobile communication system, the introduction of Device to Device (D2D) proximity service is discussed as a new function after Release 12 (see Non Patent Document 1).

The D2D proximity service (D2D ProSe) is a service enabling direct Device-to-Device communication within a synchronization cluster including a plurality of synchronized user terminals. The D2D proximity service includes a D2D discovery procedure (Discovery) in which a proximal terminal is discovered and D2D communication (Communication) that is direct Device-to-Device communication.

Here, an agreement is reached that a serving cell is capable of providing by an SIB (System Information Block) a frequency in which the D2D discovery procedure is supported and which is different from a frequency of the serving cell (hereinafter, "another D2D frequency"). A user terminal is capable of discovering another user terminal by monitoring a D2D discovery signal that is transmitted in another D2D frequency acquired by the SIB.

SUMMARY

A user terminal according to an embodiment comprises: a transmitter configured to transmit a message to a base station, the message requesting a gap used to receive or transmit a discovery signal that is a direct terminal-to-terminal radio signal for discovering another user terminal; and a receiver configured to receive configuration information from the base station, the configuration information configuring the gap to the user terminal. The message includes: gap information indicating the gap; and frequency information indicating a frequency associated with the gap information. The gap information includes: a bitmap indicating at least one subframe; and an offset value with reference to "0" of system frame number (SFN).

An apparatus according to an embodiment is an apparatus for a user terminal. The apparatus comprises: a processor and a memory, the processor configured to cause the user terminal to transmit a message to a base station, the message requesting a gap used to receive or transmit a discovery signal that is a direct terminal-to-terminal radio signal for discovering another user terminal, and receive configuration information from the base station, the configuration information configuring the gap to the user terminal. The message includes: gap information indicating the gap; and frequency information indicating a frequency associated with the gap information. The gap information includes: a bitmap indicating at least one subframe requested by the user terminal as the gap; and an offset value with reference to "0" of system frame number (SFN).

A base station according to an embodiment comprises: a receiver configured to receive a message from a user terminal, the message requesting a gap used to receive or transmit a discovery signal that is a direct terminal-to-terminal radio signal for discovering another user terminal; and a transmitter configured to transmit configuration information to the user terminal, the configuration information configuring the gap to the user terminal. The message includes: gap information indicating the gap; and frequency information indicating a frequency associated with the gap information. The gap information includes: a bitmap indicating at least one subframe; and an offset value with reference to "0" of system frame number (SFN).

An apparatus according to an embodiment is an apparatus for a base station. The apparatus comprises: a processor and a memory, the processor configured to cause the base station to receive a message from a user terminal, the message requesting a gap used to receive or transmit a discovery signal that is a direct terminal-to-terminal radio signal for discovering another user terminal; and transmit configuration information to the user terminal, the configuration information configuring the gap to the user terminal. The message includes: gap information indicating the gap; and frequency information indicating a frequency associated with the gap information. The gap information includes: a bitmap indicating at least one subframe; and an offset value with reference to "0" of system frame number (SFN).

BRIEF DESCRIPTION OF THE DRAWINGS

FIG. 11 is a sequence chart for describing one example of an operation according to the second embodiment.
FIG. 12 is a diagram for describing a control signal according to the second embodiment.
FIG. 13 is a sequence chart for describing one example of an (a UE-based) operation according to a third embodiment.
FIG. 14 is a sequence chart for describing one example of an (eNB-based) operation according to the third embodiment.
FIG. 15 is a diagram for describing an operation of a U100 according to another embodiment.

DETAILED DESCRIPTION

Overview of Embodiment

Figure 1:
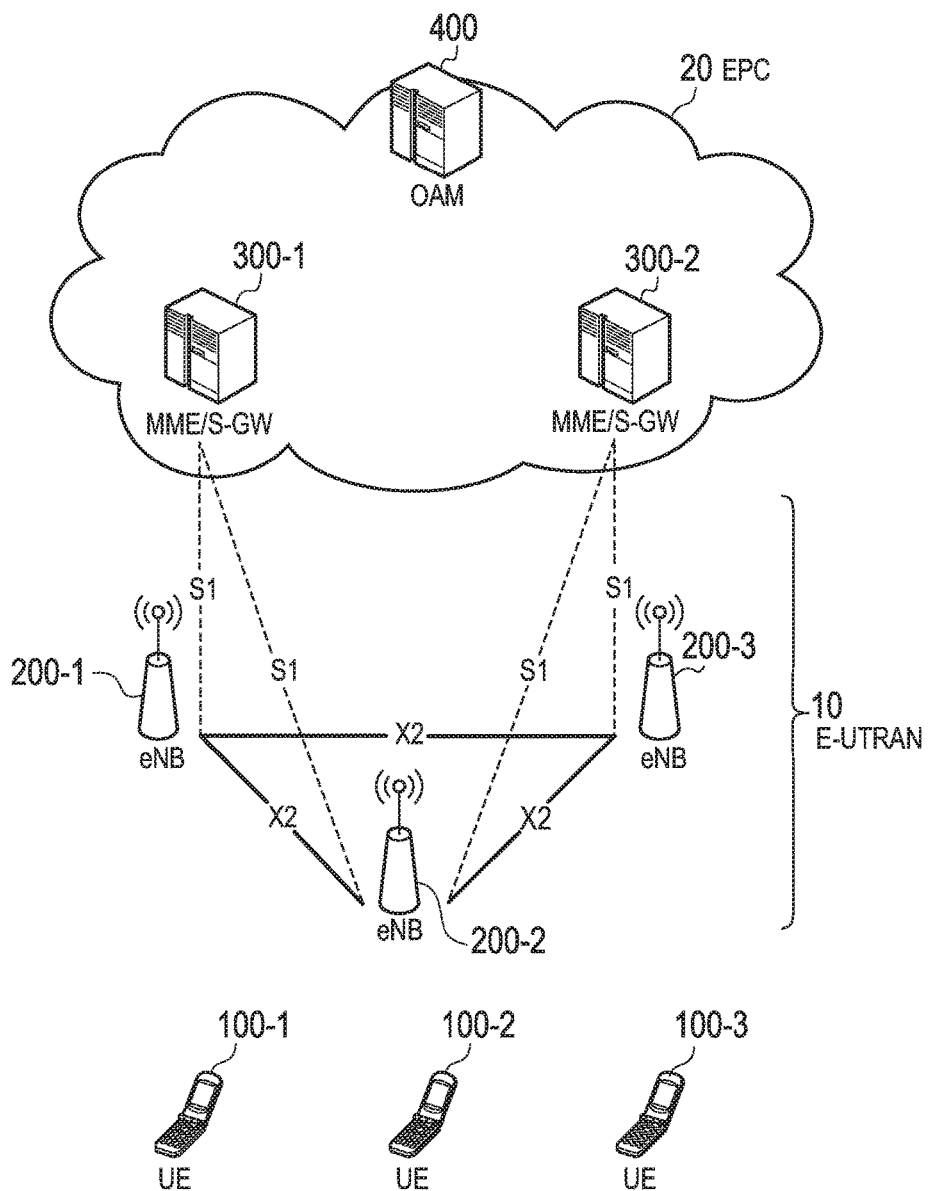
FIG. 1 is a configuration diagram of an LTE system.

A user terminal according to an embodiment comprises: a transmitter configured to transmit a message to a base station, the message requesting a gap used to receive or transmit a discovery signal that is a direct terminal-to-terminal radio signal for discovering another user terminal; and a receiver configured to receive configuration information from the base station, the configuration information configuring the gap to the user terminal. The message includes: gap information indicating the gap; and frequency information indicating a frequency associated with the gap information. The gap information includes: a bitmap indicating at least one subframe; and an offset value with reference to "0" of system frame number (SFN).

The gap may be a transmission gap used to transmit the discovery signal. The transmitter may be further configured to transmit the discovery signal during the transmission gap. The transmitter may be further configured to prioritize transmission of an uplink signal over transmission of the discovery signal in response to occurring the uplink signal during the transmission gap.

The transmitter may be further configured to prioritize transmission of a control signal to the base station as the uplink signal over transmission of the discovery signal during the transmission gap.

The gap may be a reception gap used to receive the discovery signal. The reception gap may be a period during which the user terminal is not expected to receive a downlink signal. The receiver may be further configured to receive the discovery signal during the reception gap.

The user terminal may be further configured to prioritize a measurement over transmission or reception of the discovery signal.

The gap may be a period during which the user terminal transmits or receives the discovery signal in an intra-frequency and an inter-frequency.

The gap may include a time during which the user terminal tunes a frequency.

The gap information may include a period for the bitmap.

The message may include plural pieces of gap information as the gap information, and plural pieces of information indicating frequencies associated with each piece of gap information, as the frequency information.

The configuration information may include first information and second information. The first information may configure a transmission gap to the user terminal, the transmission gap used to transmit the discovery signal. The second information may configure a reception gap to the user terminal, the reception gap used to receive the discovery signal.

The receiver may be further configured to receive information from the base station, the information used to release configuration of the gap.

An apparatus according to an embodiment is an apparatus for a user terminal. The apparatus comprises: a processor and a memory, the processor configured to cause the user terminal to transmit a message to a base station, the message requesting a gap used to receive or transmit a discovery signal that is a direct terminal-to-terminal radio signal for discovering another user terminal, and receive configuration information from the base station, the configuration information configuring the gap to the user terminal. The message includes: gap information indicating the gap; and frequency information indicating a frequency associated with the gap information. The gap information includes: a bitmap indicating at least one subframe requested by the user terminal as the gap; and an offset value with reference to "0" of system frame number (SFN).

A base station according to an embodiment comprises: a receiver configured to receive a message from a user terminal, the message requesting a gap used to receive or transmit a discovery signal that is a direct terminal-to-terminal radio signal for discovering another user terminal; and a transmitter configured to transmit configuration information to the user terminal, the configuration information configuring the gap to the user terminal. The message includes: gap information indicating the gap; and frequency information indicating a frequency associated with the gap information. The gap information includes: a bitmap indicating at least one subframe; and an offset value with reference to "0" of system frame number (SFN).

An apparatus according to an embodiment is an apparatus for a base station. The apparatus comprises: a processor and a memory, the processor configured to cause the base station to receive a message from a user terminal, the message requesting a gap used to receive or transmit a discovery signal that is a direct terminal-to-terminal radio signal for discovering another user terminal; and transmit configuration information to the user terminal, the configuration information configuring the gap to the user terminal. The message includes: gap information indicating the gap; and frequency information indicating a frequency associated with the gap information. The gap information includes: a bitmap indicating at least one subframe; and an offset value with reference to "0" of system frame number (SFN).

It is assumed that a time-frequency resource used for transmitting a D2D discovery signal is not provided in all time zones, but provided in a specific time zone divided by a predetermined time.

It is possible to provide a user terminal with another D2D frequency different from a frequency of a serving cell, from the serving cell; however, it is not agreed to provide a user terminal also with a specific location of a time-frequency resource used for transmitting the D2D discovery signal in the other D2D frequency. The user terminal is not capable of simultaneously monitoring the D2D discovery signal and exchanging a cellular signal, and thus, it is desired to appropriately monitor the D2D discovery signal transmitted in the other D2D frequency.

Further, the serving cell may possibly not know the D2D time-frequency resource in the other D2D frequency. For example, the serving cell may not know a D2D time-frequency resource operated in a base station different from a base station that operates the serving cell, or a D2D time-frequency resource operated in a base station in a PLMN different from a PLMN to which the base station operating the serving cell belongs. Thus, a user terminal not capable of simultaneously announcing (transmitting) a D2D discovery signal and exchanging a cellular signal may not be capable of announcing (transmitting) the D2D discovery signal in another D2D frequency due to a relationship in communication with the serving cell.

Further, a similar operation is desirably performed not only on the D2D discovery signal but also on a D2D communication signal used in D2D communication.

Therefore, an object of the present application is to enable a user terminal to appropriately monitor a D2D radio signal transmitted in another D2D frequency. In addition, an object of the present application is to enable a user terminal to appropriately announce a D2D radio signal, in another D2D frequency. A user terminal according to an embodiment is used in a mobile communication system that supports a D2D proximity service. The user terminal comprises: a controller configured to acquire, from another cell operated in another frequency different from a frequency of a serving cell, resource information capable of identifying a location in a time direction of a resource pool for the D2D proximity service in the other cell. The controller determines, on the basis of the resource information, a D2D period during which to monitor a D2D radio signal in the other frequency or to transmit a D2D radio signal in the other frequency.

In the embodiment, the D2D radio signal is a D2D discovery signal used in a D2D discovery procedure. A resource pool for the D2D proximity service is a resource pool for the D2D discovery signal. The D2D period is a monitoring period during which to monitor the D2D discovery signal in the other frequency.

The user terminal according to the embodiment further comprises a transmitter configured to transmit information indicating the D2D period to the serving cell.

The user terminal according to the embodiment further comprises a receiver configured to receive, from the serving cell, information indicating an allowed D2D period, in the D2D period, allowed by the serving cell. The controller controls to monitor the D2D radio signal or to transmit the D2D radio signal in the allowed D2D period.

The user terminal according to the embodiment further comprises a transmitter configured to transmit information indicating setting cancellation of the D2D period to the serving cell.

In the embodiment, when a communication period in which a communication operation that is a transmission operation of an uplink signal or a reception operation of a downlink signal is performed, and the D2D period overlap in the time direction, the controller performs one of: control for a D2D operation that is a monitoring of the discovery signal or a transmission of the discovery signal; and control for the communication operation, in accordance with a predetermined order of priority.

In the embodiment, the predetermined order of priority is determined on the basis of information indicating a capability of the user terminal relating to radio communication with a plurality of cells including the serving cell.

The user terminal according to the embodiment further comprises a receiver configured to receive a downlink signal. The controller controls a discontinuous reception mode in which the receiver is discontinuously activated. The predetermined order of priority is determined on the basis of whether it is a period in which the receiver is activated or stopped in the discontinuous reception mode.

In the embodiment, the predetermined order of priority is determined on the basis of whether the user terminal is in an RRC idle state or in an RRC connected state.

In the embodiment, the controller controls monitoring of a D2D radio signal in a different frequency from the other frequency or transmission of the D2D radio signal in the different frequency. The predetermined order of priority is determined on the basis of a relationship between a frequency of the serving cell and a frequency used for the monitoring or the transmission of the D2D radio signal.

In the embodiment, the predetermined order of priority is determined on the basis of whether or not the user terminal performs a handover procedure for changing the serving cell in an RRC connected state.

In the embodiment, the predetermined order of priority is determined on the basis of whether or not a trigger condition of a measurement report of a radio situation of the user terminal is satisfied.

The user terminal according to the embodiment further comprises a receiver configured to receive a downlink signal. The controller controls a discontinuous reception mode in which the receiver is discontinuously activated. In an Off duration where the receiver is stopped in the discontinuous reception mode, the controller performs a monitoring control to monitor the D2D radio signal in the other frequency or a transmission control to transmit the D2D radio signal in the other frequency, on the basis of the acquired resource information. In the Off duration, the controller determines the D2D period when the controller is not capable of sufficiently performing the monitoring control or the transmission control.

In the embodiment, in a measurement gap that is a period assigned to measure a radio field intensity from a base station in another mobile communication system different from the mobile communication system, the controller performs monitoring control to monitor the D2D radio signal in the other frequency or performs transmission control to transmit the D2D radio signal in the other frequency on the basis of the acquired resource information. In the measurement gap, the controller determines the D2D period when the controller is not capable of sufficiently performing the monitoring control or the transmission control.

A user terminal according to the embodiment is used in a mobile communication system that supports a D2D proximity service. The user terminal comprises: a transmitter configured to transmit a setting request of a D2D period during which to monitor a D2D radio signal in another frequency different from a frequency of a serving cell or to transmit a D2D radio signal in the other frequency, to the serving cell; and a receiver configured to receive, from the serving cell, information indicating the D2D period that is set in response to the setting request.

In the embodiment, the setting request includes resource information capable of identifying a location in a time direction of a candidate resource that is a candidate of the D2D period. The resource information is at least any one item of cycle information indicating a time cycle of the candidate resource, timing information indicating a start timing of the cycle information, bit map information indicating a pattern of the candidate resource by bit map, and number-of-times information indicating the number of times that the bit map information is repeated.

In the embodiment, the timing information is an offset value that uses a predetermined subframe number of the serving cell of the user terminal as a reference.

In the embodiment, the setting request includes a plurality of resource information capable of identifying a location in a time direction of a candidate resource that is a candidate of the D2D period. The plurality of resource information includes resource information corresponding to each of a plurality of other frequencies different from the frequency of the serving cell.

In the embodiment, the setting request includes one item of resource information capable of identifying a location in a time direction of a candidate resource that is a candidate of the D2D period. The one item of resource information is information that integrates the resource information corresponding to each of a plurality of other frequencies different from the frequency of the serving cell.

A base station according to the embodiment is used in a mobile communication system that supports a D2D proximity service. The base station comprises: a controller configured to set, on the basis of resource information capable of identifying a location in a time direction of a resource pool for the D2D proximity service in another cell operated in another frequency different from a frequency of its own cell, a D2D period during which a user terminal located in the its own cell monitors a D2D radio signal in the other frequency or transmits a D2D radio signal in the other frequency; and a transmitter configured to transmit information indicating the D2D period set by the controller, to the user terminal.

In the embodiment, the D2D radio signal is a D2D discovery signal used in a D2D discovery procedure. A resource pool for the D2D proximity service is a resource pool for the D2D discovery signal. The D2D period is a monitoring period during which to monitor the D2D discovery signal in the other frequency.

In the embodiment, it further comprises a receiver configured to receive the resource information from the user terminal.

In the embodiment, the resource information is included in a setting request of the D2D period from the user terminal.

In the embodiment, the transmitter transmits, as information indicating the D2D period, information indicating whether or not to set the resource pool identified by the resource information included in the setting request as the D2D period.

In the embodiment, the resource information is information indicating, of the resource pool for the D2D proximity service in the other cell, a part of the resource pool selected by the user terminal.

In the embodiment, when the controller receives, from the user terminal, a plurality of resource information including the resource information corresponding to each of a plurality of other frequencies, the controller sets the D2D period corresponding to each of the plurality of resource information.

In the embodiment, when the controller receives, from the user terminal, the plurality of resource information including the resource information corresponding to each of the plurality of other frequencies, the controller sets the D2D period corresponding to one item of resource information of the plurality of resource information.

In the embodiment, the transmitter transmits information for canceling a setting of the D2D period to the user terminal.

In the embodiment, when the user terminal cancels the setting of the D2D period, the transmitter transmits information for activating the setting of the D2D period as information indicating the D2D period.

A user terminal according to the embodiment is used in a mobile communication system that supports a D2D proximity service. The user terminal comprises: a controller configured to control a D2D operation for monitoring a D2D radio signal in another frequency different from a frequency of a serving cell or transmitting a D2D radio signal in the other frequency, and to control a communication operation that is a transmission operation of an uplink signal or a reception operation of a downlink signal. When a communication period during which to perform the communication operation and a D2D period during which to perform the D2D operation overlap in a time direction, the controller controls one of: the communication operation and the D2D operation in accordance with a predetermined order of priority.

A user terminal according to the embodiment is used in a mobile communication system that supports a D2D proximity service. The user terminal comprises: a receiver configured to receive a downlink signal; and a controller configured to control a discontinuous reception mode in which the receiver is discontinuously activated. Only in an Off duration where the receiver is stopped in the discontinuous reception mode, the controller performs a D2D control to monitor a D2D radio signal in another frequency different from a frequency of a serving cell or to transmit a D2D radio signal in the other frequency.

In the embodiment, the controller controls to switch a first setting that prioritizes transmission of an uplink signal within the Off duration and a second setting that prioritizes the D2D control within the Off duration.

The user terminal according to the embodiment further comprises a receiver configured to receive, from the serving cell, an instruction to switch the first setting and the second setting. The controller switches the first setting and the second setting on the basis of the instruction.

In the embodiment, the D2D control is control for monitoring the D2D radio signal. The controller counts a number of times of monitoring of the D2D radio signal. The controller switches the first setting and the second setting when the number of times reaches a threshold value.

A user terminal according to the embodiment is used in a mobile communication system that supports a D2D proximity service. The user terminal comprises: a receiver configured to receive, from the serving cell, first frequency information indicating a frequency that is used in a PLMN selected by the user terminal and is different from a serving cell, and second frequency information indicating a D2D frequency available for the D2D proximity service; and a controller configured to compare the first frequency information and the second frequency information, then identify a D2D frequency used in another PLMN different from the PLMN.

A user terminal according to the embodiment is used in a mobile communication system that supports a D2D proximity service. The user terminal comprises: a receiver configured to receive a frequency list of a D2D frequency available for the D2D proximity service from a cell at a roaming destination; and a controller configured to select a D2D frequency from the frequency list, and control to transmit a request for using the selected D2D frequency to a cell belonging to a PLMN that provides the selected D2D frequency. When the PLMN is not a Forbidden PLMN which the user terminal is not capable of selecting, the controller performs the control to transmit the request.

In the embodiment, when the controller transmits the request and the use of the D2D frequency is thereafter refused, the controller stores at least one of the selected D2D frequency and the PLMN that provides the selected D2D frequency.

In the embodiment, when the user terminal is a public safety terminal that is used for public safety, the controller transmits information indicating that the user terminal is the public safety terminal instead of transmitting the request, and controls to omit the transmission of the request.

In the embodiment, the transmitter transmits the information indicating the D2D period, to the serving cell, when the resource pool for the D2D proximity service is a radio resource pool configured by a radio resource not uniquely assigned to each user terminal in the cell.

A base station according to the embodiment operates a serving cell in which a user terminal exists. The base station comprises: a controller configured to set, to the user terminal, a D2D period during which to perform a D2D operation in which the user terminal directly transmits or receives a D2D radio signal to or from another user terminal, in another frequency different from a frequency of the serving cell. The controller sets the D2D period to the user terminal so that a period during which to perform a reception operation of a radio signal from the base station or another base station does not overlap the D2D period.

A base station according to the embodiment operates a serving cell in which a user terminal exists. The base station comprises: a controller configured to set, to the user terminal, a D2D period during which to perform a D2D operation in which the user terminal directly transmits or receives a radio signal to or from another user terminal, in another frequency different from a frequency of the serving cell. The controller cancels setting the D2D period when a period during which to perform a reception operation of a radio signal from the base station or another base station is set to the user terminal.

A base station according to the embodiment operates a serving cell in which a user terminal exists. The base station comprises: a controller configured to set, to the user terminal, a D2D period during which to perform a D2D operation in which the user terminal directly transmits or receives a radio signal to or from another user terminal, in another frequency different from a frequency of the serving cell. In a period during which a period during which to perform a reception operation of a radio signal from the base station or another base station overlaps the D2D period, the reception operation is prioritized over the D2D operation.

In the embodiment, the period during which to perform the reception operation is at least any one of: a measurement gap in which to measure a radio field intensity from the base station or the other base station; a paging opportunity for receiving a control signal from the base station; and a measurement gap in which to measure a radio field intensity from a cell belonging to the same frequency band as the serving cell.

A user terminal according to the embodiment comprises: a controller configured to perform a D2D operation during which to directly transmit or receive a radio signal to or from another user terminal in another frequency different from a frequency of a serving cell, in a D2D period set from a base station. The controller prioritizes the reception operation over the D2D operation in a period during which a period during which to perform a reception operation of a radio signal from the base station or another base station overlaps the D2D period.

In the embodiment, in the overlapping period, the controller cancels the D2D operation and performs the reception operation.

In the embodiment, the controller omits reception of control information for uplink transmission to the base station in a predetermined period immediately before the D2D period.

In the embodiment, the controller is not requested to receive control information for uplink transmission to the base station in a predetermined period immediately before the D2D period.

In the embodiment, in the D2D period, the controller preferentially performs uplink transmission to the base station over the D2D operation.

In the embodiment, when the user terminal includes a plurality of receivers, the controller performs, in the D2D period, control so as to receive control information from the base station by one receiver out of the plurality of receivers.

A base station according to the embodiment operates a serving cell in which a user terminal exists. The base station comprises: a controller configured to set, to the user terminal, a D2D period during which to perform a D2D operation in which the user terminal directly transmits or receives a D2D radio signal to or from another user terminal, in another frequency different from a frequency of the serving cell. The controller transmits, to the user terminal, information for designating the other frequency by which the D2D operation is preferentially performed in the D2D period.

In the embodiment, when a plurality of other frequencies are present, the controller sets, to the user terminal, the D2D period corresponding to each of the plurality of other frequencies. The D2D period corresponding to each of the plurality of other frequencies does not respectively overlap.

In the embodiment, the controller notifies the user terminal of at least one of information on a priority of a frequency and identification information of a secondary cell set to the user terminal, as the information for designation.

In the embodiment, the controller sets, together with the D2D period, at least one of: information for designating a communication equipment that performs the D2D operation in the D2D period and the information for designating the D2D operation in the D2D period.

In the embodiment, the information for designating the communication equipment is at least one of: identification information of the communication equipment and identification information of a secondary cell set to the user terminal.

First Embodiment

Hereinafter, the first embodiment in a case where contents of the present application is applied to an LTE system will be described.

(System Configuration)

FIG. 1 is a configuration diagram of an LTE system according to an embodiment. As shown in FIG. 1, the LTE system according to the embodiment includes UEs (User Equipments) 100, E-UTRAN (Evolved Universal Terrestrial Radio Access Network) 10, and EPC (Evolved Packet Core) 20.

The UE 100 corresponds to a user terminal. The UE 100 is a mobile communication device and performs radio communication with a connected cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 100 will be described later.

The eNB 200 manages a cell or a plurality of cells and performs radio communication with the UE 100 that establishes a connection with the cell of the eNB 200. The eNB 200, for example, has a radio resource management (RRM) function, a function of routing user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. A network of the LTE system (a LTE network) is configured by the E-UTRAN 10 and the EPC 20. The EPC 20 includes MME (Mobility Management Entity)/S-GW (Serving-Gateway) 300 and OAM (Operation and Maintenance) 400. The MME performs various mobility controls and the like, for the UE 100. The S-GW performs control to transfer user data. The MME/S-GW 300 is connected to the eNB 200 via an S1 interface.

The OAM 400 is a server device managed by an operator and performs maintenance and monitoring of the E-UTRAN 10.

Figure 2:
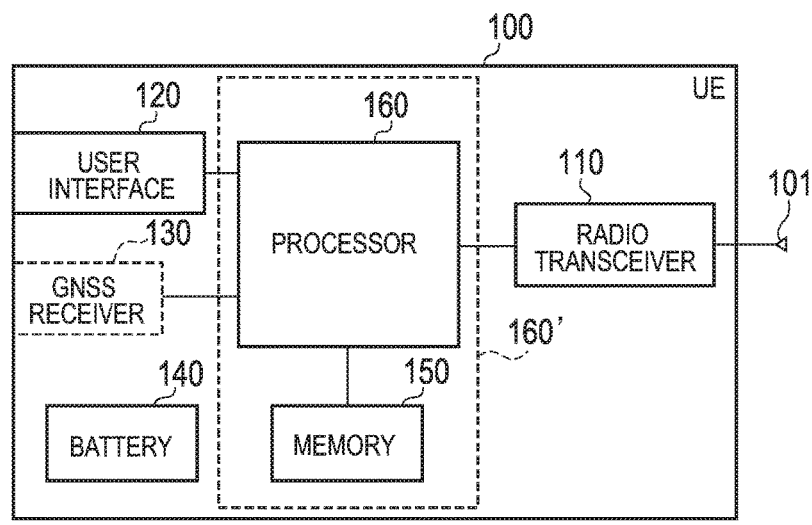
FIG. 2 is a block diagram of a UE.

FIG. 2 is a block diagram of the UE 100. As shown in FIG. 2, the UE 100 includes an antenna 101, a radio transceiver 110, a user interface 120, GNSS (Global Navigation Satellite System) receiver 130, a battery 140, a memory 150, and a processor 160. The memory 150 corresponds to a storage, and the processor 160 corresponds to a controller. The UE 100 may not have the GNSS receiver 130. Furthermore, the memory 150 may be integrally formed with the processor 160, and this set (that is, a chip set) may be a processor 160' constituting the controller.

The antenna 101 and the radio transceiver 110 are used to transmit and receive a radio signal. The radio transceiver 110 converts a baseband signal (a transmission signal) output from the processor 160 into the radio signal, and transmits the radio signal from the antenna 101. Furthermore, the radio transceiver 110 converts a radio signal (a reception signal) received by the antenna 101 into the baseband signal, and outputs the baseband signal to the processor 160. It is noted that the radio transceiver 110 may be configured by a transmitter and a receiver. Further, the UE 100 may include a plurality of radio transceivers 110. The UE 100 may include a plurality of transmitter and may include a plurality of receiver. The transmitter and the receiver may differ in number.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by performing the program stored in the memory 150. The processor 160 may further include a codec that performs encoding and decoding on sound and video signals. The processor 160 executes various processes and various communication protocols described later.

Figure 3:
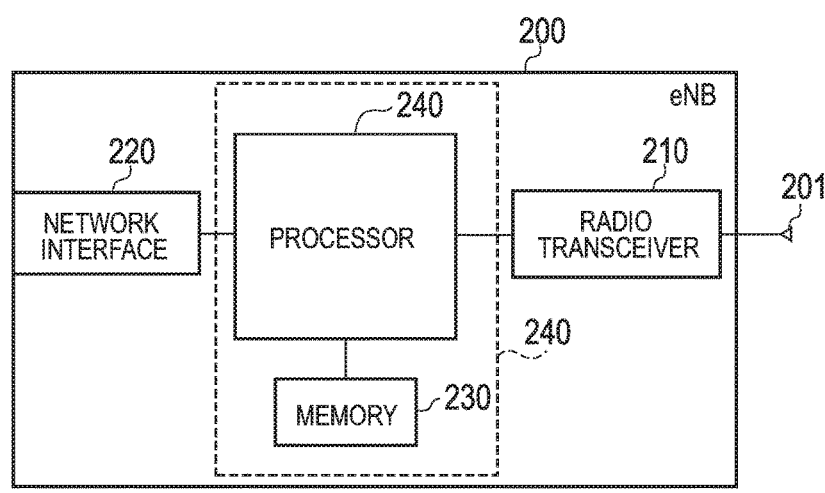
FIG. 3 is a block diagram of an eNB.

FIG. 3 is a block diagram of the eNB 200. As shown in FIG. 3, the eNB 200 includes an antenna 201, a radio transceiver 210, a network interface 220, a memory 230, and a processor 240. It is note that the memory 230 may be integrated with the processor 240, and this set (that is, a chipset) may be a processor 240' constituting the controller.

The antenna 201 and the radio transceiver 210 are used to transmit and receive a radio signal. The radio transceiver 210 converts a baseband signal (a transmission signal) output from the processor 240 into the radio signal, and transmits the radio signal from the antenna 201. Furthermore, the radio transceiver 210 converts a radio signal (a reception signal) received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be performed by the processor 240 and information to be used for a process by the processor 240. The processor 240 includes the baseband processor that performs modulation and demodulation, encoding and decoding and the like on the baseband signal and a CPU that performs various processes by performing the program stored in the memory 230. The processor 240 executes various processes and various communication protocols described later.

Figure 4:
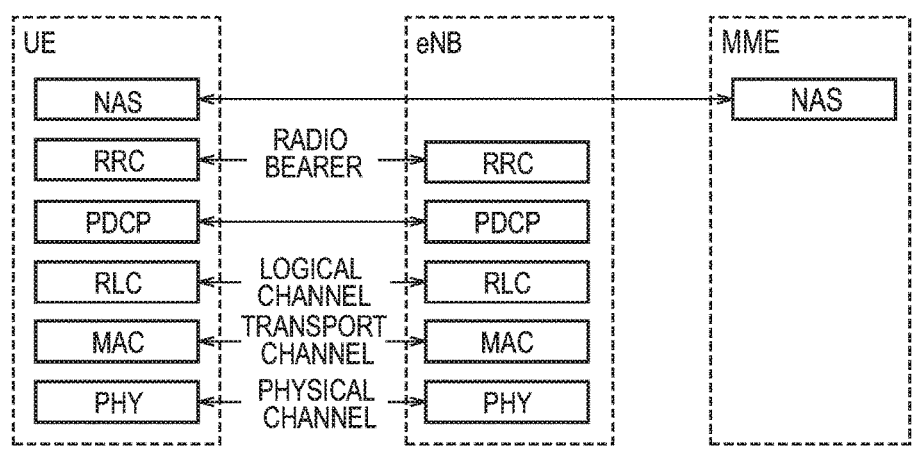
FIG. 4 is a protocol stack diagram.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and a control signal are transmitted through the physical channel.

The MAC layer performs priority control of data, and a retransmission process and the like by hybrid ARQ (HARQ). Between the MAC layer of the UE 100 and the MAC layer of the eNB 200, user data and a control signal are transmitted via a transport channel. The MAC layer of the eNB 200 includes a scheduler to decide (schedule) a transport format of an uplink and a downlink (a transport block size, a modulation and coding scheme) and an allocated resource block to the UE 100.

The RLC layer transmits data to an RLC layer of a reception side by using the functions of the MAC layer and the PHY layer. Between the RLC layer of the UE 100 and the RLC layer of the eNB 200, user data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state, and when the connection is not established, the UE 100 is in an RRC idle state.

NAS (Non-Access Stratum) layer positioned above the RRC layer performs session management, mobility management and the like.

Figure 5:
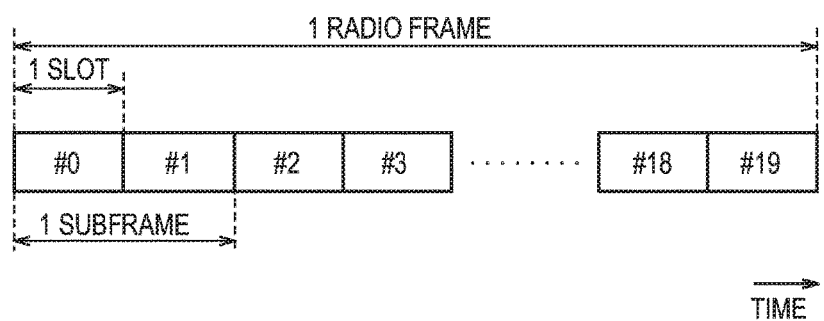
FIG. 5 is a configuration diagram of a radio frame.

FIG. 5 is a configuration diagram of a radio frame used in the LTE system. In the LTE system, OFDMA (Orthogonal Frequency Division Multiple Access) is employed in a downlink (DL), and SC-FDMA (Single Carrier Frequency Division Multiple Access) is employed in an uplink (UL), respectively.

As shown in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A resource element is configured by one subcarrier and one symbol. Among radio resources allocated to the UE 100, a frequency resource is configured by a resource block and a time resource is configured by a subframe (or slot).

(D2D Proximity Service)

A D2D proximity service will be described, below. The LTE system according to an embodiment supports the D2D proximity service. The D2D proximity service is described in Non Patent Document 1, and an outline thereof will be described here.

The D2D proximity service (D2D ProSe) is a service enabling direct UE-to-UE communication within a synchronization cluster including a plurality of synchronized UEs 100. The D2D proximity service includes a D2D discovery procedure (Discovery) in which a proximal UE is discovered and D2D communication (Communication) that is direct UE-to-UE communication. The D2D communication is also called Direct Communication.

A scenario in which all the UEs 100 forming the synchronization cluster are located inside a cell coverage is called "In coverage". A scenario in which all the UEs 100 forming the synchronization cluster are located outside a cell coverage is called "Out of coverage". A scenario in which some UEs 100 in the synchronization cluster are located inside a cell coverage and the remaining UEs 100 are located outside the cell coverage is called "Partial coverage".

In "In coverage", the eNB 200 is a D2D synchronization source, for example. A D2D asynchronization source, from which a D2D synchronization signal is not transmitted, is synchronized with the D2D synchronization source. The eNB 200 that is a D2D synchronization source transmits, by a broadcast signal, D2D resource information indicating a radio resource available for the D2D proximity service. The D2D resource information includes information indicating a radio resource available for the D2D discovery procedure (Discovery resource information) and information indicating a radio resource available for the D2D communication (Communication resource information), for example. The UE 100 that is a D2D asynchronization source performs the D2D discovery procedure and the D2D communication on the basis of the D2D resource information received from the eNB 200. The Communication resource information may include not only information indicating a radio resource available for exchanging data (data resource information), but also information indicating a radio resource available for exchanging a Scheduling Assignment (SA) (SA resource information). The SA is information indicating a location of a time-frequency resource used for receiving data in D2D communication.

In "Out of coverage" or "Partial coverage", the UE 100 is a D2D synchronization source, for example. In "Out of coverage", the UE 100 that is a D2D synchronization source transmits D2D resource information indicating a radio resource available for the D2D proximity service, by a D2D synchronization signal, for example. The D2D synchronization signal is a signal transmitted in the D2D synchronization procedure in which a device-to-device synchronization is established. The D2D synchronization signal includes a D2DSS and a physical D2D synchronization channel (PD2DSCH). The D2DSS is a signal for providing a synchronization standard of a time and a frequency. The PD2DSCH is a physical channel through which more information can be conveyed than the D2DSS. The PD2DSCH conveys the above-described D2D resource information (the Discovery resource information and the Communication resource information). Alternatively, when the D2DSS is associated with the D2D resource information, the PD2DSCH may be rendered unnecessary.

In the D2D discovery procedure, a discovery signal for discovering a proximal terminal (hereinafter, "Discovery signal") is transmitted. Types of the D2D discovery procedure include: a first discovery type (Type 1 discovery) in which a radio resource not uniquely assigned to the UE 100 is used for transmitting the Discovery signal; and a second discovery type (Type 2 discovery) in which a radio resource uniquely assigned to each UE 100 is used for transmitting the Discovery signal. In the second discovery type, a radio resource individually assigned to each transmission of the Discovery signal or a radio resource semi-persistently assigned is used.

Further, modes of the D2D communication include: a first mode (Mode 1) in which the eNB 200 or a relay node assigns a radio resource for transmitting D2D data (D2D data and/or control data); and a second mode (Mode 2) in which the UE 100 itself selects the radio resource for transmitting the D2D data from the resource pool. The UE 100 performs the D2D communication in any mode thereof. For example, the UE 100 in the RRC connected state performs the D2D communication in the first mode, and the UE 100 located out of coverage performs the D2D communication in the second mode.

(Operation According to First Embodiment)

Figure 6:
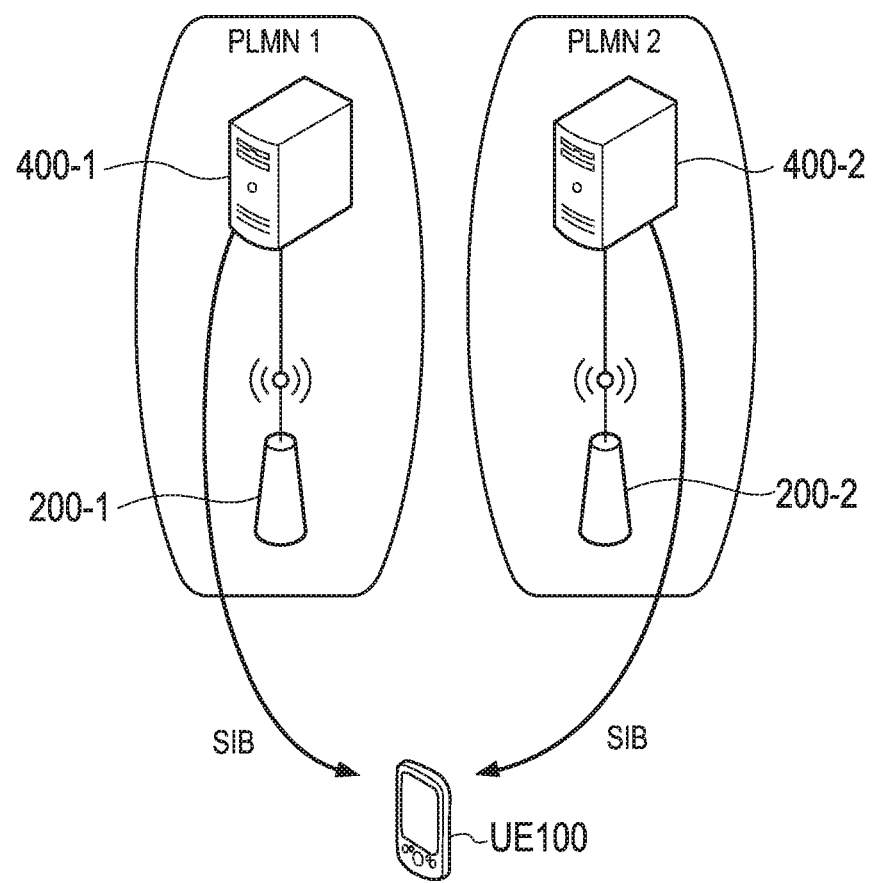
FIG. 6 is an explanation diagram for describing one example of an operation environment according to a first embodiment.
Figure 7:
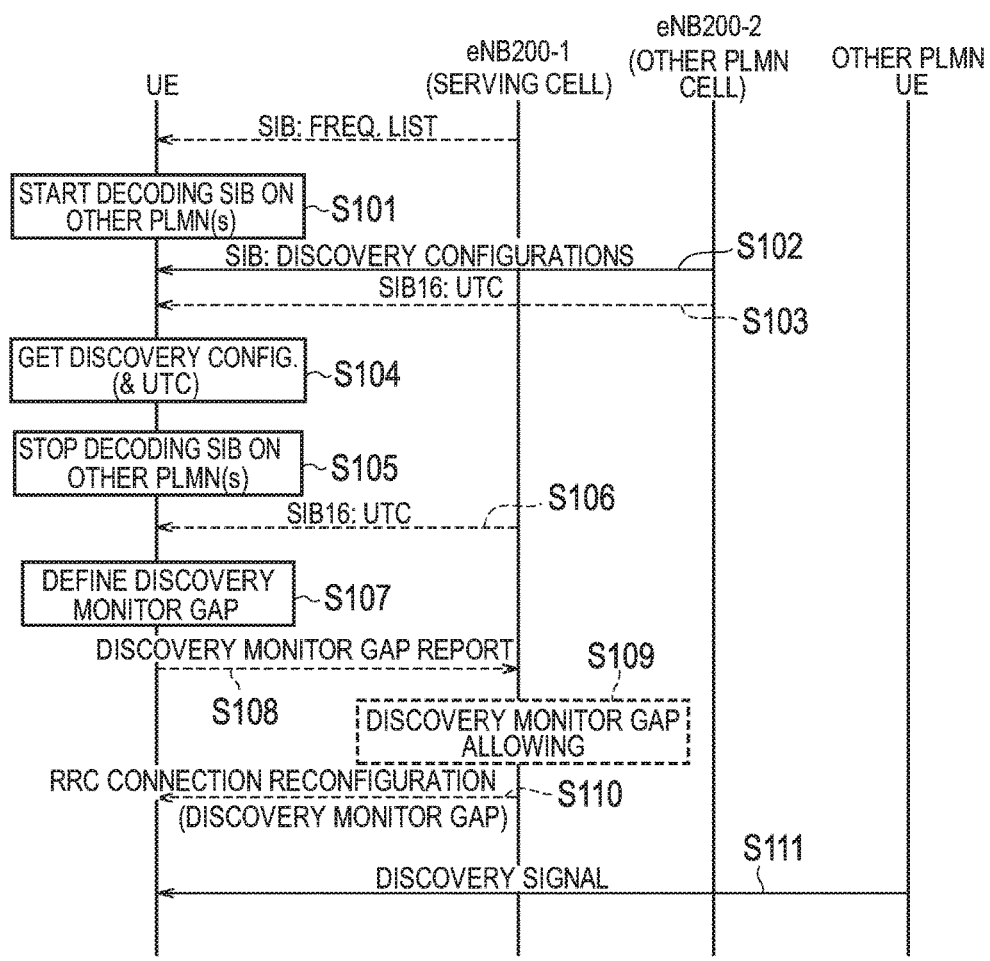
FIG. 7 is a sequence chart for describing one example of an (a UE-based) operation according to the first embodiment.
Figure 8:
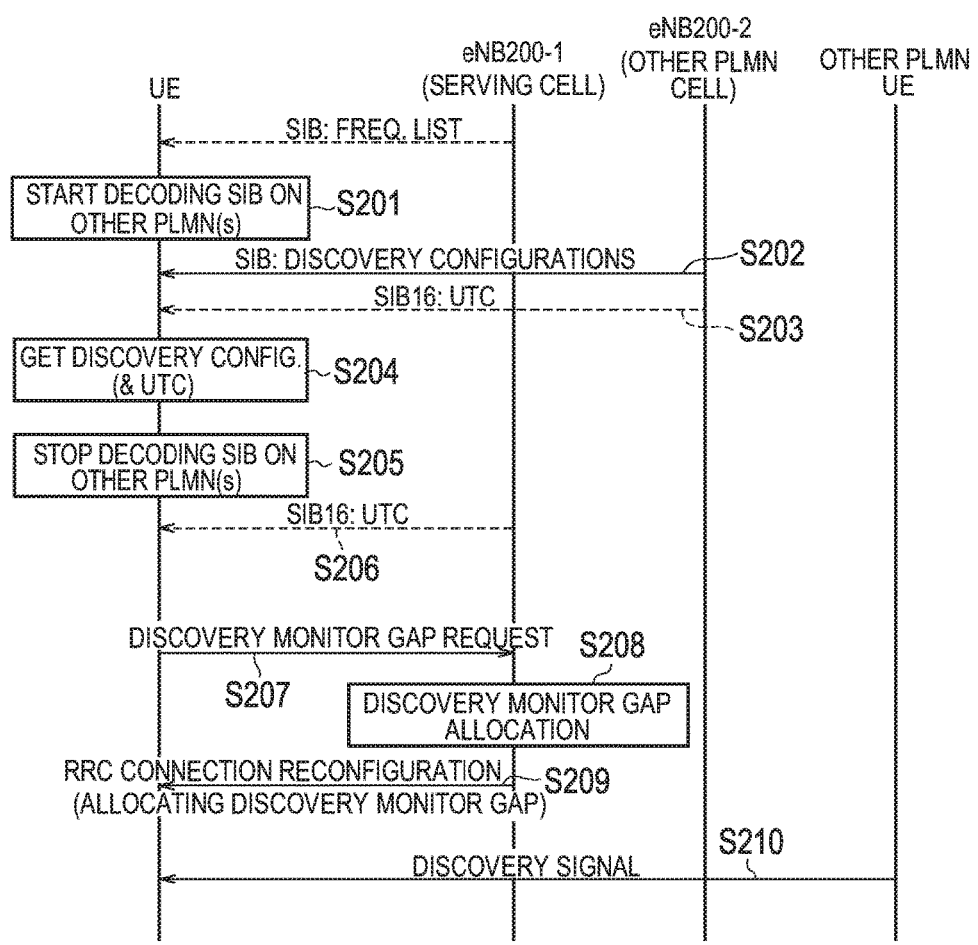
FIG. 8 is a sequence chart for describing one example of an (eNB-based) operation according to the first embodiment.

Next, an operation according to the first embodiment will be described with reference to FIG. 6 and FIG. 7. FIG. 6 is a diagram for describing one example of an operation environment according to the first embodiment. FIG. 7 is a sequence chart for describing one example of an (a UE-based) operation according to the first embodiment. FIG. 8 is a sequence chart for describing one example of an (eNB-based) operation according to the first embodiment.

The operation according to the first embodiment includes (A) UE-based operation and (B) eNB-based operation.

(A) UE-Based Operation

The UE-based operation will be described with reference to FIG. 6 and FIG. 7.

As shown in FIG. 6, an eNB 200-1 is included in a first PLMN that is the LTE network of a network operator 1. The UE 100 is located within the coverage of a first cell managed by the eNB 200-1. Hereinafter, an operation of the eNB 200-1 may be substituted by an operation of the first cell. Further, the first PLMN includes a first server 400-1 that holds a D2D frequency list of a frequency supporting the D2D discovery procedure.

An eNB 200-2 is included in a second PLMN that is the LTE network of a network operator 2. The UE 100 is located within the coverage of a second cell managed by the eNB 200-2. The second cell is a neighbor cell of the first cell and is operated in a frequency different from a frequency of the first cell. Hereinafter, an operation of the eNB 200-2 may be substituted by an operation of the second cell. Further, the second PLMN includes a second server 400-2 that holds the D2D frequency list of the frequency supporting the D2D discovery procedure.

The UE 100 camps on the first cell and registers its location in the first PLMN. That is, the UE 100 belongs to the first PLMN. For example, the UE 100 is in the RRC idle state in the first cell. Alternatively, the UE 100 may be in the RRC connected state in the first cell. The first cell is a serving cell of the UE 100.

The first server 400-1 may, via the eNB 200-1, notify the UE 100 of the D2D frequency list held by the first server 400-1. The eNB 200-1 is capable of transmitting the list to the UE 100 by an SIB (See "SIB: Freq. list" in FIG. 7).

Likewise, the second server 400-2 may notify the eNB 200-2 of the D2D frequency list held by the second server 400-2. The eNB 200-2 may transmit the D2D frequency list by the SIB, and the UE 100 may receive the D2D frequency list transmitted from the eNB 200-2.

Further, the first server 400-1 and the second server 400-2 may exchange the lists they hold. Then, the first server 400-1 may notify the UE 100 of not only the D2D frequency list in the first PLMN but also the D2D frequency list in the second PLMN. Alternatively, the first server 400-1 may notify the UE 100 of the D2D frequency list in the first PLMN that is updated on the basis of the D2D frequency list in the second PLMN. Alternatively, the eNB 200-1 and the eNB 200-2 exchange the D2D frequency lists, and then the eNB 200-1 may notify the UE 100 of the D2D frequency list in the second PLMN.

In such an operation environment, the following operation is performed.

As shown in FIG. 7, in step S101, the UE 100 receives the SIB from another cell, and starts an operation of decoding the received SIB. The UE 100 may monitor (receive) a frequency included in the D2D frequency list in the second PLMN received from the eNB 200-1.

In step S102, the eNB 200-2 transmits setting information including the Discovery resource information by an SIB 18. The Discovery resource information indicates the radio resource available for the D2D discovery procedure, and at least indicates a reception resource pool. The setting information is used by a UE that camps in the second cell to set a reception resource pool (and a transmission resource pool) used for the D2D discovery procedure.

In step S103, the eNB 200-2 may transmit a UTC (Coordinated Universal Time) indicating a time set in the second PLMN by an SIB 16.

In step S104, the UE 100 acquires setting information by decoding an SIB received from the eNB 200-2 (the second cell that is a cell in another PLMN). The UE 100 may acquire a UTC from the eNB 200-2.

In step S105, the UE 100 receives an SIB from a cell in another PLMN, and stops the operation of decoding the received SIB.

In step S106, the eNB 200-1 may transmit an UTC (Coordinated Universal Time) indicating a time set in the first PLMN by the SIB 16.

In step S107, the UE 100 determines, on the basis of the Discovery resource information from the eNB 200-2, a monitor gap (Discovery Moniter Gap) that is a period during which a Discovery signal in another frequency is monitored.

The UE 100 knows a D2D frequency available for the D2D discovery procedure in the second PLMN when the UE 100 acquires the D2D frequency list in the second PLMN. Further, the UE 100 is capable of identifying a location in a time direction and a frequency direction of the reception resource pool by the Discovery resource information from the eNB 200-2. Thus, the UE 100 is capable of appropriately determining the monitor gap, on the basis at least of the Discovery resource information.

The UE 100 may determine a plurality of kinds of monitor gaps. For example, the UE 100 may determine a monitor gap that is set when the UE 100 is in the RRC idle state (hereinafter, "Gap for IDLE") and a monitor gap that is set when the UE 100 is in the RRC connected state (hereinafter, "Gap for CONNECTED"). For example, a cycle of Gap for IDLE is shorter than a cycle of Gap for CONNECTED.

The UE 100 may determine the monitor gap on the basis of a predetermined reference value of the first PLMN, in consideration of a shift in time between the first PLMN and the second PLMN. The predetermined reference value may be an SFN (System Frame Number) or the UTC. For example, when an SFN of the first PLMN is used as a reference, the UE 100 calculates, as an offset value, a shift in time (SFN 1 of the first PLMN–SFN 2 of the second PLMN) between the SFN of the first PLMN and an SFN of the second PLMN that is the same value as the SFN of the first PLMN.

Further, when a communication period in which a communication operation, that is, a transmission operation of an uplink signal to the eNB 200-1 or a reception operation of a downlink signal from the eNB 200-1, is performed and the monitor gap overlap in the time direction, the UE 100 performs one of a communication operation or a monitoring of the Discovery signal in another frequency in accordance with a predetermined order of priority. An example of the order of priority will be described, below. Hereinafter, "monitoring of the Discovery signal in another frequency" will be abbreviated as "monitoring of the Discovery signal" where appropriate.

Each order of priority may be combined where appropriate. Further, the eNB 200-1 may instruct the order of priority.

Firstly, cellular communication is prioritized over the monitoring of the Discovery signal. In this case, cellular communication is performed when the cellular communication (exchanging data or a control signal) is scheduled.

Secondly, the order of priority is determined on the basis of information indicating a capability of the UE 100 (UE Capability) relating to communication with the plurality of cells including the serving cell. For example, the order of priority is determined on the basis of a Carrier Aggregation (CA) capability. When the UE 100 has the CA capability, the first priority operation is communication with a primary cell (PCell) that provides predetermined information when the UE 100 starts an RRC connection. The second priority operation is the monitoring of the Discovery signal in another frequency. The third priority operation is communication with a secondary cell (SCell) that is an auxiliary serving cell paired with the primary cell.

It is noted that in the CA, a carrier (a frequency band) in the LTE is positioned as a component carrier, and the UE 100 performs communication by simultaneously using a plurality of component carriers (a plurality of serving cells).

Further, for example, the order of priority is determined on the basis of a dual connectivity scheme (Dual Connectivity: DC) capability. When the UE 100 has the DC capability, the first priority operation is communication with a cell managed by a master eNB (MeNB). The second priority operation is the monitoring of the Discovery signal in another frequency. The third priority operation is communication with a cell managed by a secondary eNB (SeNB).

It is noted that in the DC, of a plurality of eNBs 200 that establish connection with the UE 100, only the master eNB establishes an RRC connection with the UE 100. On the other hand, of the plurality of eNBs 200, the secondary eNB provides an additional radio resource to the UE 100 without establishing an RRC connection with the UE 100.

Thirdly, the order of priority is determined on the basis of whether it is a period in which the receiver is activated (hereinafter, "On duration") or a period in which the receiver is stopped (hereinafter, "Off duration"), in a discontinuous reception (DRX) mode where the receiver (a receiver of the radio transceiver 110) that receives the downlink signal is activated discontinuously.

In the Off duration, the first priority operation is a stop operation of the receiver, and the second priority operation is the monitoring of the Discovery signal. That is, the monitoring of the Discovery signal is not performed in the Off duration, but performed only in the On duration. As a result, it is possible to restrain an increase in power consumption of the UE 100 since the DRX operation is not interrupted by the monitoring of the Discovery signal.

Alternatively, in the On duration, the first priority operation is an activate operation of the receiver, and the second priority operation is the monitoring of the Discovery signal. That is, the monitoring of the Discovery signal is not performed in the On duration, but performed only in the Off duration. As a result, the eNB 200-1 is capable of appropriately controlling the UE 100 since the reception operation of the cellular communication is not interrupted by the monitoring of the Discovery signal.

It is noted that this operation and an operation of the second embodiment described later may be combined where appropriate.

Alternatively, when the UE 100 is in a discontinuous reception mode, the first priority operation is a discontinuous reception operation, and the second priority operation is the monitoring of the Discovery signal. That is, the monitoring of the Discovery signal is not performed when the UE 100 is in the discontinuous reception mode. As a result, it is possible to restrain an increase in power consumption of the UE 100.

Fourthly, the order of priority is determined on the basis of whether the UE 100 is in the RRC idle state or in the RRC connected state. For example, when the UE 100 is in the RRC idle state, the first priority operation is the monitoring of the Discovery signal, and the second priority operation is an operation for the cellular communication. On the other hand, when the UE 100 is in the RRC connected state, the first priority operation is the operation for the cellular communication, and the second priority operation is the monitoring of the Discovery signal.

Fifthly, when the UE 100 monitors the Discovery signal on the basis of a resource pool of another kind of the Discovery signal, the order of priority is determined on the basis of a setting value of the resource pool of Discovery signal. For example, the order of priority is determined on the basis of a size of the resource pool and a cycle in the time direction of the resource pool. Specifically, the monitoring of the Discovery signal in a small-size resource pool is prioritized over the monitoring of the Discovery signal in a large-size resource pool. Alternatively, the monitoring of the Discovery signal in a resource pool of a short cycle in the time direction is prioritized over the monitoring of the Discovery signal in a resource pool of a long cycle in the time direction.

Moreover, the order of priority is determined on the basis of a relationship between a frequency of the serving cell of the UE 100 and another frequency used for monitoring the Discovery signal. For example, the first priority operation is the monitoring of the Discovery signal in a frequency of the serving cell (Intra-frequency). The second priority operation is the monitoring of the Discovery signal in a frequency that is different from the frequency of the serving cell and is of another PLMN different from the first PLMN (Inter-frequency & Intra-PLMN). The third priority operation is the monitoring of the Discovery signal in a frequency of another PLMN different from the first PLMN (Inter-frequency & Inter-PLMN).

Sixthly, the order of priority is determined on the basis of whether or not the UE 100 performs a handover procedure of changing the serving cell in the RRC connected state. When the UE 100 performs the handover procedure, the first priority operation is an operation in the handover procedure, and the second priority operation is the monitoring of the Discovery signal. It is noted that a reference of starting the handover procedure here may be a time point at which a measurement report of a radio situation is transmitted, a time point at which the UE 100 receives a radio resource assignment of the downlink for the handover from the eNB 200-1, or a time point at which the UE 100 receives RRC connection re-setting information for the handover from the eNB 200-1.

Seventhly, the order of priority is determined on the basis of whether or not a trigger condition of the measurement report of a radio situation of the UE 100 is satisfied. For example, only when the trigger condition is not satisfied, the first priority operation is the monitoring of the Discovery signal. Therefore, when the trigger condition is satisfied, the monitoring of the Discovery signal is not performed.

Eighthly, the order of priority is determined on the basis of information of another UE that desires to be discovered. It is noted that the UE 100 determines the order of priority on the basis of information of another UE such as PLMN information selected by another UE and a cell identifier.

The UE 100 performs one of the communication operation or the monitoring of the Discovery signal in another frequency in accordance with at least any one of the above-described orders of priority.

In step S108, the UE 100 transmits, to the serving cell (the eNB 200-1), a monitor gap report (Discovery Monitor Gap Report) that includes information indicating a determined monitor gap.

The information indicating the monitor gap may be a start/terminate subframe of the monitor gap, or a bit map of a subframe pattern of the monitor gap. The information indicating the monitor gap may include information indicating the number of times that the subframe pattern is repeated. Further, the information indicating the monitor gap may be information indicating the monitor gap that reflects the offset value. Alternatively, when the information indicating the monitor gap is information indicating the monitor gap that does not reflect the offset value, the monitor gap report may include information indicating the offset value calculated in step S107.

Further, when the monitor gap report includes information indicating a plurality of monitor gaps, the monitor gap report may include information indicating a priority of the monitor gap. It is possible to determine, on the basis of the information of another UE that desires to be discovered, for example, the priority of the monitor gap.

On the other hand, the eNB 200-1 receives the monitor gap report, and stores the monitor gap of the UE 100. The eNB 200-1 that receives the monitor gap report is capable of knowing the monitor gap of the UE 100. As a result, in the monitor gap, it is possible to control not to assign a radio resource for the cellular communication to the UE 100 and not to perform a paging, and thus, it is possible to effectively utilize the radio resource for the cellular communication.

In step S109, the eNB 200-1 may determine, on the basis of the monitor gap report, whether or not to allow the monitor gap. When the eNB 200-1 is not capable of allowing the monitor gap, the eNB 200-1 is capable of allowing a partial period of the monitor gap. Alternatively, when there are the plurality of monitor gaps, the eNB 200-1 is capable of allowing some monitor gaps. For example, of the monitor gap, the eNB 200-1 allows a period that does not overlap with a period in which a radio resource is assigned to the UE 100.

In step S110, the eNB 200-1 transmits information indicating the allowed monitor gap.

It is noted that steps S108 to S110 may be omitted.

The UE 100 sets the determined monitor gap (or, the allowed monitor gap), and monitors the Discovery signal in another frequency.

In step S111, another UE selecting the second PLMN (Other PLMN UE) transmits the Discovery signal. By monitoring the Discovery signal, the UE 100 receives the Discovery signal and discovers another UE.

Thereafter, the UE 100 cancels the setting of the monitoring of the Discovery signal and terminates the monitoring of the Discovery signal. The UE 100 transmits information indicating the setting cancellation of the monitor gap (Discovery Monitor Gap Cancel) to the eNB 200-1. The eNB 200-1 that receives the information deletes the stored monitor gap of the UE 100. As a result, the eNB 200-1 is capable of restraining limitation of assignment of the radio resource for the cellular communication also when the monitor gap is not set to the UE 100.

It is noted that the setting cancellation of the monitor gap may be performed by deactivating the monitor gap or by resetting the setting of the monitor gap.

(B) eNB-Based Operation

Next, the eNB-based operation will be described with reference to FIG. 6 and FIG. 8. It is noted that description similar to that of the UE-based operation is omitted where appropriate.

As shown in FIG. 8, steps S201 to S206 correspond to steps S101 to S106.

In step S207, the UE 100 transmits a monitor gap request (Discovery Monitor Gap Request). The monitor gap request is to request the eNB 200-1 to set a period during which the Discovery signal in another frequency is monitored.

The monitor gap request includes the Discovery resource information (at least information on the reception resource pool) included in the setting information acquired in step S204. Therefore, the eNB 200-1 receives Discovery resource information in another PLMN (the second PLMN) different from the first PLMN. Thus, even when, between the eNB 200-1 in the first PLMN and the eNB 200-2 in the second PLMN, the Discovery resource information is not capable of being exchanged, the eNB 200-1 is capable of acquiring the Discovery resource information in another PLMN.

The UE 100 may include the Discovery resource information as is into the monitor gap request. Alternatively, of a Discovery resource pool indicated by the Discovery resource information, the UE 100 may include a partial Discovery resource pool into the monitor gap request. The UE 100 is capable of determining a partial Discovery resource pool in accordance with the above-described order of priority.

The monitor gap request may include any one of the information (for example, the information indicating the UE Capability) that is used for determining the above-described order of priority. Further, the monitor gap request may include information indicating the priority that is used for prioritizing a partial Discovery resource pool or for prioritizing a predetermined Discovery resource pool out of a plurality of kinds of Discovery resource pools.

In step S208, the eNB 200-1 assigns the monitor gap to the UE 100 in response to a reception of the monitor gap request. Specifically, similarly to the UE 100 in step S107, the eNB 200-1 determines (sets) the monitor gap of the UE 100 on the basis of the Discovery resource pool acquired from the UE 100.

In step S209, the eNB 200-1 transmits, to the UE 100, setting information (for example, RRCConnectionReconfiguration) that includes information indicating an assigned monitor gap (allocating Discovery Monitor Gap), as a response to the monitor gap request. The UE 100 sets the monitor gap included in the received setting information, and monitors the Discovery signal in another frequency.

Step S210 corresponds to step S111.

It is noted that when canceling the setting of the monitor gap, the eNB 200-1 transmits the information indicating the setting cancellation of the monitor gap to the UE 100. The eNB 200-1 may transmit, to the UE 100, the information indicating the setting cancellation of the monitor gap, in response to a request from the UE 100. The UE 100 cancels the setting of the monitor gap on the basis of the information.

(Conclusion)

As a result of the above-described UE-based operation or eNB-based operation, it is possible to appropriately set the monitor gap. Consequently, it is possible to prevent the UE 100 from failing to perform exchanging on the basis of HARQ retransmission, from failing to perform exchanging of ACK/NACK, from failing to transmit a previously set cyclic CSI, or from failing to receive the paging, because of the monitoring of the discovery signal in another frequency. Further, it is possible to prevent the eNB 200 from assigning, to the UE 100, a wasteful radio source that the UE 100 is not capable of exchanging.

Second Embodiment

Figure 9:
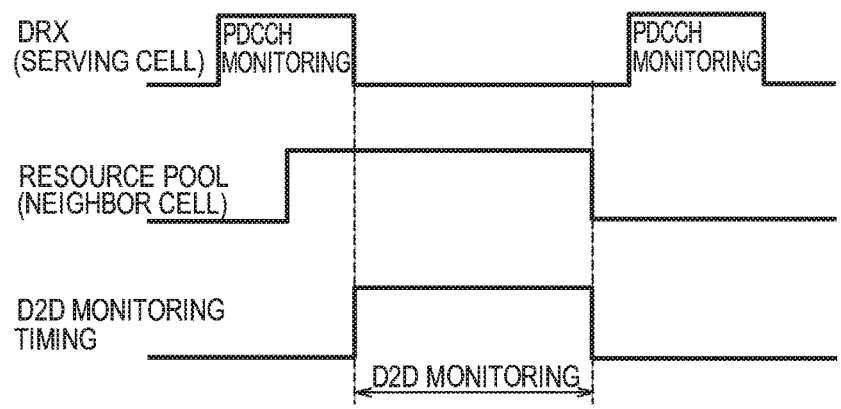
FIG. 9 is a diagram for describing a period of monitoring a Discovery signal according to a second embodiment.
Figure 10:
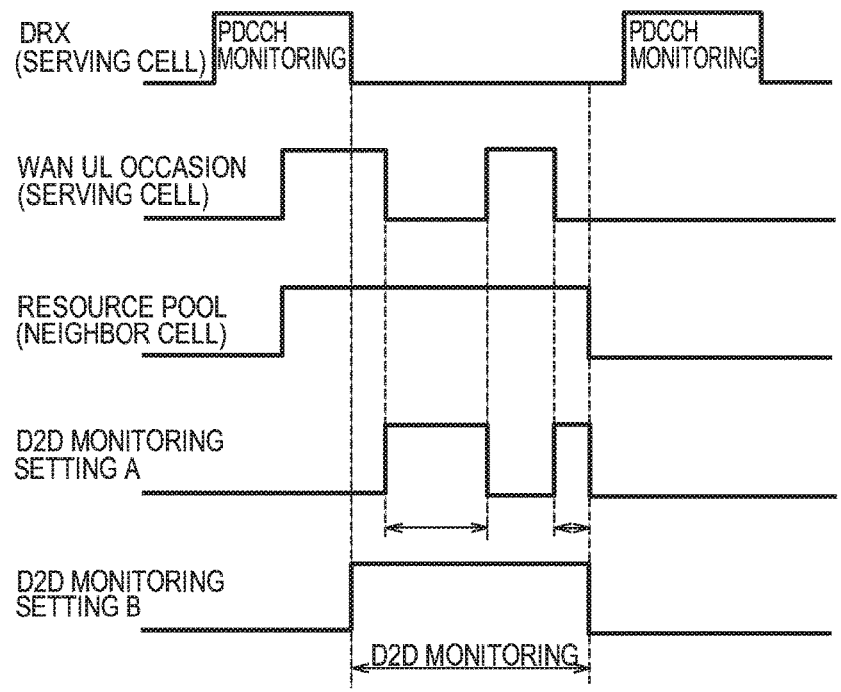
FIG. 10 is a diagram for describing the period of monitoring the Discovery signal according to the second embodiment.

Next, the second embodiment will be described with reference to FIG. 9 to FIG. 12. FIG. 9 and FIG. 10 are diagrams for describing a period of monitoring the Discovery signal according to the second embodiment. FIG. 11 is a sequence chart for describing one example of an operation according to the second embodiment. FIG. 12 is a diagram for describing a control signal according to the second embodiment.

In the above-described first embodiment, the monitor gap is set. In the second embodiment, the monitor gap is not set, and the UE 100 monitors the Discovery signal in another frequency only in an Off duration of the discontinuous reception mode. Since the eNB 200 grasps at least the Off duration of the UE 100, the eNB 200 is capable of avoiding to assign, to the UE 100, a wasteful radio resource that the UE 100 is not capable of exchanging.

(Monitoring Period)

A monitoring period (monitoring time) during which the UE 100 monitors the Discovery signal in another frequency will be described.

As shown in FIG. 9, the UE 100 monitors the Discovery signal in another frequency only in an Off duration. The UE 100 does not monitor the Discovery signal all the time in the Off duration, but monitors the Discovery signal only during the monitoring period in the Off duration. Here, the monitoring period is a period during which a period in which a Discovery resource pool (at least, a reception resource pool) of a neighbor cell operated in another frequency different from the frequency of the serving cell is arranged (hereinafter, a "resource pool period") and the Off duration overlap in the time direction.

Further, as shown in FIG. 10, the UE 100 may switch to any one of a plurality of settings, that is, operation settings in the Off duration, to monitor the Discovery signal. The plurality of settings are defined in accordance with a different order of priority of the operation. For example, it is assumed that a first setting (D2D monitoring Setting A) and a second setting (D2D monitoring Setting B) are previously set (pre-configured) to the UE 100. In the first setting, the first priority operation is a transmission of an uplink signal to the serving cell that occurs in the Off duration, and the second priority operation is the monitoring of the Discovery signal. Therefore, the monitoring period in the first setting is a period during which a period, of the Off duration, not transmitting the uplink signal and the resource pool period overlap. On the other hand, in the second setting, the first priority operation is the monitoring of the Discovery signal, and the second priority operation is the transmission of an uplink signal. Therefore, the monitoring period in the second setting is the resource pool period of the Off duration, and is same as the monitoring period in FIG. 9.

Incidentally, in the Off duration of the discontinuous reception mode, only a reception of a PDCCH is exempted. Therefore, the transmission of an uplink signal may occur in the Off duration of the discontinuous reception mode. By switching to any one of the plurality of settings, it is possible to restrain a decrease in occasions of monitoring the Discovery signal. Alternatively, it is possible to restrain a decrease in occasions of transmitting the uplink signal. That is, since the UE 100 is capable of switching the first setting and the second setting, it is possible to solve a problem that only one operation (for example, the transmission of an uplink signal) is performed and only the other operation (for example, the monitoring of the Discovery signal) is not performed. In other words, it is possible to establish a favorable balance between the transmission of an uplink signal and the monitoring of the Discovery signal.

Further, the UE 100 may switch the first setting and the second setting when the number of times of monitoring of the Discovery signal in another frequency reaches a threshold value. A specific operation will be described with reference to FIG. 11.

As shown in FIG. 11, in step S301, the UE 100 applies the first setting (Setting A) as a default.

In step S302, the UE 100 counts the number of times (occasions) of monitoring of the Discovery signal. It is noted that the number of times in the present embodiment is the number of times per a unit time. Further, the UE 100 may count the number of times of transmission of an uplink signal instead of the number of times of monitoring of the Discovery signal.

In step S303, the UE 100 determines that the number of times counted (N) reaches a first threshold value ($N_{thresh-A}$), that is, the number of times counted is equal to or less than the first threshold value.

In step S304, the UE 100 transmits, to the eNB 200 (serving cell), control information indicating a switching from the first setting to the second setting.

The UE 100, for example, transmits the information to the eNB 200 by MAC Control Element (MAC CE). In this case, as shown in FIG. 12, when the control information (D) is "0", it indicates a switching to the first setting (that is, applying the first setting). When the control information (D) is "1", it indicates a switching to the second setting (that is, applying the second setting).

Alternatively, the UE 100 may transmit the control information by a PUCCH or a PUSCH. In this case, a new format for the control information may be defined. Alternatively, the UE 100 may transmit the control information by an RRC signaling.

In step S305, the UE 100 switches from the first setting to the second setting. Further, the eNB 200 that receives the control information from the UE 100 switches from the first setting to the second setting.

In step S306, similarly to step S302, the UE 100 starts counting the number of times of monitoring of the Discovery signal.

In step S307, the UE 100 determines that the number of times counted (N) reaches a second threshold value ($N_{thresh-B}$), that is, the number of times counted is equal to or more than the second threshold value.

In step S308, similarly to step S304, the UE 100 transmits, to the eNB 200, the control information indicating a switching from the second setting to the first setting.

In step S309, similarly to step S305, the UE 100 switches from the second setting to the first setting. Further, the eNB 200 that receives the control information from the UE 100 switches from the second setting to the first setting.

Then, the operation in step S302 is performed.

It is noted that the UE 100 may stop control of switching the first setting and the second setting, and monitor the Discovery signal in one of the settings. In this case, the UE 100 is capable of transmitting, to the eNB 200, the control information indicating the stop of switching control. Alternatively, the eNB 200 may transmit, to the UE 100, control information for stopping the control of switching the first setting and the second setting.

Alternatively, the UE 100 may switch in accordance with an instruction from the eNB 200, instead of switching of its own accord. Specifically, the UE 100 may switch the first setting and the second setting on the basis of the instruction to switch the first setting and the second setting from the eNB 200. This enables the eNB 200 to control the operation of the UE 100, thus it is possible to effectively assign a radio resource for the cellular communication to the UE 100.

In this case, the eNB 200 counts the number of times of reception of an uplink signal from the UE 100. Alternatively, the eNB 200 may count (calculate) the number of times of monitoring of the Discovery signal on the basis of the number of times of reception of an uplink signal.

Further, the eNB 200 is capable of giving the switching instruction by control information as shown in FIG. 12. When the switching instruction indicates "0", the UE 100 switches to the first setting (that is, starts the application of the first setting). When the switching instruction indicates "1", the UE 100 switches to the second setting (that is, starts the application of the second setting).

Third Embodiment

Next, a third embodiment will be described using FIG. 13 and FIG. 14. FIG. 13 is a sequence chart for describing one example of an (a UE-based) operation according to the third embodiment. FIG. 14 is a sequence chart for describing one example of an (eNB-based) operation according to the first embodiment.

In the above-described first embodiment, the monitor gap is set. In the third embodiment, an announcing gap is set. It is noted that description of parts similar to the first embodiment will be omitted where appropriate.

(Operation According to Third Embodiment)

An operation according to the third embodiment includes (A) UE-based operation and (B) eNB-based operation.

(A) UE-Based Operation

The UE-based operation will be described using FIG. 13. It is noted that the operation environment is similar to that in the first embodiment.

In FIG. 13, steps S401 to 406 correspond to steps S101 to 106.

It is noted that in step S402, setting information including the Discovery resource information, transmitted by the eNB 200-2, is used by the UE that camps in the second cell to set a transmission resource pool (and/or a reception resource pool) holding a radio resource used for the D2D discovery procedure. The transmission resource pool may be a radio resource pool (Type 1 discovery resource) holding a radio resource not uniquely assigned to each UE 100 in the second cell.

In step S407, the UE 100 determines, on the basis of the Discovery resource information from the eNB 200-2, an announcing gap (Discovery Announcing Gap) that is a period or a timing for announcing (that is, transmitting) a Discovery signal (D2D discovery signal) in another frequency.

The UE 100 knows a D2D frequency available for the D2D discovery procedure in the second PLMN when the UE 100 acquires the D2D frequency list in the second PLMN. Further, the UE 100 is capable of identifying a location of the transmission resource pool in the time direction and the frequency direction by the Discovery resource information from the eNB 200-2. Thus, the UE 100 is capable of appropriately determining the announcing gap, on the basis at least of the Discovery resource information.

The UE 100 may determine a plurality of kinds of announcing gaps in much the same way as in the above-described monitor gap. Examples of the plurality of kinds of announcing gaps include an announcing gap (Announcing-Gap for IDLE) set when the UE 100 is in an RRC idle state and an announcing gap (AnnouncingGap for CONNECTED) set when the UE 100 is in an RRC connected state. Further, the UE 100 may determine the announcing gap on the basis of a predetermined reference value of the first PLMN in consideration of a shift in time between the first PLMN and the second PLMN.

Further, the UE 100 is capable of performing, in accordance with a predetermined order of priority, one of a communication operation or an announcement of the Discovery signal in another frequency when a communication period in which a communication operation, that is, a transmission operation of an uplink signal to the eNB 200-1 or a reception operation of a downlink signal from the eNB 200-1, is performed and the announcing gap overlap in the time direction. The UE 100 may perform either one of the operations when there is only one radio transceiver 110. It is noted that a predetermined order of priority is similar to a predetermined order of priority of the above-described first embodiment.

In step S408, the UE 100 transmits, to the serving cell (eNB 200-1), an announcing gap report (Discovery Announcing Gap Report) including the information indicating the determined announcing gap. The UE 100 may transmit, as the announcing gap report, a side link UE information (SidelinkUEInformation) message including the information indicating the announcing gap, to the serving cell (eNB 200-1). It is noted that the side link UE information message is a message used for notifying the eNB 200 of information (side link information) on an interest in the D2D proximity service (for example, an interest in transmission or reception of the D2D communication signal and an interest in transmission or reception of the D2D discovery signal).

Further, upon determination of an announcing period on the basis of the radio resource pool (Type 1 discovery resource) configured by a radio resource not uniquely assigned to each UE 100 in the second cell, the UE 100 may transmit the announcing gap report to the serving cell. In this case, the announcing period is in a period of the Type 1 discovery resource.

It is noted that the information indicating the announcing gap is configured similarly to the information indicating the above-described monitor gap, and the announcing gap report may be configured similarly to the above-described monitor gap report.

On the other hand, the eNB 200-1 receives the announcing gap report from the UE 100, and stores the announcing gap of the UE 100. The eNB 200-1 that receives the announcing gap report is capable of knowing the announcing gap of the UE 100 (timing at which the UE 100 announces the Discovery signal). As a result, the eNB 200-1 is capable of controlling so that the radio resource of the cellular communication (in particular, the uplink radio resource) is not assigned to the UE 100, in the announcing gap. That is, the eNB 200-1 is capable of controlling so that the radio resource of the cellular communication (in particular, the uplink radio resource) at a timing overlapping the announcing gap is not assigned to the UE 100. This permits an effective use of the radio resource for cellular communication. Therefore, it is possible to achieve both the cellular communication and the proximity service (Discovery).

In step S409, the eNB 200-1 may determine on the basis of the announcing gap report whether or not to allow the announcing gap. The eNB 200-1 can allow a partial period of the announcing gap when it is not possible to allow all the periods of the announcing gap based on the announcing gap report. Alternatively, the eNB 200-1 can allow some announcing gaps when there are a plurality of announcing gaps based on the announcing gap report. For example, the eNB 200-1 allows a partial period not overlapping a period in which a radio resource (for example, an uplink radio resource) is assigned to the UE 100, out of all the periods of the announcing gap based on the announcing gap report.

In step S410, the eNB 200-1 transmits the information indicating the allowed announcing gap. Here, the allowed announcing gap may be an announcing gap in all periods of the announcing gaps based on the announcing gap report, in a partial period thereof, or a part thereof.

It is noted that steps S408 to S410 may be omitted.

In step S411, the UE 100 sets the determined announcing gap (or the allowed announcing gap). The UE 100 announces (transmits) the Discovery signal in another frequency, in the set announcing gap. The other UE (Other PLMN UE) that selects the second PLMN receives the Discovery signal from the UE 100 to discover the UE 100. Thus, even when the serving cell does not know the time-frequency resource (hereinafter, "D2D time-frequency resource") used for transmitting the Discovery signal (D2D discovery signal) in another frequency, the UE 100 announces the Discovery signal, in the announcing gap based on the Discovery resource information from the eNB 200-2, and thus, the UE 100 is capable of appropriately announcing the Discovery signal. Further, even when a time synchronization between the serving cell and the cell in the other frequency is shifted, the UE 100 announces the Discovery signal in the announcing gap based on the Discovery resource information from the eNB 200-2, and thus, another UE that exists in another cell operated in another frequency is capable of appropriately monitoring the Discovery signal.

Thereafter, the UE 100 cancels the setting of the announcing gap of the Discovery signal and ends announcing the Discovery signal. The UE 100 transmits information indicating the setting cancellation of the announcing gap (Discovery Announcing Gap Cancel), to the eNB 200-1. The UE 100 may transmit the information indicating the setting cancellation of the announcing gap, by way of the side link UE information message, to the eNB 200-1. The eNB 200-1 that receives the information deletes the stored announcing gap of the UE 100. As a result, the eNB 200-1 is capable of preventing limitation of assignment of a radio resource for the cellular communication also when the announcing gap is not set to the UE 100.

It is noted that the setting cancellation of the announcing gap by the UE 100 may be performed by deactivating the announcing gap and resetting the setting of the announcing gap.

(B) eNB-Based Operation

Next, the eNB-based operation will be described using FIG. 14. FIG. 14 is a sequence chart for describing one example of an (eNB-based) operation according to the third embodiment. It is noted that description similar to that of the UE-based operation is omitted where appropriate.

As shown in FIG. 14, steps S501 to S506 correspond to steps S401 to S406.

In step S507, the UE 100 transmits an announcing gap request (Discovery Announcing Gap Request). The announcing gap request is to request the eNB 200-1 to set a period during which a Discovery signal in another frequency is announced. The UE 100 may transmit the announcing gap request by using the side link UE information message.

The announcing gap request includes the Discovery resource information (at least information on the transmission resource pool) included in the setting information acquired in step S504. It is noted that the announcing gap request may be configured in much the same way as in the above-described monitor gap request.

In step S508, the eNB 200-1 assigns the announcing gap to the UE 100 in response to reception of the announcing gap request. Specifically, similarly to the UE 100 in step S407, the eNB 200-1 determines (sets) the announcing gap of the UE 100 on the basis of the Discovery resource pool acquired from the UE 100. Specifically, the eNB 200-1 determines (sets) the announcing gap of the UE 100 in all the periods of the announcing gap included in the received announcing gap request, in a part of the period thereof, or in a period other than the announcing gap included in the announcing gap request.

Thus, the eNB 200-1 assigns the announcing gap to the UE 100 to thereby comprehend a timing at which the UE 100 announces the Discovery signal. As a result, the eNB 200-1 is capable of controlling to not assign, to the UE 100, a radio resource (in particular, an uplink radio resource) for cellular communication between the eNB 200-1 and the UE 100 at a timing to overlap the timing at which the UE 100 announces the Discovery signal, and thus, it is possible to effectively utilize the radio resource for cellular communication. Further, the UE 100 is capable of appropriately announcing the Discovery signal. Therefore, it is possible to achieve both the cellular communication and the proximity service (Discovery).

In step S509, the eNB 200-1 transmits, as a response to the announcing gap request, setting information including the assigned announcing gap (allocating Discovery Announcing Gap), to the UE 100. The UE 100 sets the announcing gap included in the received setting information and announces the Discovery signal in another frequency.

Step S510 corresponds to step S411.

It is noted that when canceling the setting of the announcing gap of the UE 100, the eNB 200-1 is capable of transmitting information indicating setting cancellation of the announcing gap to the UE 100. The eNB 200-1 may transmit, to the UE 100, the information indicating the setting cancellation of the announcing gap, in response to a request from the UE 100. The UE 100 cancels the setting of the announcing gap on the basis of the information.

Other Embodiments

In the above-described first embodiment, a case of monitoring the Discovery signal between different PLMNs (Inter-PLMN Discovery) is described, however, the present disclosure is not limited thereto. Even in a case of monitoring the Discovery signal in the same PLMN (Intra-PLMN & Inter-freq. Discovery), it is possible to apply the contents of the present disclosure. Furthermore, in the third embodiment, even in a case of announcing the Discovery signal in the same PLMN, it is possible to apply the contents of the present disclosure.

In the above-described first embodiment, the eNB 200-1 acquires the Discovery resource information in another PLMN from the UE 100, however, the present disclosure is not limited thereto. For example, the eNB 200-1 may acquire the Discovery resource information from the eNB 200-2 via the X2 interface. Alternatively, the eNB 200-1 may acquire the Discovery resource information from an OAM in the second PLMN via an OAM in the first PLMN.

In the above-described second embodiment, the switching between the first setting and the second setting is described, however, the present disclosure is not limited thereto. The UE 100 may switch among three or more settings. In this case, the three or more settings may be defined on the basis of any one of the orders of priority described in the first embodiment. For example, when the UE 100 performs the CA, the first setting may be defined so as to satisfy "communication with PCell>monitoring of Discovery signal>communication with SCell", the first setting may be defined so as to satisfy "communication with PCell>communication with SCell>monitoring of Discovery signal", and the first setting may be defined so as to satisfy "monitoring of Discovery signal>communication with PCell>communication with SCell".

In the above-described third embodiment, the description similar to that of the first embodiment is omitted where appropriate. Thus, the "monitor" in the first embodiment may be replaced by "announcing (or announce)", and the content in the first embodiment may be applied to the third embodiment. Further, each of the above-described embodiments may be combined where appropriate. For example, when the first embodiment and the third embodiment are combined, the UE 100 and/or the eNB 200 may set both the monitor gap and the announcing gap at the same time or at a different timing.

In each of the above-described embodiments, as a signaling from the UE 100 to the eNB 200, a D2D Interest Indication that indicates whether or not the UE 100 has interest in the D2D proximity service (for example, the D2D communication) may be used. For example, the D2D Interest Indication may include information indicating activate/deactivate of the monitor gap or information indicating cancellation of the monitor gap. Alternatively, a Sidelink UE Information message is used as the signaling from the UE 100 to the eNB 200.

Alternatively, as the signaling from the UE 100 to the eNB 200, the UE 100 may use a ProSe Indication (or, a Prose UE Indication) for transmitting information relating to the D2D proximity service. For example, the ProSe Indication may include the D2D Interest Indication, or the information (request) indicating activate/deactivate of the monitor gap. The eNB 200 is capable of transmitting (notifying), to the UE 100, an instruction for activating/deactivating the monitor gap in the UE 100, on the basis of the information indicating activate/deactivate of the monitor gap that is included in the ProSe Indication. The indication may be transmitted to the UE 100 by the MAC CE or a DCI. Alternatively, when the D2D Interest Indication included in the ProSe Indication indicates that the UE 100 has interest in the D2D proximity service, the eNB 200 may transmit an instruction for activating the monitor gap, to the UE 100. Further, when the D2D Interest Indication included in the ProSe Indication indicates that the UE 100 loses the interest in the D2D proximity service, the eNB 200 may transmit an instruction for deactivating the monitor gap, to the UE 100. It is noted that when the eNB 200 previously sets, to the UE 100, a monitor gap (a fixed monitor gap) that is capable of setting/cancelling the monitor gap by the instruction of activating/deactivating, the eNB 200 may transmit the instruction for activating/deactivating the monitor gap. Alternatively, the fixed monitor gap (Pre-configured) may be previously set to the UE 100.

Although not described in each of the above-described embodiments, it is assumed that a behavior (an operation specification) of the UE 100 when the D2D proximity service is utilized within the same PLMN (Intra-PLMN) differs from that when the D2D proximity service is utilized between different PLMNs (Inter-PLMN). For example, it is assumed that: when the D2D discovery procedure is performed within the same PLMN, the eNB 200 is the D2D synchronization source and the UE 100 is synchronized by the synchronization signal (PSS/SSS) transmitted from the eNB 200 (cell), that is, the D2D synchronization source; and when the D2D discovery procedure is performed between different PLMNs, the UE 100 is the D2D synchronization source and the UE 100 is synchronized by the D2D synchronization signal transmitted from the UE 100, that is, the D2D synchronization source. In this case, a synchronization procedure of the UE 100 when performed within the same PLMN differs from that when performed between different PLMNs, and in some circumstances, a procedure of receiving a Discovery signal by the UE 100 differs.

Incidentally, it is assumed that the D2D frequency list of a frequency that is available in the D2D proximity service (specifically, the D2D discovery procedure) includes information not only on a frequency that is available within the same PLMN, but also on a frequency that is available in a different frequency. In this case, the UE 100 needs to identify whether a frequency selected on the basis of the D2D frequency list is a frequency used in the same PLMN as the PLMN selected by the UE 100, or a frequency used in a PLMN different from the PLMN selected by the UE 100.

Here, it is considered that the UE 100 includes, into the D2D frequency list, not only information indicating a (neighboring) frequency supporting the D2D discovery procedure, but also information indicating a corresponding PLMN. However, there is a problem that the amount of information of the D2D frequency list increases. In this regard, by the following method, it is considered that the UE 100 identifies a frequency without increasing the amount of information of the D2D frequency list.

Firstly, the UE 100 acquires, from the serving cell, a neighboring frequency list indicating a frequency (a neighboring frequency) that is used in the PLMN selected by the UE 100 and is different from the serving cell. For example, the UE 100 is capable of acquiring the neighboring frequency list by decoding information transmitted by an SIB 5.

Secondly, the UE 100 acquires the D2D frequency list from the serving cell. For example, the UE 100 is capable of acquiring the D2D frequency list by decoding information transmitted by the SIB 18.

Thirdly, the UE 100 compares the neighboring frequency list and the D2D frequency list (see FIG. 15). As shown in FIG. 15, the UE 100 determines that a frequency F1 common to the neighboring frequency list and the D2D frequency list is available for the D2D discovery procedure within the same PLMN. Specifically, the UE 100 determines that it is possible to perform the D2D discovery procedure of Inter-Freq. & Intra-PLMN by the frequency F1.

The UE 100 determines that a frequency F2 that is listed only on the neighboring frequency list is not available for the D2D discovery procedure.

The UE 100 determines that a frequency F3 that is listed only on the D2D frequency list is available for the D2D discovery procedure in a different PLMN. Specifically, the UE 100 determines that it is possible to perform the D2D discovery procedure of Inter-Freq. & Inter-PLMN by the frequency F3. Therefore, the UE 100 is capable of identifying that the frequency F3 is a frequency used in a different PLMN.

Further, although not described in each of the above-described embodiments, when the UE 100 selects an HPLMN (a Home PLMN) or an EHPLMN (an Equivalent Home PLMN), a direct subscriber contract between the UE 100 and the HPLMN exists; thus, it is considered that the D2D frequency list does not include a frequency that is available (only) for a Forbidden PLMN, that is, a PLMN that is not selectable by the UE 100.

On the other hand, when the UE 100 selects a VPLMN (a Visited PLMN), the VPLMN is selected not on the basis of a direct subscriber contract between the UE 100 and the VPLMN but on the basis of a roaming contract between the HPLM and the VPLMN; thus, there is a possibility that between the HPLM and the VPLMN, a setting for the UE 100 may differ. Therefore, it is considered that the D2D frequency list, which is received by the UE 100 from the serving cell at a roaming destination, may include a frequency available for the Forbidden PLMN.

Currently, there is no regulations for operations of the UE 100 in a case where the D2D frequency list includes a frequency available for the Forbidden PLMN; therefore, the UE 100 may transmit the Discovery signal without allowance, in a frequency available for the Forbidden PLMN. In this regard, it is possible by using the following method to prevent the UE 100 from transmitting the Discovery signal without allowance, in a frequency available for the Forbidden PLMN.

Firstly, the UE 100 receives the D2D frequency list from the serving cell at the roaming destination.

Secondly, the UE 100 selects, from the received D2D frequency list, a D2D frequency that is used for transmitting the Discovery signal. Further, the UE 100 determines whether or not the PLMN that provides the selected D2D frequency is a Forbidden PLMN. When the selected D2D frequency is provided by the same PLMN, the UE 100 determines, by the above-described operation, that the PLMN which provides the selected D2D frequency is not a Forbidden PLMN. Alternatively, when the D2D frequency list includes information indicating PLMNs corresponding to each D2D frequency, the UE 100 identifies a PLMN on the basis of the information. The UE 100 may determine whether or not the identified PLMN is a Forbidden PLMN.

It is noted that the Forbidden PLMN list preferably is stored in a USIM. As a result, even when there is a change in the USIM of the UE 100 (that is, even when there is a change in subscriber information), it is possible to prevent malfunction of the UE.

Thirdly, when the PLMN which provides the selected D2D frequency is not on the Forbidden PLMN list, the UE 100 starts the selection of the PLMN. When the selected D2D frequency is in the Forbidden PLMN, the UE 100 selects another D2D frequency. Alternatively, the UE 100 abandons the transmission of the Discovery signal.

Fourthly, when the UE 100 receives authentication of the PLMN and is capable of selecting the PLMN, the UE 100 transmits, to a cell that belongs to the selected PLMN, a use request for requesting the transmission of the Discovery signal by using the selected D2D frequency. On the other hand, when it is not possible to select the PLMN, the UE 100 selects another D2D frequency. Alternatively, the UE 100 abandons the transmission of the Discovery signal. The UE 100 may register the PLMN to the Forbidden PLMN list.

Fifthly, a server located within the PLMN to which the cell that receives the use request belongs determines whether it is possible to authenticate the transmission of the Discovery signal by the UE 100. When it is possible to authenticate the transmission of the Discovery signal, the server notifies the UE 100 of approval to transmit the Discovery signal; and when it is not possible to authenticate the transmission of the Discovery signal, the server notifies the UE 100 of refusal to transmit the Discovery signal.

Sixthly, when receiving a notification of the approval to transmit the Discovery signal, the UE 100 transmits the Discovery signal in the selected D2D frequency. On the other hand, when receiving the refusal to transmit the Discovery signal, the UE 100 abandons the transmission of the Discovery signal in the selected D2D frequency. The UE 100 may store at least one of the selected D2D frequency and the PLMN. Specifically, the UE 100 may register the PLMN to a Discovery Forbidden PLMN list which is a list of PLMNs in which the Discovery signal cannot be approved to be transmitted. Further, the UE 100 may register the selected D2D frequency to a list of forbidden D2D frequencies in which the Discovery signal cannot be approved to be transmitted. By using these lists, the UE 100 is capable of determining whether or not the PLMN that provides the selected D2D frequency is a Forbidden PLMN.

Further, on the basis of these lists, the UE 100 may exclude the D2D frequency of a Forbidden PLMN so as not to be selected. Moreover, when the UE 100 knows a Discovery resource pool of a Forbidden PLMN, the UE 100 may exclude a time domain of the Discovery resource pool from a monitor candidate of the Discovery signal.

Next, a case, in which the UE 100 is a Public safety UE that is used for public safety, is assumed. In this case, it may be desirable that the UE 100 is capable of transmitting the Discovery signal without transmitting the use request.

Thus, when the UE 100 is the Public safety UE, the authentication for transmitting the Discovery signal can be omitted by performing a special procedure of notifying PS information indicating that the UE 100 is the Public safety UE, instead of transmitting the use request.

For example, when the UE 100 notifies the PLMN at the roaming destination of the PS information and receives authentication by using the PS information, the UE 100 is capable of transmitting the Discovery signal by using the D2D frequency without authentication of the PLMN that provides the D2D frequency included in the D2D frequency list (and approval to transmit the Discovery signal).

Alternatively, when the UE 100 notifies the PS information in the PLMN that provides the selected D2D frequency, the UE 100 is capable of transmitting the Discovery signal by using the D2D frequency, without authentication of the PLMN (and approval to transmit the Discovery signal).

Alternatively, the UE 100 accesses a public safety authentication server before the authentication of a PLMN that provides the selected D2D frequency. When receiving authentication from the public safety authentication server, the UE 100 is capable of transmitting the Discovery signal by using the D2D frequency without authentication of the PLMN (and approval to transmit the Discovery signal).

The PS information, for example, is at least a part of authentication information indicating authentication of an organization for public safety. The authentication information may be a password (an authentication key). Further, the authentication information may be a plurality of authentication keys and an authentication key applied may be changed according to a time (UTC). For example, when storing a first authentication key (used from 00:00 to 12:00) and a second authentication key (used from 12:00 to 24:00), the UE 100 selects an authentication key for generating the PS information according to a current time. It is noted that the authentication information is stored in the USIM of the UE 100, for example.

Alternatively, the PS information may be at least a part of a public safety unique ID issued by the organization for public safety. For example, the PS information is first 16 bits of the public safety unique ID. It is noted that the public safety unique ID may be an organization ID which is issued to a predetermined organization, or a personal ID which is issued to individuals.

In addition, the eNB 200 that receives the PS information from the UE 100 needs to assign, to the UE 100, a radio resource (transmission resource or transmission/reception resource) used for the D2D proximity service (at least the D2D discovery procedure).

Further, in the above-described first embodiment, the monitor gap report may include information indicating a monitoring target (for example, at least any one of the lists of PLMN identifiers, frequency band identifiers (EARFCNs), and information of center frequency).

Moreover, the information indicating the monitor gap may be bit map information indicating a gap pattern by using a bit map. The information, for example, indicates the gap pattern by using a bit map in a unit of subframe, as described above. The information may indicate the gap pattern by using a bit map in a unit of slot or a unit of radio frame.

Also, the information indicating the monitor gap may be cycle information indicating a time cycle of the gap pattern. The information indicates the time cycle by the number of subframes, for example.

Further, the information indicating the monitor gap may be timing information indicating a start of the cycle information. For example, the timing information may be an offset value that uses a predetermined subframe number (for example, "SFN=0") of the serving cell as a reference. Therefore, when the UE 100 determines the monitor gap on the basis of the Discovery resource information that is included in the SIB from another eNB 200 (another cell), the information indicating the monitor gap can use SFN=0 of the serving cell as a reference, other than SFN=0 of another cell. As a result, the eNB 200 managing the serving cell that receives the information indicating the monitor gap (the monitor gap report) from the UE 100 does not need to adjust to SFN=0 of its own cell. It is noted that the timing information may be information indicating an offset value (for example, an integer) between the start of gap pattern and the start of monitoring.

Further, the information indicating the monitor gap may be number-of-times information indicating the number of times that the bit map information is repeated.

Therefore, the information indicating the monitor gap may be at least any one of information of bit map information, cycle information, timing information, and number-of-times information.

It is noted that the information indicating the monitor gap may be information indicating a period (a validity period) in a gap pattern during which the monitoring is performed.

As described above, when the information indicating the monitor gap indicates a bit map of a subframe pattern, a bit map (for example, in the HARQ process) may be a bit string in which a subframe that desires not to be used by the eNB 200-1 is indicated as "0" and a subframe that may be used by the eNB 200-1 is indicated as "1". In this case, a subframe that may possibly receive control information for an uplink signal (a UL grant), a subframe that retransmits an uplink signal (for example, a UL HARQ retransmission subframe), and a subframe for transmitting feedback information for retransmitting an uplink signal and/or a downlink signal (a DL/UL HARQ feedback) may be indicated as "1".

Further, when transmitting information indicating the gap pattern (bit map information) as the information indicating the monitor gap, information indicating one monitor gap may indicate a gap pattern in all frequencies in which the UE is interested. For example, it is assumed that "1" indicates a subframe that desires to be monitored and "0" indicates a subframe that does not desire to be monitored. When a subframe pattern of a transmission resource pool at a first frequency is "11100000" and a subframe pattern of a transmission resource pool at a second frequency is "00000111", information indicating one monitor gap may indicate "11100111". Thus, the information indicating one monitor gap may be information that integrates information indicating resource pools for the D2D proximity service corresponding to each of a plurality of other frequencies. As a result, an overhead is reduced.

It is noted that the information indicating one monitor gap is not limited to information that integrates a plurality of bit map information (that is, information indicating a superset of the plurality of bit map information). The information indicating one monitor gap may be information that integrates a plurality of cycle information (that is, information indicating a superset of the plurality of cycle information). Specifically, a value indicating the least common multiple of the plurality of cycles that is indicated by the plurality of cycle information may be the information indicating one monitor gap. For example, when a cycle of, a resource pool for the D2D proximity service in a frequency 1 is 3 and a cycle of a resource pool for the D2D proximity service in a frequency 2 is 5, a cycle indicated by information that integrates the plurality of cycle information is 15.

Alternatively, the information indicating one monitor gap may indicate a gap pattern for each PLMN in which the UE is interested. In this case, the UE that has interest in a plurality of PLMNs (that is, the UE that desires to utilize the D2D proximity service in the plurality of PLMNs) transmits information indicating the plurality of monitor gaps to the eNB 200. Each item of the information indicating the plurality of monitor gaps is associated with an identifier of each PLMN.

Alternatively, the information indicating one monitor gap may indicate information indicating a gap patterns for each frequency in which the UE is interested. In this case, the UE that has interest in a plurality of frequencies (that is, the UE that desires to utilize the D2D proximity service in the plurality of frequencies) transmits information indicating the plurality of monitor gaps to the eNB 200. Each item of the information indicating the plurality of monitor gaps is associated with an identifier of each frequency. Thus, the information indicating the plurality of monitor gaps transmitted by the UE 100 may be information indicating a resource pool (monitor gap) corresponding to each of the plurality of other frequencies.

When receiving the information indicating the plurality of monitor gaps from the UE 100, the eNB 200 may set each of the plurality of monitor gaps to the monitor gap of the UE 100, or set one monitor gap of the plurality of monitor gaps to the monitor gap of the UE 100.

It is noted that since the eNB 200 is capable of setting the monitor gap of the UE 100 on the basis of information indicating a monitor gap received from the UE 100, the eNB 200 may set, as the monitor gap of the UE 100, a same monitor gap as the information indicating monitor gap received from the UE 100. Alternatively, the eNB 200 may modify the information indicating the monitor gap received from the UE 100, and set, as the monitor gap of the UE 100, a monitor gap included in the at least partially changed information indicating the monitor gap received from the UE 100.

It is noted that, as the Discovery resource information included in the monitor gap request, the UE 100 may transmit information that has the same form as the above-described information indicating the monitor gap or the information included in the monitor gap report. Further, as the information indicating the allowed monitor gap and as a response to the monitor gap request, the eNB 200-1 may transmit information that has the same form as the above-described information indicating the monitor gap or the information included in the monitor gap report.

Figure 16:
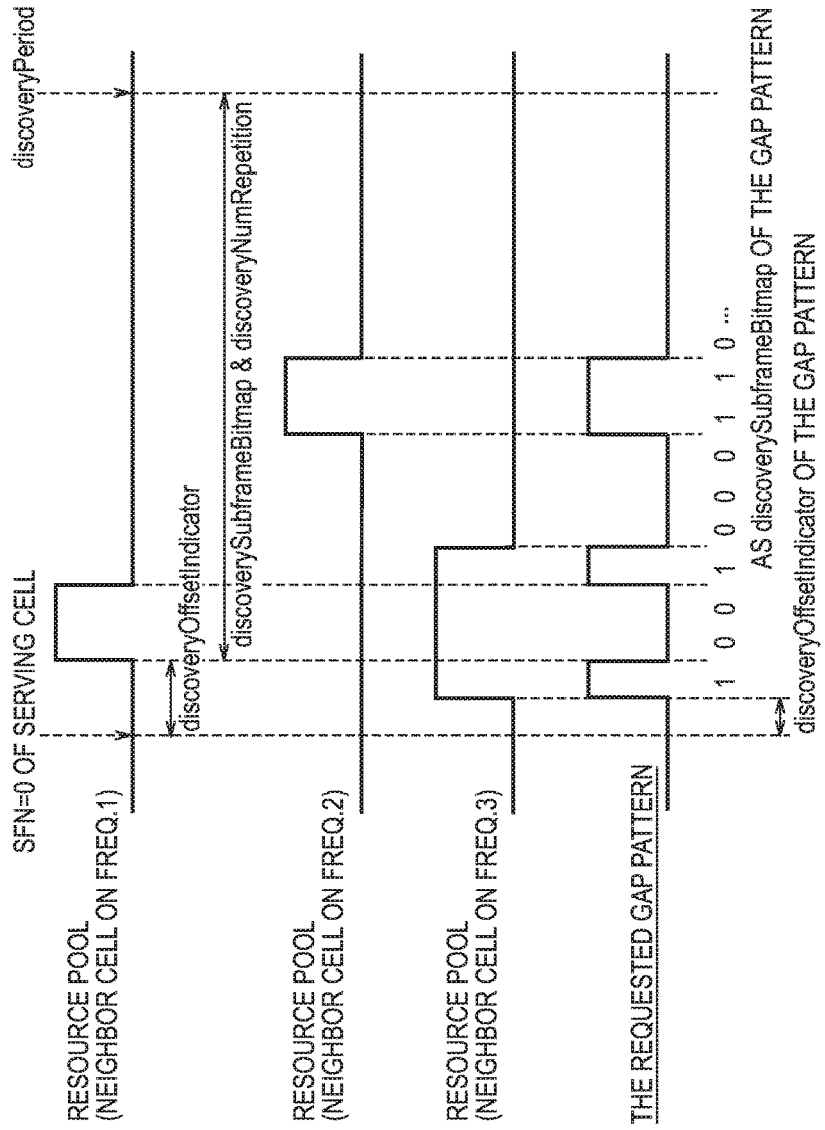
FIG. 16 is a diagram for describing one example of information indicating a candidate of a monitor gap.

Therefore, when the Discovery resource information included in the monitor gap request, for example, is information indicating a candidate of the monitor gap for the D2D discovery signal, the information indicating the candidate of the monitor gap may be at least any one information of bit map information (discoverySubframeBitmap), cycle information (discoveryPeriod), timing information (discoverOffsetIndicator), and number-of-times information (discoveryNumReptition). Here, one example of information indicating the candidate of a monitor gap will be described with reference to FIG. 16. FIG. 16 is a diagram for describing one example of the information indicating the candidate of a monitor gap.

As shown in FIG. 16, the first resource pool indicates the Discovery resource pool in a serving cell in a frequency 1. The second resource pool indicates the Discovery resource pool in a neighbor cell in a frequency 2. The third resource pool indicates the Discovery resource pool in a neighbor cell in a frequency 3. The fourth resource pool indicates a candidate resource of the monitor gap determined by the UE 100.

In FIG. 16, bit map information indicates a gap pattern that integrates a plurality of Discovery resource pools (specifically, the Discovery resource pools of the neighbor cell in the frequency 2 and the neighbor cell in the frequency 3). Specifically, the bit map information indicates "1001000110 . . . ". It is noted that since the UE 100 prioritizes the Discovery resource pool of the serving cell, the second and third bit corresponding to the Discovery resource pool in the serving cell are "0". Further, the timing information is not an offset value that uses "SFN=0" of the neighbor cell as a reference, but an offset value that uses "SFN=0" of the serving cell as a reference.

In addition, the eNB 200 may determine (set) a monitor gap of another UE 100 on the basis of information (bit map information) indicating a gap pattern transmitted from the UE 100. For example, when the UE 100 transmits, as information indicating the monitor gap, to the eNB 200, information indicating a gap pattern associated with an identifier of a predetermined frequency and when another UE 100 transmits, to the eNB 200, a monitor gap request that includes an identifier of a predetermined frequency that the other UE 100 desires, the eNB 200 is capable of setting the same gap pattern as the gap pattern received from the UE 100 to a monitor gap of the other UE 100.

It is noted that the eNB 200 need to recognize whether the information indicating the monitor gap transmitted from the UE 100 is equal to information indicating the Discovery resource pool in another cell, or is the information indicating a monitor gap that the UE 100 (autonomously) determines. This is because it may be possible that the eNB 200 regards the monitor gap that the UE 100 (autonomously) determines as the Discovery resource pool in another cell, and sets to a monitor gap of another UE 100. In this case, there is a possibility that the other UE 100 is not capable of effectively monitoring the Discovery signal. Thus, for example, flag information for determining whether or not the bit map information included in a setting request indicates the monitor gap determined by the UE 100 itself or indicates the Discovery resource pool in another cell, may be included in the setting request.

Further, for example, when the eNB 200 receives information indicating the candidate of a monitor gap (a candidate resource pool) from the UE 100, the eNB 200 may transmit, to the UE 100, information indicating whether or not to set the candidate resource pool as the monitor gap of the UE 100. The information indicating whether or not to set the candidate resource pool as the monitor gap of the UE 100 may be information indicating Ack (set)/Nack (non-set), or flag information indicated by 1 bit (for example, "0: set", "1: non-set"). Alternatively, when setting the candidate resource pool as the monitor gap of the UE 100, the eNB 200 may transmit information indicating Ack; and when not setting the candidate resource pool as the monitor gap of the UE 100, the eNB 200 may not transmit anything. Moreover, when setting the candidate resource pool as the monitor gap of the UE 100, the eNB 200 may not transmit anything; and when not setting the candidate resource pool as the monitor gap of the UE 100, the eNB 200 may transmit Nack.

It is noted that in a case where the eNB 200 and the UE 100 in a cell of the eNB 200 recognize a common monitor gap, the UE 100 may transmit the setting request that does not include information indicating the monitor gap (or the Discovery resource information), and the eNB 200 may transmit information indicating Ack (set)/Nack (non-set), other than bit map information indicating a set monitor gap. The case where the eNB 200 and the UE 100 in a cell of the eNB 200 recognize a common monitor gap is, for example, a case where the eNB 200 transmits information indicating the common monitor gap by the SIB.

In addition, in the above-described second embodiment, the UE 100 monitors the Discovery signal in another frequency in the Off duration of the discontinuous reception mode, however, the present disclosure is not limited thereto. The UE 100 may monitor the Discovery signal in another frequency in a Measurement Gap that is a period assigned to measure the radio field intensity from a base station in another system. Further, the UE that is connected to a cell (a connected UE) 100 may monitor the Discovery signal in another frequency only in the Measurement Gap. During a period where the Measurement Gap is set, since the connected cell does not transmit a radio signal to the UE 100, a problem that the UE 100 is not capable of receiving information from the connected cell due to transmission or reception of the D2D radio signal, does not occur. It is noted that only when the UE 100 has a single receiver (or transceiver), the UE 100 may transmit or receive the D2D radio signal only in the Measurement Gap (and the Off duration of the discontinuous reception mode). When the UE 100 has a plurality of receivers (or transceivers), the UE 100 may transmit or receive the D2D radio signal in a period other than the Measurement Gap.

Alternatively, when the UE 100 determines that it is not possible to sufficiently perform the monitoring of the Discovery signal in another frequency only in the set Off duration of the discontinuous reception mode and/or the set Measurement Gap, the UE 100 may determine the monitor gap, or may transmit the monitor gap request to the eNB 200. For example, when the UE 100 finds it difficult to monitor the Discovery signal in another frequency in the Off duration of the discontinuous reception mode and/or the Measurement Gap, and when the UE 100 is not capable of receiving the Discovery signal from another UE 100 even after monitoring the Discovery signal in another frequency, the UE 100 may determine the monitor gap or may transmit the monitor gap request to the eNB 200. Further, when the UE 100 is not capable of securing a quality (for example, discovery probability) that is equal to or more than a reference value by monitoring the Discovery signal only in the Off duration of the discontinuous reception mode and/or Measurement Gap, the UE 100 may determine the monitor gap, or may transmit the monitor gap request to the eNB 200. For example, when the time for the Off duration of the discontinuous reception mode and/or the Measurement Gap is too short, the UE 100 determines that it is not possible to secure a quality (accuracy) of monitoring. The reference value (threshold value) may be set by the eNB 200 (serving cell), may be set by a host network device of the eNB 200 (for example, the MME, the OAM, the NAS entity, and a server having ProSe Function), or may be a threshold value determined in advance (pre-defined value). It is noted that the server having ProSe Function is a server that performs management relating to the D2D proximity service, and for example, is the above-described first server 400-1 (or the second server 400-2).

In addition, in the above-described first embodiment, the eNB 200-2 transmits setting information that includes the Discovery resource information in the second PLMN by the SIB 18, however, it is needless to say that the eNB 200-1 may transmit setting information that includes the Discovery resource information in the first PLMN to which the eNB 200-1 belongs by the SIB 18. Moreover, the eNB 200-1 may transmit the Discovery resource information in another PLMN (or another eNB 200-2) by the SIB. Alternatively, the eNB 200-1 may transmit the Discovery resource information in another PLMN (or another eNB 200-2) in a unicast manner to individual UEs 100 by using a dedicated signaling. Only when transmitting the Discovery resource information in another PLMN (or another eNB 200-2) as the monitor gap, the eNB 200-1 may transmit the information in the unicast manner to the UE 100 by using the dedicated signaling. In this case, the UE 100 is capable of regarding a period of a resource pool that is identified on the basis of the Discovery resource information in another PLMN (or another eNB 200-2) received by the dedicated signaling, not by the SIB, as the monitor gap.

Further, the eNB 200-1 may transmit, by the SIB, information indicating a monitor gap that is allowed for a predetermined UE 100 or information indicating a monitor gap that is assigned to a predetermined UE 100, as (at least a part of) the Discovery resource information in another PLMN or another eNB 200. The UE 100, on the basis of the Discovery resource information in another PLMN or another eNB 200 received by the SIB, may determine the monitor gap or may determine the Discovery resource pool to be included in the monitor gap request.

In the above-described second embodiment, when the UE 100 has only one radio transceiver 110 (that is, the UE 100 does not have a capability of receiving simultaneously in a plurality of frequencies (the frequency of the serving cell and the D2D frequency in which the UE 100 are interested)), the UE 100 may monitor the Discovery signal in another frequency only in the Off duration of the discontinuous reception mode. Further, the UE 100 may transmit, to the eNB 200, an IDC message (InDeviceCoexindication message) used for restraining an interference (for example, an interference based on WLAN communication of the UE itself, and an interference from/to the GNSS based on the use of the GNSS) in order to monitor the Discovery signal in another frequency in the Off duration of the discontinuous reception mode.

In each of the above-described embodiments, the description is mainly focused on the monitoring (reception) of the Discovery signal, however, the present disclosure is not limited thereto. The above-described content may be applied to an announcing (transmission) of the Discovery signal. Therefore, the above-described monitoring (reception) of the Discovery signal may be substituted by the announcing (transmission) of the Discovery signal. Further, the above-described content may be applied not only to the D2D discovery procedure but also to other operations (for example, the D2D communication). Therefore, the above-described Discovery signal may be substituted by a D2D communication signal. For example, the UE 100 may determine a gap for transmitting and/or receiving the D2D communication signal in another frequency. Alternatively, the eNB 200 (serving cell) may determine a gap for transmitting and/or receiving the D2D communication signal in another frequency (another cell), and transmit the gap to the UE 100.

In each of the aforementioned embodiments, the monitor gap and/or the announcing gap may be called a side link gap. Here, in the side link gap, a side link operation (that is, the D2D operation in the D2D proximity service) is preferentially performed. Specifically, in the side link gap, the UE 100 is capable of performing reception (monitor) or transmission (announcing) of the Discovery signal or the Communication signal. The side link gap may be a period during which no cellular communication (Uu communication) is obliged. The UE 100 is exempt from receiving the PDCCH in the side link gap.

Here, the eNB 200 may set a gap in which an operation for receiving a radio signal from the eNB 200 or another eNB 200 is performed and a side link gap to the UE 100 in the following manner. It is noted that the gap in which to perform the operation for receiving the radio signal from the eNB 200 or another eNB 200 (hereinafter, "reception gap") is at least either one of: a measurement gap in which to measure a radio field intensity from the eNB 200 or the other eNB 200; a paging opportunity for receiving a control signal (PDCCH) from the eNB 200; and a measurement gap in which to measure a radio field intensity from a cell belonging to the same frequency as the serving cell (that is, a gap or an opportunity for intra-frequency measurement).

Firstly, the eNB 200 sets the side link gap to the UE 100 so that the reception gap and the side link gap do not overlap. Thus, the UE 100 is capable of performing each operation without regard to priority between the reception operation and the side link operation.

Secondly, the eNB 200 cancels the setting of the side link gap when setting the reception gap to the UE 100. That is, the eNB 200 does not set (assign) the side link gap to the UE 100 to which the reception gap is set. Thus, the UE 100 is capable of performing each operation without regard to priority between the reception operation and the side link operation.

Thirdly, the eNB 200 sets the reception gap and the side link gap independently to the UE 100. In this case, the reception gap and the side link gap may possibly overlap. In a period during which the reception gap and the side link gap overlaps, the reception operation is prioritized over the side link operation. Therefore, in the overlapping period, the UE 100 performs preferentially the reception operation over the side link operation. Here, in a case where the UE 100 is performing the side link operation in the side link gap, in the overlapping period, the side link operation is cancelled and the reception operation is performed. For example, when it is necessary to perform the intra-frequency measurement in the side link gap, the UE 100 interrupts the side link operation (for example, the announcing of the Discovery signal) in a frequency different from the frequency of the serving cell and performs the frequency measurement. The UE 100 may resume the side link operation in the side link gap after the overlapping period passes.

Figure 17:
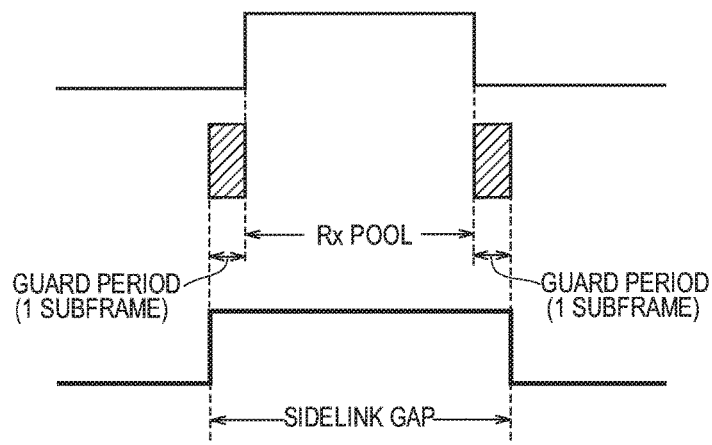
FIG. 17 is a diagram for describing one example of a side link gap.

It is noted that the eNB 200-1 may set a single side link gap as shown in FIG. 17. Here, the single side link gap includes the reception gap.

It is noted that when a measurement condition (requirement performance) regarding the radio signal from the eNB (cell) is not satisfied in the overlapping period, the UE 100 may prioritize the intra-frequency measurement over the side link operation. When the measurement condition is satisfied, the UE 100 may prioritize the side link operation over the intra-frequency measurement. Examples of the measurement condition are at least either one of the conditions (minimum requirement): a measurement interval (or an evaluation interval) of a received signal power (RSRP) of a radio signal from an eNB or of a reception quality (RSRQ) thereof and an interval during which a new cell is detected.

Figure 18:
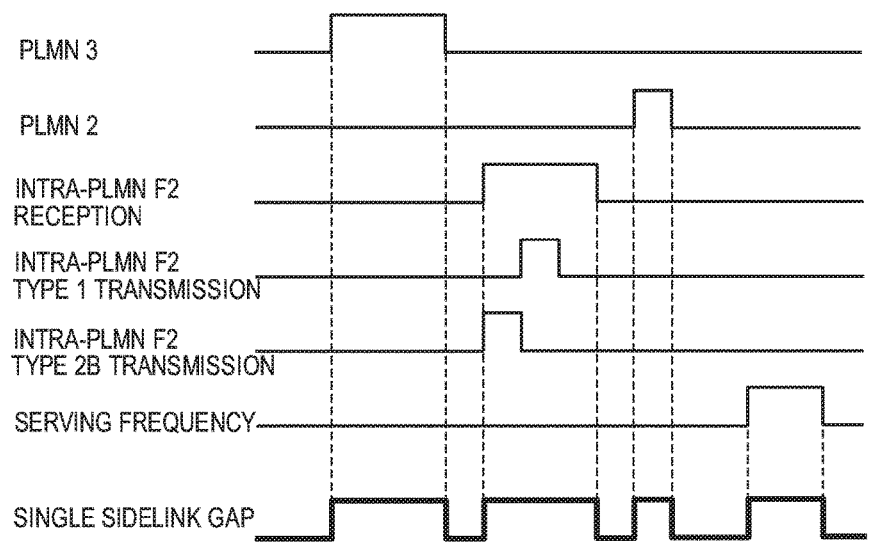
FIG. 18 is a diagram for describing one example of the side link gap.

It is noted that when the UE 100 performs the side link operation in a frequency different from a frequency of the serving cell, a time period for tuning a frequency (RF tuning) is needed. Therefore, as shown in FIG. 18, the side link gap may be a period wider than an SL resource pool (for example, a reception resource pool) for the side link. For example, it may be possible to start the side link gap before a predetermined subframe (for example, one subframe) before the SL resource pool. Further, it may be possible to end the side link gap after a predetermined subframe (for example, one subframe) after the SL resource pool. The predetermined subframe corresponds to a guard period. In the guard period, the UE 100 may perform the side link operation where possible, and the priority of the side link operation may be low. The UE 100 may perform the side link operation in a part (for example, one slot) of the guard period.

Figure 19:
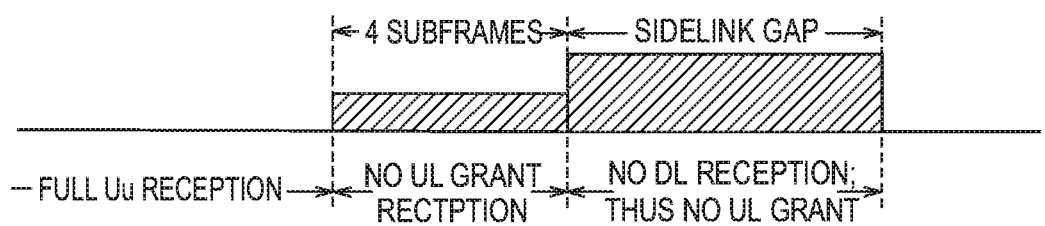
FIG. 19 is a diagram for describing one example of the side link gap.

Further, in a predetermined period (for example, four subframes) immediately before the side link gap, the UE 100 may omit reception of control information (UL grant) for uplink transmission to the eNB 200 (see FIG. 19). Therefore, the UE 100 is not requested to receive the UL grant in a predetermined period immediately before the side link gap. The eNB 200 generally requests reception of the UL grant; however, in the predetermined period immediately before the side link gap, does not request the UE 100 to receive the UL grant. Thus, the UE 100 is capable of avoiding the uplink transmission within the side link gap. Further, when the reception of the UL grant generates the uplink transmission within the side link gap, the UE 100 is capable of preferentially performing the uplink transmission over the side link operation.

Further, when a plurality of receiving machines (receivers) are provided, in the side link gap, the UE 100 may control to receive a control signal (PDCCH) from the eNB 200 by one receiving machine out of the plurality of receiving machines. Therefore, the UE 100 assigns one receiving machine for the cellular communication (Uu) and one receiving machine or transmitting machine for the side link operation. Thus, the UE 100 is capable of performing the cellular communication (Uu operation) different from the data communication and measurement even in the side link gap. The cellular communication (Uu operation) is reception of control information (PDCCH) such as paging reception. It is noted that when only one receiving machine is provided, the UE 100 may prioritize the cellular communication (Uu operation) different from the data communication over the side link operation in the side link gap, as described above.

Further, the eNB 200 may transmit, to the UE 100, information (designation information) for designating a frequency (frequency different from the serving cell) by which the side link operation is preferentially executed in the side link gap. For example, when a plurality of frequencies different from the serving cell are present, the eNB 200 notifies the UE 100 of information for designating a frequency by which the side link operation is permitted. The UE 100 may perform the side link operation by the designated frequency during the side link gap, and may perform the side link operation by the designated frequency only in a period during which resource pools for the side link in the respective frequencies overlap in the side link gap.

The eNB 200 may set the side link gap corresponding to each of a plurality of other frequencies, to the UE 100. That is, the eNB 200 may set the side link gap to each frequency. The respective side link gaps set to the UE 100 do not overlap each other. In this case, each side link gap corresponds to the designation information. The UE 100 is capable of performing the side link operation by the frequency corresponding to each set side link gap.

The eNB 200 may transmit to the UE 100 information on the priority of the frequency as the designation information. The eNB 200 is capable of notifying the UE 100 of the designation information by broadcast (for example, SIB) or unicast (for example, an RRC message). The information on the priority of the frequency (hereinafter, "priority information") is information in which the frequency (carrier) and the priority are associated, for example. For example, in the priority information, a carrier A and a priority 0 (for example, Low priority) are associated, and a carrier B and a priority 1 (for example, High priority) are associated. Further, in the priority information, the frequency (carrier) and identification information on a logical channel for the side link (identifier of a logical channel (LCID) or identifier of a logical channel group (LCGID)) may be associated. Here, the identification information on the logical channel for the side link is associated with the priority. When the eNB 200 notifies the UE 100 of the association between the identification information on the logical channel and the priority, the UE 100 is capable of grasping the priority of the frequency even if the frequency (carrier) is not directly associated with the priority. The UE 100 is capable of performing the side link operation in a frequency where the priority is high.

Further, the eNB 200 may transmit, to the UE 100, identification information (an index of a secondary cell) indicating a secondary cell (SCell) as designation information. The UE 100 that receives the identification information indicating the SCell as the designation information is capable of performing the side link operation by the frequency of the secondary cell indicated by the identification information when a carrier aggregation is set where a plurality of component carriers (plurality of cells (PCell and SCell)) are used at the same time to perform the communication.

Further, the eNB 200 may set, together with the side link gap, at least one of: information for designating a communication equipment (RF chain: a transmitting machine and/or a receiving machine) that performs the side link operation in the side link gap and information for designating the side link operation in the side link gap (that is, a side link operation executable in the side link gap)

The information for designating the communication equipment is an RF chain identification number, for example. In the set side link gap, the UE 100 performs the side link operation by using the designated communication equipment. The eNB 200 appropriately sets the side link gap to the UE 100 including a plurality of communication equipments for each band combination (that is, for each RF chain) to be supported so as to enable maximization of an opportunity for the cellular communication (Uu communication) operation and the side link operation.

The information for designating the communication equipment may be the identification information (an index of the secondary cell) indicating the secondary cell (SCell). It is assumed that when the carrier aggregation is set, the UE 100 uses a predetermined communication equipment (receiving machine) to receive the information from a predetermined SCell. When the identification information received as the information for designating the communication equipment indicates a predetermined SCell, the UE 100 uses a predetermined communication equipment in the set side link gap so as to perform the side link operation. Therefore, the UE 100 is exempt from receiving (and/or transmitting) the predetermined SCell in the side link gap.

The information for designating the side link operation is the information indicating the side link operation executed by the UE 100 in the set side link gap. For example, the information may be information indicating either one of "Discovery" or "Communication", and may be information indicating either one of "Discovery transmission (announcing)", "Discovery reception (monitor)", "Communication transmission", and "Communication reception". The UE 100 performs the side link operation designated in the side link gap.

In accordance with various embodiments, the at least one processor (the processor 160 and/or the processor 240) may be implemented as a single integrated circuit (IC) or as multiple communicatively coupled IC's and/or discrete circuits. It is appreciated that the at least one processor can be implemented in accordance with various known technologies.

In one embodiment, the processor includes one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In each of the above-described embodiments, although the LTE system is described as an example of the mobile communication system, it is not limited to the LTE system, and the contents of the present application may be applied to a system other than the LTE system.

Additional Statement

Supplementary information of the embodiments will be stated as follows.

(A) Additional Statement 1

(A1) Introduction

In the Additional statement 1, how to support inter-PLMN D2D discovery functionality and possible solutions is discussed.

(A2) Inter-PLMN Discovery Procedure (Inter-PLMN Discovery) Support

Some companies have expressed interest in supporting inter-PLMN functionality over LTE D2D especially considering the advantage over the existing peer-to-peer discovery functionality. SA2 has also captured the support for inter-PLMN discovery procedure in Rel-12. Also, D2D has already been identified as one of the promising technologies with the potential to reduce traffic accidents. If D2D discovery procedure is limited to intra-PLMN operations, the usefulness of D2D would be greatly reduced.

Proposal 1: Inter-PLMN D2D discovery procedure (Inter-PLMN D2D discovery) should be supported in Rel-12.

(A3) Stage-2 Design of Inter-PLMN Discovery Procedure (A3.1) Issues

If Proposal 1 is adopted, one straightforward way to provide inter-PLMN discovery procedure is to incorporate the functionality of inter-PLMN discovery procedure on top of the mechanism for inter-cell/inter-frequency discovery procedure support. In other words, inter-PLMN discovery procedure should be supported through the use of SIB already agreed for inter-cell/inter-frequency discovery procedure.

(A3.2) SIB Provisioning Scheme

In order to support inter-PLMN discovery procedure, discovery resource information will also be needed in order for D2D UEs to monitor discovery signals transmitted in cells belonging to other PLMNs. According to current agreements, the UEs can obtain from the SIB of its serving cell (e.g., SIB18 or 19) the full set of information for intra-frequency discovery reception and at least indications which frequencies support discovery procedure. Although it's yet to be decided whether the SIB18 or 19 transmitted from the serving cell contains the full set of information for inter-frequency discovery procedure, it may be assumed that the serving cell has knowledge of such information for intra-/inter-frequency discovery reception as long as the frequencies are from the same PLMN.

Figure 20:
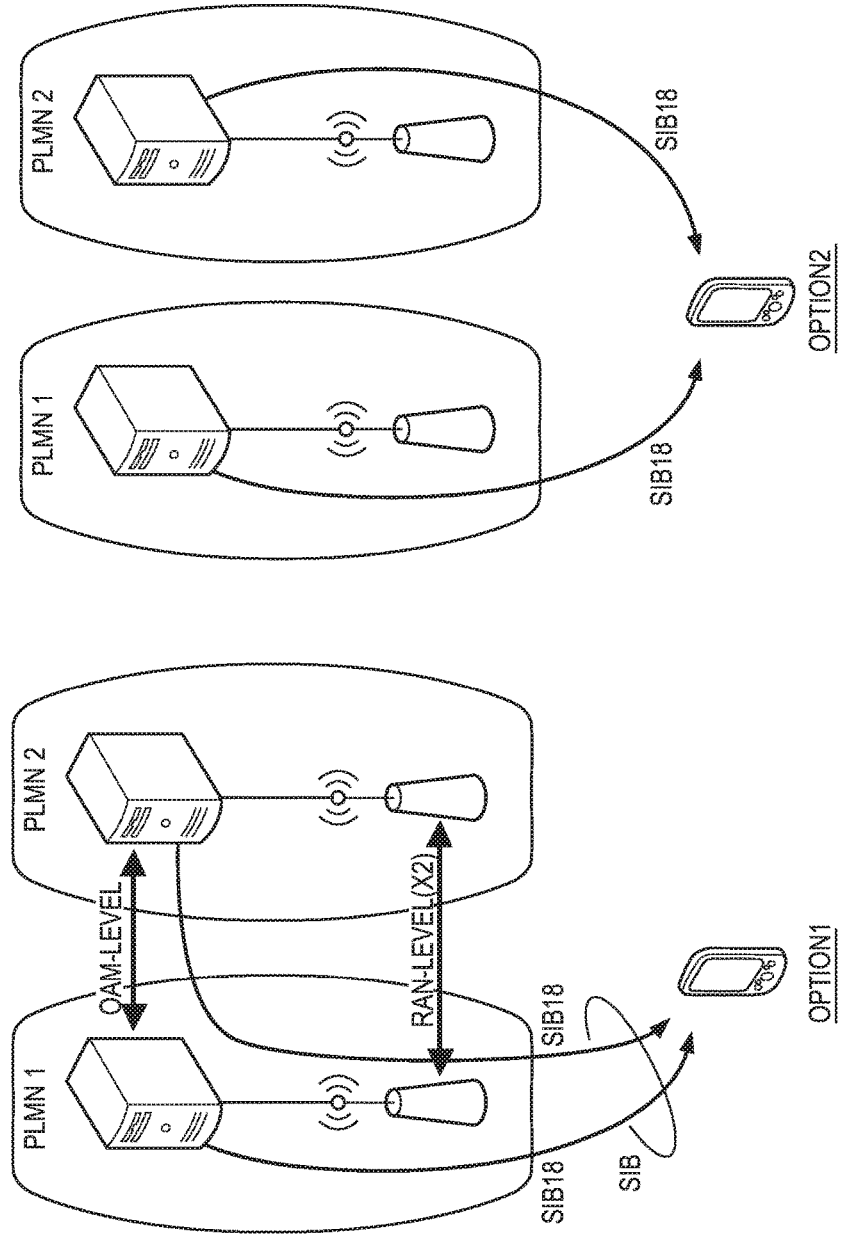
FIG. 20 is a diagram for describing an SIB provisioning scheme.

The situation is different for inter-PLMN discovery procedure support since it's unclear how cells belonging to different PLMNs may obtain the full set of information from one another. Two options may be considered as follows (See FIG. 20):

Option 1: The serving cell provides in SIB a copy of SIB18 or 19 from other PLMNs.

The option 1 may include configurations based on roaming agreements or server configurations shared or accessible by multiple PLMNs. With this option, the shared discovery procedure information (discovery information) from SIB18 or 19 is assumed to be static or semi-static. It is assumed the UE may decode its serving cell's SIB18 or 19 to obtain the discovery procedure information belonging to a different PLMN(s). The drawback with this option is the significant increase in the size of SIB18 or 19, esp. if discovery procedure information from multiple inter-PLMNs needs to be supported.

RAN-level SIB18 or 19 sharing: This may be direct X2 over PLMN(s). Although it can facilitate more dynamic SIB18 or 19 sharing, it's at least out of the scope of Rel-12.

Option 2: UEs obtain SIB18 or 19 directly from the cell belonging to another PLMN.

With Option 2, the UE will need to obtain SIB18 or 19 directly from the neighbour cells belonging to another PLMN(s). This facilitates dynamic SIB18 or 19 sharing and the serving cell does not need to provide SIB18 or 19 of different PLMN(s) in its own SIB18 or 19. This option does increase the complexity for the UE to decode multiple SIB18s or 19s for inter-PLMN discovery procedure. It is FFS if the UE will require coordination with its serving cell to obtain SIB18 or 19 belonging to another PLMN.

If Option 1 is adopted, the size of SIB18 or 19 would need to be increased significantly to accommodate the discovery procedure information from multiple PLMNs. With Option 2, the size of the SIB is limited to intra-PLMN and the complexity for the UE to decode multiple SIB18s or 19s is limited esp. if the discovery procedure information is considered semi-static. Therefore, we conclude that Option 2 should be adopted.

Proposal 3: Agree that the serving cell only needs to provide SIB18 or 19 belonging to its own PLMN.

(A3.3) Identification of Frequencies of Other PLMNs

In the below agreement, it's not clear whether the "neighbour frequencies" includes the frequencies of other PLMNs.

The serving cell may provide in SIB information which neighbour frequencies support ProSe discovery.

If the frequency information is not available from the SIB of the UE's serving cell, the UE would need to frequently tune away from the serving frequency just to find out if cells from other PLMNs are within coverage and if SIB18 or 19 is provided. However, if frequencies of other PLMNs are listed in the serving cell's SIB the UE may simply tune to the specified frequency and obtain SIB18 or 19 directly from the inter-PLMN cell using existing DRX opportunities.

Proposal 4: Agree that the SIB of the serving cell provides frequencies of other PLMNs to allow inter-PLMN D2D discovery procedure.

(A4) Issues

The issues can be considered for each cases of assumption with or without SIB18 or 19 information exchange between PLMNs. The two aspects are discussed in this section.

(A4.1) without SIB18 or 19 Information Exchange Between PLMNs

If the above Proposals are agreeable, inter-PLMN discovery procedure would be facilitated on top of inter-frequency discovery mechanism. However, if it is assumed the inter-PLMN discovery procedure information sharing is not supported, there wouldn't be any straight forward way for the serving cell to appropriately configure the UE with the opportunity to obtain SIB18 or 19 information from an inter-PLMN cell. In particular, RAN1 has already assumed the UE may not be able to receive simultaneously on the DL and UL spectrum of FDD carriers supporting.

Observation: Without the sharing of inter-PLMN discovery procedure information, the serving cell may not be able to appropriately configure UEs for the monitoring of inter-PLMN discovery signals.

In light of the Observation, in order for the UE to obtain SIB18 or 19 information and to monitor discovery signals from cells belonging to another PLMN, two options may be considered below:

Option 1a: The UE may obtain SIB18 or 19 information and monitor discovery signals belonging to another PLMN using the existing DRX configurations, during the DRX OFF period.

Option 2a: Inter-PLMN discovery procedure information is indirectly provided to the serving cell by the UE. For example, the UE forwards the full or subset of SIB18 or 19 which is received from an inter-PLMN cell.

In comparison, Option 1a does not require significant changes to the existing specification to support inter-PLMN discovery procedure; however, with the existing DRX, the opportunities for inter-PLMN discovery procedure are on a "best effort" basis. There's no guarantee that the UE will be able to monitor the preferred inter-PLMN discovery signals using DRX alone. Furthermore, the opportunities for inter-PLMN discovery monitoring will be reduced since the UE is still allowed to perform UL cellular during DRX OFF period, such as HARQ retransmissions and SR, and it is assumed that the UE does not support simultaneous discovery monitoring and UL WAN communication.

With Option 2a, UE provides the inter-PLMN discovery procedure information of interest to the serving cell. This is similar to the mechanism for SON ANR, but expanded to include inter-PLMN support. Once the serving cell receives the discovery information procedure, it is up to the serving cell to decide whether to configure the UE with the suitable occasions for inter-PLMN discovery procedure. The drawback with this option is the likelihood for increased signaling over the Uu interface.

Since both options have drawbacks, it should decide which of the two options will have greater specification impacts that can be considered acceptable while providing sufficient benefits for D2D discovery. However, regardless of which option is adopted it should be clear that the UE's behaviour should be under control of the serving cell.

Proposal 5: It should agree that the UE's behaviour regarding inter-PLMN discovery monitoring should be under the control of the serving cell.

Proposal 6: If SIB18 or 19 information is not exchanged among PLMNs, it should discuss if Option 1a or Option 2a is preferable.

(A4.2) with SIB18 or 19 Information Exchange Between PLMNs

Assuming the full set of SIB18 or 19 is exchanged between cells belonging to different PLMNs it may be assumed the serving cell knows the inter-PLMN discovery occasions of the cell belonging to the other PLMN. However, due to the number of neighbouring cells from other PLMNs it is not feasible for the serving cell to include all discovery resources from other PLMNs in SIB18 or 19. The size of SIB18 or 19 would be increased significantly. The serving cell would have two options in configuring gap occasions for the UE to monitor and receive discovery resources from cells belonging to other PLMNs.

Option 1b: If the serving cell does not broadcast any discovery procedure information on SIB18 or 19, it would be up to the serving cell to configure the UE with inter-PLMN discovery occasions for one or more discoverable frequencies. The serving cell may configure the UE of the inter-PLMN discovery occasions, according to the capabilities of the UE.

With Option 1b, the serving cell will not need to provide any inter-PLMN discovery procedure information on SIB18 or 19, including any inter-PLMN frequency information. The serving cell's does not require any feedback from the UE to configure the UE with inter-PLMN discovery occasions. Although this is a simpler way to support inter-PLMN discovery procedure, Option 1b has the drawback that the serving cell cannot take into account of the UE's preferences for the inter-PLMN discovery procedure.

Option 2b: With this option the serving cell would broadcast in SIB18 or 19 the discoverable frequencies from other PLMNs. The UE could indicate to its serving cell its intention for monitoring discovery resources in one or more frequencies from other PLMNs. Based on the discovery interest indication, the serving cell may configure the UE with inter-PLMN discovery occasions suitable for the UE's needs.

Option 2b has the advantage that the configuration of discovery occasions can be precisely determined by the serving cell based on the UE's frequency of interest. It does have the drawback that additional signaling is needed to broadcast the inter-PLMN frequencies in the SIB and the need for the UE to send discovery interest indication to the serving cell before the UE can be properly configured with discovery occasions.

Both options also have some drawbacks; however, Option 2b is preferable since the serving cell may limit the discovery occasions to only those frequencies of interest to the UE.

Proposal 7: Assuming SIB18 or 19 information is exchanged among PLMNs, inter-PLMN discovery occasions should be based on the frequencies of interest to the UE.

(A5) Conclusion

In the Additional statement 1, the need for inter-PLMN D2D discovery procedure is discussed and a simple mechanism is provided to support inter-PLMN D2D discovery procedure. Additionally, possible issues and potential solutions are addressed.

(B) Additional Statement 2

(B1) Introduction

In the Additional statement 2, the remaining issues to support inter-frequency and inter-PLMN discovery are discussed along with possible solutions.

(B2) Remaining Issues in Inter-PLMN Discovery Aspect

In this section, we discusses on inter-frequency/inter-PLMN discovery.

(B2.1) FFS on Whether Higher Layer Provides Inter-PLMN Carrier List

It was captured that FFS whether the list of other ProSe carriers could alternatively be provided by higher layers for inter-PLMN carriers, which may be useful for the UE in case where the serving cell cannot provide SIB18 or 19 for some reason. However, to inherit the existing concept, we assume RAN (Radio Access Network) itself should have a responsibility to decide operating frequencies of own cells and to determine which carrier supports discovery. In addition, the higher layer, i.e. ProSe Function, cannot provide the list of carriers for ProSe discovery (D2D discovery procedure) at this point, i.e. it may only provide the radio parameters to be used for ProSe direct communication when not served by E-UTRAN. So, to introduce such higher layer signalings will need to introduce additional interfaces between RAN and ProSe Function. Therefore, we propose that at least Rel-12 should not support the list of other carriers for inter-PLMN ProSe discovery provided by higher layers.

Proposal 1: At least in Rel-12, it should assume only RAN provides the list of inter-PLMN frequencies which support ProSe discovery.

Figure 21:
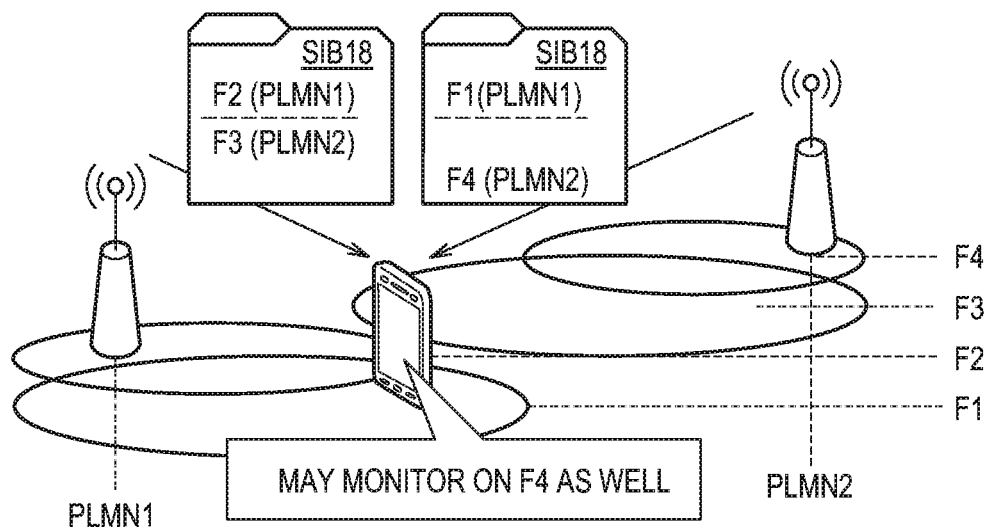
FIG. 21 is a diagram for describing a case of unmatch of a list in an SIB 18 from a different PLMN.

(B2.2) Further Clarifications of Current Agreements (B2.2.1) UE Behaviour Upon Reception of the List of ProSe Discovery Carriers An eNB may provide in SIB a list of carriers on which the UE may aim to receive ProSe discovery signals. This agreement sounds like the list is either restriction or assistance for the UE or both. Since the monitoring of inter-PLMN discovery signals will be performed after the existing PLMN selection procedure, we need to define the UE behaviour upon reception of the list more clearly. We see it's preferable the list is just for assistance information for the monitoring UE to reduce unnecessary power consumption, i.e. the UE may or may not monitor only ProSe discovery signals transmitted on the carriers provided in the list. It intends, for example, if the UE notices additional ProSe carriers in the list in the other PLMN's SIB18 or 19 (i.e. PLMN 2), where the additional ProSe carriers were not listed in the serving cell's SIB18 or 19 (i.e. PLMN 1), then the UE may monitor discovery signals transmitted on the additional ProSe carriers, as figured in FIG. 21. Furthermore, it could additionally be considered that the UE may further decide whether to monitor discovery over yet another PLMN (i.e. PLMN 3 not illustrated in FIG. 21) regardless whether the frequency is listed in SIB18 or 19 received from PLMN 1 or PLMN 2, as long as the UE has authorization to do so over higher layer and no impact on Uu reception.

Proposal 2: The UE is not required from the serving cell to tune onto carriers other than the ProSe carriers which exist in the list of SIB18 or 19. Further it should not be any restriction for the UE to monitor frequencies which do not exist in the list of SIB18 or 19.

(B2.2.2) Clarification on "ProSe Reception does not Affect Uu Reception"

The above agreement stated that ProSe reception does not affect Uu reception (e.g. UEs use DRX occasions in IDLE and CONNECTED to perform ProSe discovery reception or it uses a second RX chain if available). The main intention of this agreement was for the UE to avoid the use of autonomous gap for ProSe discovery. This means the eNB-configured gap is not considered as affecting Uu reception, which is based on the existing mechanism for measurement gap procedure.

Confirmation 1: An explicit eNB-configured gap is not considered as affecting Uu reception.

As suggested in ProSe discovery using only DRX occasion may result in degradations of discovery probability, i.e. best-effort discovery. Although a UE capable of dual Rx chains has additional benefits, RAN1 currently assumes a single receiver for discovery. Furthermore, it assumes non-public safety UE may not be able to receive simultaneously on the DL and UL spectrum of FDD carriers supporting D2D.

Observation 1: If only DRX occasions are used, discovery opportunities may be severely limited.

Considering the potential degradation in using only DRX occasions, the discovery occasions should be based on the existing gap mechanism. However, in order for the gap mechanism to work for discovery, the serving cell should have knowledge of detailed ProSe discovery procedure information about the other inter-PLMN carriers in order to configure the UE, which is interested in discovery monitoring, with appropriate parameters. Since it was agreed that the UE should read SIB18 or 19 of the other inter-PLMN carriers to monitor discovery signals transmitted on such carrier, it would be assumed that the UE should have a capability to inform the serving cell of the detailed ProSe discovery procedure information which the UE has already obtained. If the serving cell doesn't have any information of detailed ProSe discovery configuration among concerned PLMNs, i.e. no NW-level coordination (i.e. inter-OAM or inter-RAN detailed discovery information sharing) is provided, the following two options could be considered for the serving cell to obtain the information before it decides whether to configure gaps for the UE.

Option 1: The UE forwards the full or subset of SIB18 or 19 which is received from inter-PLMN cells to the serving cell. It is FFS when the UE should send inter-PLMN SIB18 or 19 information to the serving cell.

Option 2: The UE informs the serving cell of the possible gap occasions, e.g. a gap pattern, which the UE has determined based on SIB18 or 19 received from inter-PLMN cells.

From the signaling overhead perspective, Option 2 is more preferable than the Option 1 since Option 1 may require that the UE forwards multiple SIB18s or 19s to the serving cell. In comparison, Option 2 only requires that the UE informs the serving cell of the desired gap pattern. It is FFS whether the serving cell could indicate whether inter-PLMN coordination among NWs can be assumed or whether the NW can decide if UE assistance is needed for inter-PLMN discovery.

Proposal 3: The serving cell should configure the UE with gaps for inter-PLMN discovery monitoring, which may be based on a gap pattern requested by the UE.

(B3) Remaining Issues in Inter-Frequency Discovery Aspect

In this section, we discuss on inter-frequency/intra-PLMN discovery.

(B3.1) FFS on Whether (as a Configuration) Option an eNB May Provide Detailed ProSe Discovery Information about Other Intra-PLMN Carriers.

In contrast to inter-PLMN discovery, with intra-PLMN discovery, it may be assumed that the serving cell has knowledge of the detailed ProSe Discovery procedure information of its neighbour cells regardless of whether the serving cell provides the detailed ProSe Discovery procedure information directly to the UE.

The above FFS suggests that the serving cell may provide not only its SIB18 or 19 information but also detailed ProSe Discovery procedure information of other intra-PLMN frequencies. In our view, the significance of this FFS is not so much whether the serving cell would provide ProSe discovery procedure information of inter-frequency cells to UEs, but that the serving cells actually has coordination with inter-frequency cells. With only the latter information, it would be possible for the serving cell to configure appropriate gaps for the UE for inter-frequency ProSe discovery procedure without providing detailed information.

Table 1 provides a comparison for the two cases, 1) UE obtain SIB18 or 19 directly from other carriers (baseline), 2) UE obtains SIB18 or 19 information only from its serving cell (FFS). While both schemes have drawbacks, the FFS scheme (case 2) has benefits to reduce UE complexity and to allow network-configurable operations. The baseline scheme (case 1) depends on the existing DRX mechanism; therefore, even if the UE obtains the SIB18 or 19 from the other carriers directly, the information isn't of much use to the UE if the discovery occasions are very limited. Therefore, we propose as a configuration option that an eNB has a capability to provide detailed ProSe Discovery information about other intra-PLMN frequencies.

Proposal 4: it should agree that as a configuration option an eNB may provide detailed ProSe Discovery procedure information about other intra-PLMN carriers via SIB and/or dedicated signaling.

Even if the proposal 4 is not agreeable, an alternative scheme is available to be discussed. As shown in Table 1, the network-configurable discovery occasion is beneficial to ensure the discovery performances as well as to reduce UE complexity. It may be assumed that the serving may obtain the SIB18 or 19 information of inter-frequency, neighbour cells through OAM With this alternative, the UE does not need to inform the serving cell of full or a subset of SIB18s or 19s on other carriers as well as the serving cell does not provide full contents of SIB18 or 19 on other intra-PLMN frequencies, but it has a capability to configure the UE with gaps for discovery monitoring. Since the drawback (signaling load) can be removed, this alternative scheme could become a compromise solution.

Proposal 5: Even if it is not agreeable for the serving cell to provide detailed ProSe discovery information to the UE, it should agree that the serving cell should configure the UE with appropriate gaps for discovery monitoring.

Figure 22:
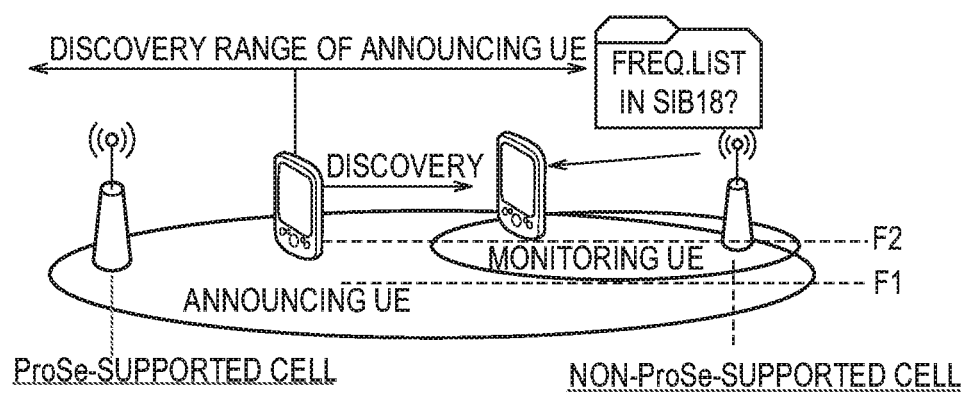
FIG. 22 is a diagram for describing a case where a UE camping on a non-ProSe support cell monitors.

(B3.2) Further Clarifications of Current Agreements (B3.2.1) Whether the Serving Cell not Supporting ProSe Discovery on its Carrier can Provide the List of Other ProSe Carrier Although it was agreed that an eNB may provide in SIB a list of (intra-PLMN-inter-frequency and/or inter-PLMN-inter-frequency) carriers (possibly with the corresponding PLMN ID) on which the UE may aim to receive ProSe discovery signals, it should be clarified whether the serving cell not supporting ProSe discovery on its carrier can provide the list of other ProSe carrier, as depicted in FIG. 22.

FIG. 22 shows an example where the monitoring UE camped on the serving cell which does not support ProSe discovery wants to know the list of carriers which support ProSe discovery. If the serving cell provides the list of

TABLE 1

| | Item | UE obtains SIB18 or 19 directly from other carriers (case 1: baseline) | UE obtains SIB18 or 19 only from serving cell (case 2: FFS) |
|---|---|---|---|
| Network complexity | Signaling overhead per carrier (on SIB or dedicated signaling) | 1 × (SIB18 or 19) ☺ | <(# of frequencies) × (SIB18 or 19) ☹ |
| | Monitoring occasion | Up to UE (so far) ☺ | Serving cell assigned gaps ☹ (assuming inter-eNB coordination of ProSe configurations.) |
| | OAM configuration | (# of cells) ☺ | (# of cells) × (# of frequencies) ☹ |
| UE complexity | SIB decoding | (# of frequencies) ☹ | 1 [only serving cell] ☺ |
| | Monitoring occasion | UE-based decision ☹ (e.g. DRX occasion) UE may inform gap patterns ☹ | Serving cell assigned gaps ☺ |
| Comparison | Benefits ☺ | Lighter signaling Low complex network. Smaller OAM efforts. | UE complexity is reduced. Network-configurable occasion i.e. gap, to ensure discovery performance. |
| | Drawbacks ☹ | UE complexity, which should decode SIBs on each carrier and may decide when it tunes to which carriers. | Heavier signaling load. Network complexity, which needs management of gaps. Bigger OAM efforts on parameter settings for SIB18s or 19s. | carriers in its SIB, the behaviour of the monitoring UE is the same as the agreed inter-frequency discovery.

Proposal 6: The serving cell which does not support ProSe discovery on its carrier should also provide in SIB the list of other ProSe carrier (and detailed ProSe discovery procedure information if the Proposal 4 is agreeable).

(B3.2.2) NW Behaviour Upon Reception of ProSe Indication

It was agreed that for both ProSe discovery (D2D Discovery procedure) and communication the UE sends ProSe Indication to inform the serving cell of its intention for discovery. For ProSe communication, it was captured that the eNB behaviour upon reception of the ProSe Indication includes the options for handover to move the UE towards the carrier which supports ProSe communication. However, for ProSe discovery the NW behaviour upon reception of the ProSe indication is still unclear; therefore, the UE behaviour is also not clear, e.g. what triggers the UE to transmit ProSe Indication.

Proposal 7: It should discuss the NW's expected behaviour upon reception of the ProSe Indication for discovery.

Some of the candidate NW behaviours are as follows:

(A) Handover; for the purpose of load balancing, the eNB may move the UE to appropriate carrier depending on whether the UE indicates "interested" or "no longer interested" within the ProSe Indication message for discovery.

(B) ProSe discovery configuration change; to assign suitable occasion for discovery monitoring, the eNB may reconfigure the UE with either updated DRX parameters or gaps (if proposal 3, 4 or 5 is acceptable), upon reception of the ProSe Indication that the UE is interested in inter-frequency discovery.

Note that the other aspect for reception of intra-frequency interests is discussed.

Observation 2: Upon reception of ProSe indication for discovery, the serving cell has the option to perform handover and/or change the UE's DRX configuration to assist with discovery monitoring.

(B3.2.3) ProSe Indication Details (B3.2.3.1) Frequency Information

Although it was not discussed for discovery, the ProSe Indication for communication was agreed to include the intended ProSe frequency to support the ProSe communication involving transmission and reception. For discovery purpose, it will be also beneficial to include the intended frequencies in the ProSe Indication. For example, if the UE indicated that the frequency of interest is the serving frequency then handover will likely not be needed.

And if the UE indicated its frequency of interest is a different frequency then it may be necessary for the serving cell to handover the UE to the indicated frequency or at least provide the UE with gaps for monitoring discovery on that frequency. Although the UE may not have any preferences which frequency it's interested in, there are some possibilities in the future whereby an application-specific frequency is indicated in the higher layer or UE has history information regarding discovery on a particular frequency(ies)). For example, if the serving cell configured gaps for the UE on a particular frequency and the UE was able to receive the discovery signal of interest on this frequency, it would be helpful if the UE indicates this frequency to the serving cell in case the serving cell subsequently configures gaps for a different frequency of no interest to the UE.

In case the frequency of interest is the serving frequency, it's FFS how the UE would indicate the interest for intra-frequency discovery monitoring, e.g. whether the UE just indicate the serving frequency as the indicated frequency.

Proposal 8: It should agree to allow the UE to include a list of frequencies of interest in the ProSe Indication.

Although it's still FFS whether the ProSe Indication for discovery can also inform of interests for inter-PLMN discovery, the list of frequency in the proposal 8 may be used to distinguish such case by means of, e.g. the serving cell compares the list of frequency in the ProSe Indication and the list of frequency in its own SIB. If the proposal 3 to obtain information to configure gap is acceptable, the serving cell should perform appropriate actions for it upon reception of the ProSe Indication which implies inter-PLMN discovery monitoring.

Proposal 9: It should agree to allow the ProSe Indication to inform of intention for inter-PLMN discovery reception in addition to intra- or inter-frequency discovery.

(B3.2.3.2) Independent or Integrated with UE Assistance Information (UEAssistanceInformation)

For a similar functionality with the ProSe Indication, it has been agreed that, as baseline, re-use the UEAssistanceInformation message for requesting ProSe discovery resources, which was essentially assumed only for a request of transmission resources for Type 2B discovery (That is, a procedure in which resource for announcing the discovery signal is dedicatedly allocated to each UE). Therefore, the issue is whether the ProSe Indication should be integrated with the baseline agreement. The functions are listed in Table 2.

TABLE 2

| | | UEAssistanceInformation | ProSe Indication for discovery |
|---|---|---|---|
| Intra-frequency Intention May include inter-cell | Discovery Announcing | Can intend (as request for dedicated resources) | No (yes, if proposal 11 is acceptable) |
| | Discovery Monitoring | No | Yes |
| | Communication Transmission & reception | No | Yes (not restricted to intra-freq.) |
| Inter-frequency Intention May include inter-PLMN | Discovery | No | Yes, without intended freq. (With intended freq., if proposal 8 is acceptable) |
| | Communication Intended frequency | No | Yes |

TABLE 2-continued

| | | UEAssistanceInformation | ProSe Indication for discovery |
|---|---|---|---|
| Expected eNB behaviour | Discovery | Type 2B transmission resource allocation | May RRM measurement configuration May handover (observation 2) May discovery Configuration change (observation 2) |
| | Communication | None | RRM measurement configuration Handover RRC Connection Release |

In comparison, the UEAssistanceInformation was intended for simply request the transmission resource in intra-frequency operation, while the ProSe Indication may have much functionality involving inter-frequency operations. However, no reason can be seen to have two independent messages for similar functionality, unless the eNB and/or UE behaviours are conflicted. Although such confliction may occur when the ProSe Indication indicates interest in intra-frequency discovery announcing if the proposal 11 is acceptable, it can be distinguished by what type of serving cell receives the indication, i.e. either a ProSe-supported cell allocates Type 2B resource or a non-ProSe supported cell may initiate handover. Therefore, to merge both messages into one message is preferable, and if it's acceptable, a new message for the ProSe Indication should be introduced to carry the complex contents, similar with the existing approach for MBMSInterestIndication.

Proposal 10: A single RRC message for the ProSe Indication should be introduced with merging the existing function assigned to the UEAssistanceInfomation as a baseline.

(B3.2.3.3) Announcing Intention

The ProSe Indication for discovery was agreed to inform of the intention for monitoring. In case where the UE wants to perform discovery announcing but is now connected to non-ProSe supported cell (see FIG. 22), it should be considered how to deal with such dead-lock condition for the UE. A possible solution may be to inform the serving cell of the announcing intention in the ProSe Indication, wherein the UE expects the serving cell to perform handover to a ProSe-supported carrier. With this information, the serving cell could for example decide whether it is necessary to handover the UE to a ProSe supported cell. In case the UE has dual receivers and doesn't have intention for discovery announcing, it may suitable to handover the UE to a non-ProSe supported cell (perhaps one that is less congested) and allow the UE to use its $2^{nd}$ receiver for discovery monitoring.

Proposal 11: The UE should inform the serving cell of the intention for discovery announcing.

(B3.2.4) Priority Handling in RRC IDLE

Before the discussion on priority handling in RRC IDLE UEs, it should be clarified how to support inter-frequency discovery. In MBMS case, the UE to attempt the MBMS reception should camp on the cell which provides an MBMS service the UE is interested in, as long as the UE has a single receiver. On the other hand, the discovery monitoring seems not to be required camping on the cell which supports ProSe discovery in accordance of the implication, i.e. "Intra- and inter-frequency (and inter-PLMN) ProSe reception does not affect Uu reception (e.g. UEs use DRX occasions in IDLE and CONNECTED to perform ProSe discovery reception or it uses a second RX chain if available). The UE shall not create autonomous gaps." This is likely a similar approach to CRS reception in the existing inter-frequency measurement. However, it's still not clear whether the UE is required to camp on that cell for inter-frequency discovery monitoring.

Figure 23:
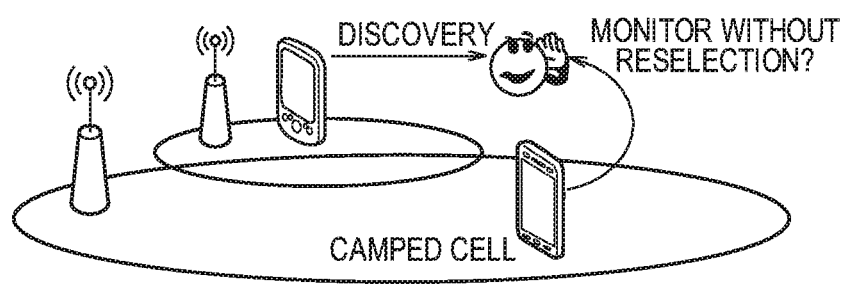
FIG. 23 is a diagram for describing a discovery monitoring that does not require a cell reselection.
Figure 24:
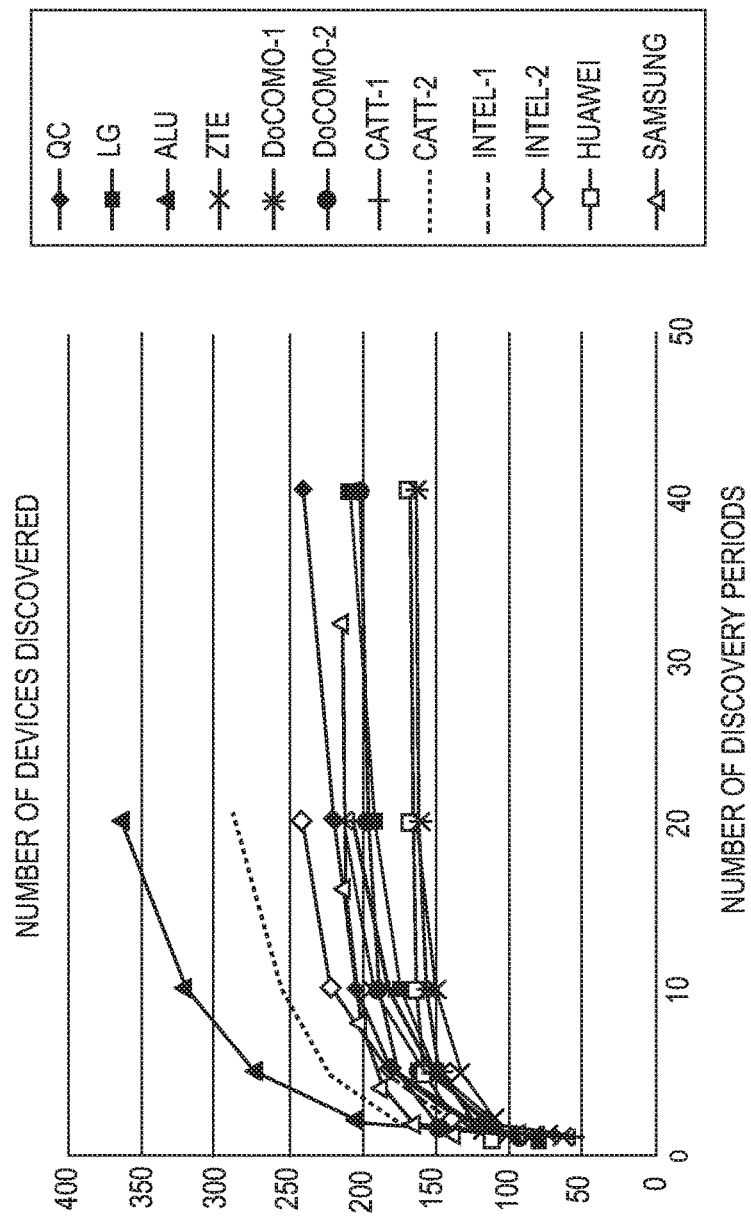
FIG. 24 is a diagram for describing an evaluation result relating to Discovery.

Confirmation 2: The UE which attempts inter-frequency (and inter-PLMN) discovery monitoring is not required to camp on the cell which supports ProSe discovery (See FIG. 23).

As discussed in section (B3.2.2), the load balancing among inter-frequency cells including non-ProSe supported cells may be optimized using handovers with the ProSe Indication depending on whether the UEs in RRC CONNECTED are interested in ProSe discovery. However, it isn't clear whether there is any need for modifying the existing reselection procedure and priority to accommodate UE's interested in discovery monitoring. In particular, any changes to the reselection procedure and priority should be carefully considered considering the issue with idle mode load balancing that is specifically configured for UEs through CellReselectionPriority provided in SIB5 or by dedicated signaling.

At least for UEs no longer interested in ProSe discovery, the UEs should follow the existing reselection priority configured by the eNB.

Observation 3: IDLE UEs no longer interested in ProSe discovery shall follow the existing rules for cell reselection priority.

Then, it should further consider whether the UE in IDLE is allowed to prioritize ProSe discovery over the existing cell reselection procedure when the UE is interested in ProSe discovery. If the inter-frequency cell is not synchronized with the serving cell, it should be considered whether the existing DRX occasions is sufficient for discovery monitoring on another frequency. Additionally if the UE interested in ProSe discovery monitoring also tends to be interested in ProSe discovery announcing, it may be better that the UE camps on a cell operated on a carrier listed in SIB18 because it can avoid to perform reselection before transmitting discovery signals. However, if the UE is only interested in discovery monitoring, there seems to be no overriding reason to prioritize the carrier listed in SIB18 or 19 during cell reselection. Therefore, whether or not the prioritization of the ProSe carrier is needed depends on the assumption for the UE being interested in ProSe discovery monitoring.

Proposal 12: It should discuss whether UE being interested in ProSe discovery should be allowed to prioritize for ProSe discovery during cell reselection.

(B4) Conclusion

In the Additional statement 2, the remaining issues for support of inter-frequency and inter-PLMN discovery are discussed and the clarifications on current agreements are provided. The necessary extensions for the discovery monitoring procedure and the ProSe Indication are addressed. Additionally, the consideration on the existing cell reselection procedure is provided.

(C) Additional Statement 3

(C1) Introduction

The open issues on D2D discovery were captured but some of them were not discussed. In the Additional statement 3, the open issues are discussed to support inter-frequency/inter-PLMN discovery in Rel-12.

Need for additional gaps (besides DRX occasions) in which the UE can tune to other frequencies for receiving ProSe discovery signals? If so, should those be autonomous or configured? If configured, how does the eNB where to provide the additional gaps?

Further need to clarify prioritization between Uu and PC5 transmission/reception?

(C2) Needs for Additional Gaps for Discovery Monitoring

It had performed evaluation of D2D discovery procedure (D2D discovery) in the study phase and the result was captured. According to the system level simulation, the discovery performance, as measured by the number of devices discovered, is dependent on how many periods the UE can announce/monitor discovery signals. However, even if sufficient discovery periods are provided by the network, the number of devices discovered is contingent on the opportunities for the UEs to announce/monitor during the discovery periods. For intra-frequency discovery, since the serving cell provides the reception pools of both the serving cell and the neighbour cells, the discovery performance is guaranteed according to the rule agreed;

For FDD carriers:

least for UEs with a single Rx chain (FFS subject to the UE capability discussion whether this also applies for UEs with a shared D2D/cellular Rx chain), a UE that is receiving D2D discovery signals on an UL carrier is not expected to read DL signals on the DL carrier paired to such UL carrier during the subframes belonging to the D2D discovery pools on that UL carrier as well as one subframe preceding and following these subframes. The discovery pools are configured by the eNB by broadcast or UE-specific signaling. FFS: For RRC_CONNECTED UEs, 1 bit may be signalled using RRC signaling indicating whether this rule applies or not (on a per UE basis)

Cellular measurement gaps subframes are excluded from this rule.

Paging reception is prioritized over D2D reception.

For TDD carriers:

A UE configured by the eNB to monitor D2D on a certain carrier is expected to read DL signals on that carrier according to legacy procedures.

And for inter-frequency discovery procedure (inter-frequency discovery) or inter-PLMN discovery procedure (inter-PLMN discovery), the UE, with a single Rx chain, may use DRX occasions to avoid any degradation to Uu reception. ProSe discovery procedure using only DRX occasion may result in degradations of the discovery performances, i.e. best-effort discovery procedure and the number of devices discovered will be significantly limited even if there were sufficient discovery periods.

Observation 1: If only existing DRX occasions are used, discovery opportunities may be severely limited.

To ensure moderate performance for inter-frequency and inter-PLMN discovery and to realize some of the performance gains from the discovery periods provided by the network, additional gaps for discovery monitoring for should be introduced. The gaps may be based on the subframes belonging to the D2D discovery pool for the specific UL carrier based on RAN1's agreements above.

Proposal 1: Gaps for discovery signal monitoring should be introduced in addition to the existing DRX occasion (See FIG. 10).

(C 3) Additional Gaps (C3.1) Working Assumptions

To form a common view as working assumption, the knowledge of the serving cell should be clarified.

With intra-PLMN discovery, it may be assumed that the serving cell has knowledge of the detailed ProSe discovery procedure information of its neighbour cells although it's already agreed that the serving cell does not provide detailed ProSe discovery procedure information for inter-frequency neighbour cells in SIB19. It's up to OAM or deployment policy whether the eNB is configured with such information. However, we believe such tight coordination among networks should not be extended to inter-PLMN discovery procedure.

Confirmation 1: As a working assumption, tight coordination among PLMNs should not be assumed, while it may be assumed for intra-PLMN case.

According to the working assumption in Confirmation 1, OAM may be able to provide the necessary coordination among inter-frequency, intra-PLMN cells such that the serving cell would be able to configure the UE with appropriate gaps, e.g. DRX configuration. However, for the inter-PLMN scenario, the situation is different and no coordination among cells belonging to different PLMNs may be assumed. Therefore, the serving cell should have a means to obtain the information from the UE, since the UE may have already obtained the information directly from the other PLMN, e.g. during DRX occasion.

Proposal 2: There should be a means for the serving cell to obtain detailed ProSe discovery information from the UE.

If Proposal 2 is agreeable, it should also consider the control for the overhead associated with the transfer of detailed ProSe discovery procedure information from the UE to the serving cell. If the serving cell were able obtain detailed ProSe discovery procedure information through OAM, then it isn't necessary for the UE to provide such information to the serving cell. Additionally, if the serving cell already obtained such information from a UE it won't be necessary for other UEs to provide the same information, as long as the information has the same contents. Therefore, the serving cell should indicate in SIB or dedicated signaling whether the UE should provide the detailed ProSe information from inter-frequency neighbour cells.

Proposal 3: The serving cell should have a means to indicate in SIB or dedicated signaling (possibly for each frequency carrier listed in SIB19) whether the serving cell has already acquired all the inter-frequency neighbour cell information needed for assigning discovery gaps to the UE.

(C3.2) Additional Gap Alternatives

If the proposal 1 is agreeable, additional gap alternatives should be discussed. The possible alternatives listed below were previously provided.

ALT 1: Reuse the existing measurement gap.

ALT 2: Autonomous gap under permission of the serving cell.

ALT 3: New discovery gap configured by the serving cell.

ALT 4: New discovery gap configured by the serving cell, which is based on a gap pattern requested by the UE.

With ALT 1, the existing measurement gap may be a mismatch with the complex resource pool pattern and may not ensure reasonable discovery procedure performance as described in Observation 1. The existing measurement gap is fixed at 6 subframes while the discovery period is configurable from 32-1024 radio frames. In addition, it may be necessary to clarify in the specification when the existing gap for inter-frequency measurements may be reused for discovery monitoring. Based on the rule, cellular measurement gaps are excluded for use in ProSe discovery procedure. If the extended DRX configuration could be reused for discovery monitoring, the definition of the Power Preference Indication should be extended to allow its use for ProSe discovery procedure. But even with such an extension, it may still not be possible to cover all the necessary discovery periods without further coordination.

Regarding ALT 2, although it was already agreed that the UE shall not create autonomous gaps, it may be useful as long as it's allowed by the serving cell, especially if the UE can obtain the patterns of resource pools of other carrier by decoding SIB19s as pointed out. This is particularly beneficial in the inter-PLMN scenario, since it is assumed that the serving cell has no knowledge of detailed ProSe discovery procedure information belonging to inter-PLMN cells.

ALT 3 may work well in the intra-PLMN case; however, it's questionable if it will also work for inter-PLMN case due to lack of knowledge in the serving cell, as mentioned above.

ALT 4 may be considered as a harmonized solution between ALT 2 and ALT 3 and it can also provide a unified mechanism for support of both intra- and inter-PLMN discovery. Therefore, ALT 4 should be introduced as the baseline mechanism for the additional gap for discovery monitoring.

Proposal 4: The serving cell should configure the UE with gaps for inter-frequency and/or inter-PLMN discovery monitoring, which may be based on a gap pattern requested by the UE.

(C4) Discovery Monitoring Gap Details (C4.1) Request of Gap Assignment from the UE Assuming the UE can obtain the resource pool configurations of interest directly from the SIB of other carriers including other PLMNs, the UE could inform the serving cell of the desired gap patterns for discovery monitoring. The gap pattern should be based on the subset of the RRC parameter defined, i.e., discoveryPeriod, discoveryOffsetIndicator, discoverySubframeBitmap and discoveryNumRepetition for the serving cell and neighbour cells. Therefore, the IE structure should be common with the parameters.

Proposal 5: The gap pattern requested by the UE should be based on the subset of the RRC parameters defined by RAN1.

Following the current agreements, the resource pool offset, which is described by discoveryOffsetIndicator, should be provided with respect to SFN=0 of the serving cell as one value.

Proposal 6: discoveryOffsetIndicator for the gap pattern in the request sent from the UE should be provided with respect to SFN=0 of the serving cell as one value.

The issue to be discussed is whether the request contains only one pattern or multiple patterns, i.e., an integrated pattern for all other carriers or separated patterns for each carrier. Although the separated patterns may allow more flexibility for the gap assignment performed in the serving cell, from overhead reduction perspective it's preferred to inform of an integrated pattern in the request.

Proposal 7: A single pattern which integrates all resource pool patterns of interest should be informed in the request from the UE.

Obviously, the request comes up with the UE's interest of discovery monitoring. Therefore, it's quite natural to include the request of gap assignment in the ProSe Indication. If the Proposal 3 is acceptable, it may be also under control of the serving cell whether the UE includes the gap pattern in the request.

Proposal 8: The ProSe Indication may include the request of gap assignment with required gap pattern.

(C4.2) Gap Assignment as Response to the UE

Upon reception of the ProSe Indication which includes the request of gap assignment, it is up to the serving cell to decide whether to use the UE requested gap pattern for gap assignment through dedicated signaling.

Proposal 9: Upon reception of the ProSe Indication which includes the request for gap assignment, the serving cell may configure the UE with acceptable gap pattern using dedicated signaling.

(C5) Conclusion

In the Additional statement 3, the necessity of additional gaps for discovery monitoring is discussed. The alternatives for the gap assignment mechanism are introduced and the signaling details are considered. Additional controls for overhead reduction are provided.

(D) Additional Statement 4

(D1) Introduction

In the Additional statement 4, it is discussed to optimize ProSe discovery mechanism for more efficient inter-PLMN operations from both announcing and monitoring perspectives.

(D2) Discovery Announcing Aspects (D2.1) Assumptions Built on the Agreements

Figure 25:
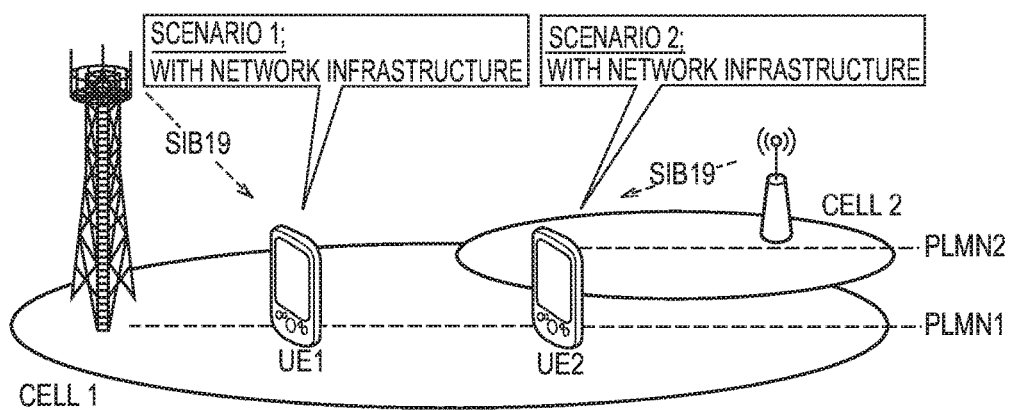
FIG. 25 is a diagram for describing a scenario for a frequency-to-frequency discovery procedure announcing (inter-frequency discovery announcing).

In the last meeting, the two scenarios are agreed as illustrated in FIG. 25, i.e., with/without network infrastructure. For the scenario with network infrastructure, the baseline scenario to consider is uncoordinated inter-PLMN, and it was clarified that the "uncoordinated" means an eNB did not know the configuration of the other eNB belonging to the other PLMN. In addition to the configuration aspects, it should not be assumed that there is no synchronization between PLMNs.

Proposal 1: There is no synchronization between PLMNs under the uncoordinated inter-PLMN scenario.

A FFS is captured in the agreement on how the carrier frequency is configured in the UE, in order to acquire SIB19 to learn transmission/reception resource pools (Tx/Rx resource pools). According to Rel-12 specification, it is clear that the serving cell may provide in SIB 19 a list of frequencies along with PLMN ID on which the UE may aim to monitor discovery message. In addition, the ProSe Direct Discovery authorization (non-Public Safety UE) contains; ProSe Direct Discovery announcing authorisation policy ("PLMNs in which the UE is authorized to perform announcing" and "Authorised discovery range for announcing per PLMN").

So, there is no carrier frequency information in the authorization. It could be understood that it's up to E-UTRAN which carrier(s) is used within a (authorized) PLMN.

Proposal 2: The serving cell may indicate the UE of the carrier frequency of different PLMN as is Rel-12.

(D2.2) Additional Procedures for Inter-PLMN Discovery Announcing

For initiation of the inter-PLMN discovery announcing, the serving cell should know whether the concerned UE is aware of cells on the other PLMN. If there is no coverage around the UE in PLMN2 (i.e., scenario 1), the UE may use pre-configured parameters. If the UE detects the cell belonging to the other PLMN (i.e., scenario 2) but under the uncoordinated inter-PLMN scenario, the UE reads SIB19 of the concerned carrier frequency to learn the tx/rx resource pool to use. Else, if the UE detects the cell belonging to the other PLMN (i.e., scenario 2) and the serving cell has inter-PLMN information, the network should have the option to configure the UE similar to the intra-PLMN case, as agreed. For each scenario, there are two important points to define the NW/UE behaviour, whether the UE is in-coverage of the other PLMN or not, and whether the serving cell has inter-PLMN information or not.

Observation 1: The NW/UE behaviour is defined by whether the UE is in-coverage of the other PLMN and whether the serving cell has inter-PLMN information.

(2.2.1) The UE is in-Coverage/Out-of-Coverage on the Other PLMN

It's a question whether the serving cell should determine whether the UE is now in-coverage of the other PLMN or not, while of course the UE knows it. If the serving cell should determine, the UE needs to inform the serving cell of the condition with e.g., the existing measurement reporting. However, it may cause more signaling overhead due to additional iterations. For example, under the coordinated inter-PLMN scenario (i.e., assuming the serving cell has inter-PLMN information), the UE informs the serving cell of the its interest in inter-PLMN discovery announcing first, the serving cell configure the UE with inter-PLMN RRM measurement, the UE sends the measurement report, and then the serving cell provides inter-PLMN discovery configuration, i.e., four iterations are needed.

On the other hand, if the serving cell does not need to determine (i.e., the UE has the responsibility to determine whether it's in-coverage or not), the procedure will be simpler with two iterations such that the UE informs the serving cell that it's "in-coverage" of the other PLMN of interest, and the serving cell performs inter-PLMN discovery configuration. So, the UE should have the responsibility to determine whether it's in-coverage of the other PLMN or not.

Proposal 3: The UE has the responsibility to determine whether it's in-coverage of the other PLMN of interest or not.

Proposal 4: For the coordinated inter-PLMN scenario, the UE should inform the serving cell of its condition whether it is "in-coverage" of the PLMN of interest.

It agreed that the baseline scenario to consider is uncoordinated inter-PLMN. In the uncoordinated scenario, the UE may use Tx resources provided by SIB19 of the other PLMN (in-coverage). On the other hand, the UE may use Tx resources provided by pre-configuration when it is out-of-coverage on the other PLMN of interest. Regardless of the Tx resources to be used, the serving cell should take into account the occasion of inter-PLMN discovery announcing in the Uu scheduling. However, the serving cell does not know the inter-PLMN configurations, i.e., under the uncoordinated scenario or use of pre-configured parameters. So, the serving cell should be informed from the UE of the configurations. It could be considered two alternatives as follows.

Alternative 1: The UE forwards SIB19 of the other PLMN. It may need additional information of time difference between PLMNs.

Alternative 2: The UE informs of a "gap pattern" based on the Tx resource pool(s). The "gap pattern" may be able to align the time difference with the serving cell in the UE.

The alternatives essentially have the same functionality. However, the signaling overhead is different and obviously Alternative 1 needs more bits to inform of the configuration. So, Alternative 2 is preferable.

Proposal 5: The serving cell should be informed from the UE of a "gap pattern" for the purpose of Uu scheduling.

It's natural to inform of the "in-coverage" and "gap pattern" over SidelinkUEInformation, since no reason could not be seen to define new RRC message or to extend the other signaling, e.g., the measurement reporting.

Proposal 6: The SidelinkUEInformation should be extended to inform the serving cell of additional information for inter-PLMN discovery announcing.

(D2.2.2) the Serving Cell has/does not have Inter-PLMN Information

The serving cell may not need to inform the UE of inter-PLMN information availability, if the SidelinkUEInformation is allowed to be transmitted with full information, i.e, both "in-coverage" and "gap pattern", as long as SIB19 is provided. This is simple and minimizes the standard impacts.

However, it's obvious that the "in-coverage" and "gap pattern" will be used exclusively in the serving cell. For example with uncoordinated inter-PLMN, the serving cell may take the "gap pattern" information into its Uu scheduling as discussed in section (D2.2.1), but the "in-coverage" condition is not useful because the serving cell anyway does not care whether the UE uses Tx resources from SIB19 of the other PLMN or pre-configuration (i.e., in-coverage or out-of-coverage). So, the "in-coverage"/"gap pattern" should be informed exclusively in order to reduce unnecessary overhead. In addition, the exclusive information may reduce the UE power consumption, e.g., no need to read SIB19 when only "in-coverage" should be informed.

So, it is useful that serving cell provide its inter-PLMN information availability (i.e., whether coordinated or uncoordinated inter-PLMN scenario) in e.g., SIB19. The UE should choice the contents in SidelinkUEInformation according to the additional information provisioned.

Proposal 7: The serving cell should provide its inter-PLMN information availability.

(D3) Discovery Monitoring Aspects

The agreement that sidelink gap is not supported was quite reasonable assuming best-effort assumption and successfully contributed to Rel-12 WI completion. However, since Rel-13 WI assumes multi-carrier operation, the discovery mechanism will face more difficulty in satisfying the need for "number of devices discovered" which was evaluated in Rel-12. RAN2 should also keep in mind that for UEs with single receiver RAN1 has previously agreed that it's too difficult to ensure a moderate discovery performance even in intra-frequency case let alone for such UEs to support the inter-frequency/PLMN case.

Observation 2: With multi-carrier operation, best-effort assumption on discovery may not work well.

In order to optimize the discovery mechanism for multi-carrier operation, the additional gaps for inter-frequency and inter-PLMN discovery monitoring should be revisited in Rel-13.

Proposal 8: Sidelink gaps for inter-frequency/inter-PLMN discovery monitoring should be supported in Rel-13.

(D4) Conclusion

In the Additional statement 4, the scenarios for intra-PLMN inter-frequency discovery announcing are provided. Based on the analysis of the scenarios, additional procedures to support intra-PLMN inter-frequency discovery announcing are introduced.

(E) Additional Statement 5

(E1) Introduction

It was agreed to introduce the gaps for discovery transmissions/receptions.

To enhance inter-carrier discovery performance for the non-dedicated transceiver case, gaps will be introduced to allow reusing an RF transmitter/receiver chain for direct discovery transmissions/receptions. The gaps should be under network control. FFS if the gap applies both for intra and inter-frequency.

In the Additional statement 5, the details of sidelink gaps for Rel-13 discovery procedure (discovery) are considered taking into account the discussions in Rel-12 and Rel-13.

(E2) Definition of Sidelink Gap

The agreement intends the sidelink gaps should allow the UE to reuse its own single RF chain, consisting of a transmitter and a receiver, for the purpose of downlink/uplink to the serving cell (over Uu) and inter-carrier sidelink discovery (over PC5) in time-division manner. It could be interpreted that the sidelink gaps can be applicable to both of discovery announcing and monitoring, i.e., Tx and Rx.

Observation 1: The sidelink gap can be applied to transmission and reception.

(E2.1) Receiver/Reception Aspects

With regards to discovery reception gap, it was agreed the outline (1 to 4 as follows) in Rel-12.

For FDD carriers:

1. At least for UEs with a single Rx chain (FFS subject to the UE capability discussion whether this also applies for UEs with a shared D2D/cellular Rx chain), a UE that is receiving D2D discovery signals on an UL carrier is not expected to read DL signals on the DL carrier paired to such UL carrier during the subframes belonging to the D2D discovery pools on that UL carrier as well as one subframe preceding and following these subframes.

2. The discovery pools are configured by the eNB by broadcast or UE-specific signaling. FFS: For RRC_CONNECTED UEs, 1 bit may be signalled using RRC signaling indicating whether this rule applies or not (on a per UE basis).

3. Cellular measurement gaps subframes are excluded from this rule.

4. Paging reception is prioritized over D2D reception.

It should be natural that the definition of Rel-13 sidelink gaps should be aligned with the Rel-12 agreements in RAN1 as long as possible. According to the agreement No. 1, the UE is not required to decode any downlink signals in the subframes configured with discovery pools for discovery reception and one subframe preceding and following the subframes for RF re-tuning (i.e., guard period). It should be indicated by the sidelink gap as e.g., the bitmap pattern. It should be noted that the cellular measurement gaps subframes and paging reception should be prioritized over the sidelink gap, according to the agreements No. 3 and 4.

Proposal 1: The sidelink gap should indicate the subframes in which the UE is not required to read any downlink signals.

Proposal 2: The subframes configured with measurement gaps and paging occasions should be prioritized over discovery reception.

It could be noticed that the RAN1 agreement did not take intra-frequency measurements into account, from the perspective of enhancements in Rel-13. It could be natural to prioritize intra-frequency measurements should be prioritized over inter-frequency discovery reception, as same as the measurement gap case. In other words, the sidelink gap may be interrupted by intra-frequency measurements.

Proposal 3: The inter-frequency discovery reception may be interrupted to fulfil the minimum performance for intra-frequency measurements.

If Proposal 1 and Proposal 2 are agreeable, the FFS under the RAN1 agreement No. 2, For RRC_CONNECTED UEs, 1 bit may be signalled using RRC signaling indicating whether this rule applies or not (on a per UE basis), would be solved by the configuration of sidelink gap, instead of the "1 bit". Therefore, when the sidelink gap is not configured by the serving cell, the UE should follow the Rel-12 behaviour, i.e., ProSe reception does not affect Uu reception (e.g. UEs use DRX occasions in IDLE and CONNECTED to perform ProSe discovery reception or it uses a second RX chain if available).

Proposal 4: If the sidelink gap is not configured by the serving cell, the UE should follow the Rel-12 behaviour for discovery monitoring.

It should be also considered how the sidelink gap is configured and coexists with the other prioritized operations, i.e., the measurement gap, the paging occasion and intra-frequency measurement. Three options could be considered as follows.

Option 1: The serving only assigns the part of the sidelink gap that doesn't overlap the inter-frequency measurement gap. Also the sidelink gap should not overlap the paging occasions and intra-frequency measurement. With this option, no further prioritization needs to be defined under UE behaviour, although NW complexity will increase, e.g., complex configuration is needed.

Option 2: The serving cell refrains from assigning any discovery gap when there is an overlap with the inter-frequency measurement gap. With the option, inter-frequency measurement prioritization is not needed but the UE loses some opportunity to perform discovery reception. Also, the configuration is more complex.

Option 3: The serving cell provides both inter-frequency measurement gap and sidelink gap independently without regards to possible overlap. It may be also independent from the paging occasions and intra-frequency measurement. With this option, the prioritization needs to be defined, while actual overhead is minimized e.g., by configuration using simple bitmap/pattern. Option 1 and 2 rely on NW implementation and the benefit is to avoid the standardization efforts in prioritization for coexistence of the other receiver activities. Option 3 needs to define the prioritization but the signaling overhead may be reduced. From the efficiency in practical network, Option 3 is slightly preferred. It's FFS whether to include PHICH reception in this prioritization rule.

Proposal 5: It should discuss whether a new prioritization rule needs to be defined for the UE to take into account of the possible overlap among the sidelink gap, the measurement gap, the paging occasion and/or the intra-frequency measurement opportunity.

(E2.2) Transmitter/Transmission Aspects

The discovery signals are transmitted in one or more occasions within the reception pools, i.e., the transmission occasions are subset of the reception pools. In the subframes indicated by the sidelink gap, the UE does not decode PDCCH and does not receive uplink grants accordingly. However, for the first 4 subframes in the sidelink gap, the uplink transmissions are still possible since the uplink grant may be received in 4 subframes preceding the sidelink gap; therefore the discovery announcements cannot be protected in the first 4 subframes. For the first 4 subframes of sidelink gap, the two alternatives could be considered;

Alt.1: The serving cell configures the sidelink gap with 4 subframes ahead of the actual period of discovery resources.

Alt.2: The UE is not required to obtain uplink grants but still needs to read the other downlink signals in the 4 subframes preceding the sidelink gap.

Alt.3: The UE needs to prioritize uplink transmission even during the sidelink gap when the serving cell sends the uplink grant e.g., within the 4 subframes preceding the sidelink gap.

Alt.1 is considered as simple way around, but it would miss the opportunity of downlink transmission excessively. On the other hand, Alt.2 could solve the issues in return for extra standardization efforts. Alt.3 does not require any additional rule for the uplink grant, although the opportunity of discovery transmission may be reduced. Since one of the objectives of this WI is "Enhance D2D discovery support in the presence of multiple carriers and PLMNs", it's slightly our preference to maximize both occasions for Uu and discovery with Alt.2.

Proposal 6: The UE should not be required to obtain uplink grants in the 4 subframes preceding the sidelink gap.

(E2.3) Single Sidelink Gap Configuration

The sidelink gap has implied various assumptions; for example, the agreements states that "FFS if the gap applies both for intra and inter-frequency", i.e., whether the gap is only for inter-frequency discovery or for both? If both then whether it uses single gap or separate gaps? In addition, it may bring the differentiations with either Type 1 discovery procedure or Type 2B discovery procedure, either announcing or monitoring, and/or either per-frequency or per-PLMN. Although companies did not mention the necessary of separate gaps for each usage in their contributions, it should avoid too much variation of sidelink gaps. From the perspectives of simplicity and signaling overhead, the sidelink gap should be defined with a single "pattern" of subframes in which the UE is not required to read downlink signals as in the Proposal 1. It's up to UE implementation which frequency the UE performs discovery announcing/monitoring during the sidelink gap configured. It could also allow the network degree of freedom of sidelink gap configuration, e.g., it's up to network implementation to adjust the balance between Uu services and discovery performance.

Proposal 7: The sidelink gap should be depicted by a single "pattern" of concerned subframes.

If Proposal 7 is agreeable, the sidelink gap should be also applicable to intra-frequency discovery announcing and monitoring.

Proposal 8: The sidelink gap should be also applicable to intra-frequency discovery procedure.

(E.3) Determination of Sidelink Gap

The gaps should be under network control, thus the serving cell needs to determine the sidelink gap. In the scenario of intra-PLMN and coordinated inter-PLMN, the serving cell knows the resource pool configurations (and possibly the timing offsets for SFN alignment) of the other eNBs belonging to the other frequencies. In this case, if the UE informs the serving cell of the frequencies of interest, the serving cell could easily determine the sidelink gap for this UE 100-2. The frequency information could reuse the current agreement which is currently allowed only for public safety use case. Therefore, the agreement should be enhanced for commercial use case.

Proposal 9: A UE in RRC_CONNECTED shall indicate to the eNB the frequency in which direct discovery transmission is desired, for public safety and commercial use cases.

However, there are the two cases that the serving cell could not determine the sidelink gap for the UE, the uncoordinated inter-PLMN and the pre-configured resources.

The Rel-12 behaviour may be reused for Rel-13 public safety discovery procedure and it's the simplest solution. However, it's worth considering to maintain Uu communication even if the UE is performing public safety discovery procedure on a specific carrier. In order for the serving cell to assign the sidelink gap with least amount of interruption to Uu communication, the serving cell should know the discovery resources provided by un-coordinated, inter-PLMN cells. In this case, the UE may need to inform the serving cell of the information obtained from SIB or UICC.

Proposal 10: For the uncoordinated inter-PLMN scenario, the UE should inform the serving cell of the discovery resources on the non-serving frequency for sidelink gap determination.

It may be also beneficial that the information could include not only the discovery resources but also the timing offset for SFN alignment among PLMNs. To reduce the signaling overhead, the reference point of discovery resource on the non-serving cell could be aligned with the serving-cell's SFN before the UE informs of it.

Proposal 11: If Proposal 10 is agreeable, it should consider if the timing offset of the non-serving PLMN may be provided to the serving cell.

In addition, the behaviour for Rel-12 ProSe communication was assumed under the limitation that "For Rel-12 all ProSe communication (for a UE) is performed on a single preconfigured Public Safety ProSe Carrier, which is valid in the operating region. Higher layers check validity of the Public Safety ProSe Carrier in the operating region." In Rel-13 inter-PLMN discovery, it should not be precluded that the other PLMN is a commercial operator (which is not on the public safety carrier), since the discovery procedure has been assumed for the commercial use case from the beginning. Looking at the market demands and future proofing, the UE may want to maintain both links over Uu and PC5 to communicate with proximity UEs and farther servers. If the sidelink gap is allowed to be configured for this scenario, the UE should inform the serving cell the resource information associated with the uncoordinated PLMN(s). The frequencies associated with the uncoordinated PLMN(s) should also include frequencies operated on e.g., V2V dedicated spectrum in 5.8 GHz.

Proposal 12: The uncoordinated inter-PLMN should also include non-Public Safety PLMNs.

(E4) Conclusion

In the Additional statement 5, the details of sidelink gap are considered from both perspectives of transmitter and receiver. Based on the consideration, the single configuration of sidelink gap is suggested. A solution on how to determine the sidelink gap and enhancement of sidelink UE information are identified. In addition, possible scenarios for Rel-13 discovery procedure are provided.

The invention claimed is:

1. A user terminal, comprising:
a controller configured to;
determine a plurality of frequencies on which the user terminal requires reception or transmission of a discovery signal that is a direct device-to-device radio signal for discovering another user terminal to produce a plurality of determined frequencies; and
determine subframes on which the user terminal needs sidelink gaps to be used to receive or transmit the discovery signal for each frequency of the plurality of determined frequencies;
a transmitter configured to transmit a message to a base station, the message including a plurality of information corresponding to the plurality of determined frequencies, wherein each of the plurality of information includes: frequency information indicating a respective determined frequency of the plurality of determined frequencies; and a bitmap indicating the determined subframes associated with the respective determined frequency, wherein the frequency information is associated with the bitmap; and
a receiver configured to receive configuration information from the base station, the configuration information indicating assigned sidelink gaps provided by the base station, wherein the assigned sidelink gaps are based on the message transmitted by the user terminal,
wherein the transmitter or the receiver uses the assigned sidelink gaps to transmit or receive the discovery signal.

2. An apparatus for a user terminal comprising:
a processor and a memory, the processor configured to cause the user terminal to:
determine a plurality of frequencies on which the user terminal requires reception or transmission of a discovery signal that is a direct device-to-device radio signal for discovering another user terminal to produce a plurality of determined frequencies;
determine subframes on which the user terminal needs sidelink gaps to be used to receive or transmit the discovery signal for each frequency of the plurality of determined frequencies;
transmit a message to a base station, the message including a plurality of information corresponding to the plurality of determined frequencies, wherein each of the plurality of information includes: frequency information indicating a respective determined frequency of the plurality of determined frequencies; and a bitmap indicating the determined subframes associated with the respective determined frequency, wherein the frequency information is associated with the bitmap;
receive configuration information from the base station, the configuration information indicating assigned sidelink gaps provided by the base station, wherein the assigned sidelink gaps are based on the message transmitted by the user terminal; and
use the assigned sidelink gaps to transmit or receive the discovery signal.

3. A base station comprising:
a receiver configured to receive a message from a user terminal, the message including a plurality of information corresponding to a plurality of frequencies,
wherein the plurality of information includes frequency information and a bitmap associated with the frequency information, wherein the frequency information indicates a respective frequency of the plurality of frequencies on which the user terminal requires reception or transmission of a discovery signal that is a direct device-to-device radio signal for discovering another user terminal, and the bitmap indicates subframes determined by the user terminal and on which the user terminal needs sidelink gaps to be used to receive or transmit the discovery signal, wherein the subframes are determined for each frequency by the user terminal and are associated with the respective frequency;
a controller configured to assign sidelink gaps to the user terminal based on the message transmitted by the user terminal, and
a transmitter configured to transmit configuration information to the user terminal, the configuration information indicating the assigned sidelink gaps to be used by the user terminal to transmit or receive the discovery signal.

4. An apparatus for a base station comprising:
a processor and a memory, the processor configured to cause the base station to
receive a message from a user terminal, the message including a plurality of information corresponding to a plurality of frequencies, wherein each of the plurality of information includes frequency information and a bitmap associated with the frequency information, wherein the frequency information indicates a respective frequency of the plurality of frequencies on which the user terminal requires reception or transmission of a discovery signal that is a direct device-to-device radio signal for discovering another user terminal, and the bitmap indicates subframes determined by the user terminal and on which the user terminal needs sidelink gaps to be used to receive or transmit the discovery signal, wherein the subframes are determined for each frequency by the user terminal and are associated with the respective frequency;
assign sidelink gaps to the user terminal based on the message transmitted by the user terminal; and
transmit configuration information to the user terminal, the configuration information indicating the assigned sidelink gaps to be used by the user terminal to transmit or receive the discovery signal.

* * * * *